(12) United States Patent
Tsai et al.

(10) Patent No.: US 11,943,561 B2
(45) Date of Patent: Mar. 26, 2024

(54) NON-LINEAR QUANTIZATION AT PIXEL SENSOR

(71) Applicant: Meta Platforms Technologies, LLC, Menlo Park, CA (US)

(72) Inventors: Tsung-Hsun Tsai, Redmond, WA (US); Xinqiao Liu, Medina, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/896,130

(22) Filed: Jun. 8, 2020

(65) Prior Publication Data

US 2020/0396399 A1   Dec. 17, 2020

Related U.S. Application Data

(60) Provisional application No. 62/861,129, filed on Jun. 13, 2019, provisional application No. 62/861,132, (Continued)

(51) Int. Cl.
*H04N 25/533* (2023.01)
*H04N 25/71* (2023.01)
*H04N 25/75* (2023.01)

(52) U.S. Cl.
CPC ......... *H04N 25/533* (2023.01); *H04N 25/745* (2023.01); *H04N 25/75* (2023.01)

(58) Field of Classification Search
CPC .... H04N 5/3535; H04N 5/378; H04N 5/3765; H04N 5/37457; H04N 5/37452; H04N 5/37455

See application file for complete search history.

(56) References Cited

U.S. PATENT DOCUMENTS

| 4,596,977 A | 6/1986 | Bauman et al. |
| 5,053,771 A | 10/1991 | McDermott |

(Continued)

FOREIGN PATENT DOCUMENTS

| CN | 1490878 A | 4/2004 |
| CN | 1728397 A | 2/2006 |

(Continued)

OTHER PUBLICATIONS

U.S. Appl. No. 16/436,137, "Non-Final Office Action", dated Dec. 4, 2020, 12 pages.

(Continued)

*Primary Examiner* — Nhan T Tran
(74) *Attorney, Agent, or Firm* — Kilpatrick Townsend & Stockton LLP

(57) ABSTRACT

In one example, an apparatus comprises: a photodiode to generate a charge in response to light within an exposure period having a first duration; a charge sensing unit to accumulate at least a part of the charge within the exposure period; a quantizer; and a controller to: determine, using the quantizer and within a measurement period having a second duration, whether a first quantity of the at least a part of the charge accumulated at the charge sensing unit exceeds a threshold, and a time it takes for the first quantity to exceed the threshold, wherein the first duration and the second duration are individually programmable; and based on whether the first quantity exceeds the threshold, output a first value representing the time or a second value representing a second quantity of the charge generated by the photodiode within the exposure period to represent an intensity of the light.

24 Claims, 40 Drawing Sheets

Related U.S. Application Data filed on Jun. 13, 2019, provisional application No. 62/861,133, filed on Jun. 13, 2019.

(56) References Cited

U.S. PATENT DOCUMENTS

| | | |
|---|---|---|
| 5,650,643 A | 7/1997 | Konuma |
| 5,844,512 A | 12/1998 | Gorin et al. |
| 6,181,822 B1 | 1/2001 | Miller et al. |
| 6,384,905 B1 | 5/2002 | Barrows |
| 6,522,395 B1 | 2/2003 | Bamji et al. |
| 6,529,241 B1 | 3/2003 | Clark |
| 6,864,817 B1 | 3/2005 | Salvi et al. |
| 6,963,369 B1 | 11/2005 | Olding |
| 7,326,903 B2 | 2/2008 | Ackland |
| 7,362,365 B1 | 4/2008 | Reyneri et al. |
| 7,659,772 B2 | 2/2010 | Nomura et al. |
| 7,659,925 B2 | 2/2010 | Krymski |
| 7,719,589 B2 | 5/2010 | Turchetta et al. |
| 7,880,779 B2 | 2/2011 | Storm |
| 7,956,914 B2 | 6/2011 | Xu |
| 8,134,623 B2 | 3/2012 | Purcell et al. |
| 8,144,227 B2 | 3/2012 | Kobayashi |
| 8,369,458 B2 | 2/2013 | Wong et al. |
| 8,426,793 B1 | 4/2013 | Barrows |
| 8,754,798 B2 | 6/2014 | Lin |
| 8,773,562 B1 | 7/2014 | Fan |
| 8,779,346 B2 | 7/2014 | Fowler et al. |
| 8,946,610 B2 | 2/2015 | Iwabuchi et al. |
| 9,001,251 B2 | 4/2015 | Smith et al. |
| 9,094,629 B2 | 7/2015 | Ishibashi |
| 9,185,273 B2 | 11/2015 | Beck et al. |
| 9,274,151 B2 | 3/2016 | Lee et al. |
| 9,282,264 B2 | 3/2016 | Park et al. |
| 9,332,200 B1 | 5/2016 | Hseih et al. |
| 9,343,497 B2 | 5/2016 | Cho |
| 9,363,454 B2 | 6/2016 | Ito et al. |
| 9,478,579 B2 | 10/2016 | Dai et al. |
| 9,497,396 B2 | 11/2016 | Choi |
| 9,531,990 B1 | 12/2016 | Wilkins et al. |
| 9,800,260 B1 | 10/2017 | Banerjee |
| 9,819,885 B2 | 11/2017 | Furukawa et al. |
| 9,832,370 B2 | 11/2017 | Cho et al. |
| 9,909,922 B2 | 3/2018 | Schweickert et al. |
| 9,948,316 B1 | 4/2018 | Yun et al. |
| 9,955,091 B1 | 4/2018 | Dai et al. |
| 9,967,496 B2 | 5/2018 | Ayers et al. |
| 10,003,759 B2 | 6/2018 | Fan |
| 10,015,416 B2 | 7/2018 | Borthakur et al. |
| 10,090,342 B1 | 10/2018 | Gambino et al. |
| 10,096,631 B2 | 10/2018 | Ishizu |
| 10,154,221 B2 | 12/2018 | Ogino et al. |
| 10,157,951 B2 | 12/2018 | Kim et al. |
| 10,321,081 B2 | 6/2019 | Watanabe et al. |
| 10,345,447 B1 | 7/2019 | Hicks |
| 10,419,701 B2 | 9/2019 | Liu |
| 10,574,925 B2 | 2/2020 | Otaka |
| 10,594,974 B2 | 3/2020 | Ivarsson et al. |
| 10,598,546 B2 | 3/2020 | Liu |
| 10,608,101 B2 | 3/2020 | Liu |
| 10,686,996 B2 | 6/2020 | Liu |
| 10,726,627 B2 | 7/2020 | Liu |
| 10,750,097 B2 | 8/2020 | Liu |
| 10,764,526 B1 | 9/2020 | Liu et al. |
| 10,804,926 B2 | 10/2020 | Gao et al. |
| 10,812,742 B2 | 10/2020 | Chen et al. |
| 10,825,854 B2 | 11/2020 | Liu |
| 10,834,344 B2 | 11/2020 | Chen et al. |
| 10,897,586 B2 | 1/2021 | Liu et al. |
| 10,903,260 B2 | 1/2021 | Chen et al. |
| 10,917,589 B2 | 2/2021 | Liu |
| 10,951,849 B2 | 3/2021 | Liu |
| 10,969,273 B2 | 4/2021 | Berkovich et al. |
| 11,004,881 B2 | 5/2021 | Liu et al. |
| 11,057,581 B2 | 7/2021 | Liu |
| 11,089,210 B2 | 8/2021 | Berkovich et al. |
| 11,595,598 B2 | 2/2023 | Liu et al. |
| 11,595,602 B2 | 2/2023 | Gao et al. |
| 11,729,525 B2 | 8/2023 | Liu |
| 2002/0067303 A1 | 6/2002 | Lee et al. |
| 2002/0113886 A1 | 8/2002 | Hynecek |
| 2002/0118289 A1 | 8/2002 | Choi |
| 2003/0001080 A1 | 1/2003 | Kummaraguntla et al. |
| 2003/0020100 A1 | 1/2003 | Guidash |
| 2003/0049925 A1 | 3/2003 | Layman et al. |
| 2004/0095495 A1 | 5/2004 | Inokuma et al. |
| 2004/0118994 A1* | 6/2004 | Mizuno .................... G01J 1/46 250/214 R |
| 2004/0251483 A1 | 12/2004 | Ko et al. |
| 2005/0046715 A1 | 3/2005 | Lim et al. |
| 2005/0057389 A1 | 3/2005 | Krymski |
| 2005/0104983 A1 | 5/2005 | Raynor |
| 2005/0206414 A1 | 9/2005 | Cottin et al. |
| 2005/0237380 A1 | 10/2005 | Kakii et al. |
| 2005/0280727 A1 | 12/2005 | Sato et al. |
| 2006/0023109 A1 | 2/2006 | Mabuchi et al. |
| 2006/0146159 A1 | 7/2006 | Farrier |
| 2006/0157759 A1 | 7/2006 | Okita et al. |
| 2006/0158541 A1 | 7/2006 | Ichikawa |
| 2007/0013983 A1 | 1/2007 | Kitamura et al. |
| 2007/0076109 A1 | 4/2007 | Krymski |
| 2007/0076481 A1 | 4/2007 | Tennant |
| 2007/0092244 A1 | 4/2007 | Pertsel et al. |
| 2007/0102740 A1 | 5/2007 | Ellis-Monaghan et al. |
| 2007/0131991 A1 | 6/2007 | Sugawa |
| 2007/0208526 A1 | 9/2007 | Staudt et al. |
| 2007/0222881 A1 | 9/2007 | Mentzer |
| 2008/0001065 A1 | 1/2008 | Ackland |
| 2008/0007731 A1 | 1/2008 | Botchway et al. |
| 2008/0042888 A1 | 2/2008 | Danesh |
| 2008/0068478 A1 | 3/2008 | Watanabe |
| 2008/0088014 A1 | 4/2008 | Adkisson et al. |
| 2008/0191791 A1 | 8/2008 | Nomura et al. |
| 2008/0226170 A1 | 9/2008 | Sonoda |
| 2008/0226183 A1 | 9/2008 | Lei et al. |
| 2008/0266434 A1 | 10/2008 | Sugawa et al. |
| 2009/0002528 A1 | 1/2009 | Manabe et al. |
| 2009/0033588 A1 | 2/2009 | Kajita et al. |
| 2009/0040364 A1 | 2/2009 | Rubner |
| 2009/0091645 A1 | 4/2009 | Trimeche et al. |
| 2009/0128640 A1 | 5/2009 | Yumiki |
| 2009/0140305 A1 | 6/2009 | Sugawa |
| 2009/0219266 A1 | 9/2009 | Lim et al. |
| 2009/0224139 A1 | 9/2009 | Buettgen et al. |
| 2009/0237536 A1 | 9/2009 | Purcell et al. |
| 2009/0244346 A1 | 10/2009 | Funaki |
| 2009/0245637 A1 | 10/2009 | Barman et al. |
| 2009/0261235 A1 | 10/2009 | Lahav et al. |
| 2009/0321615 A1 | 12/2009 | Sugiyama et al. |
| 2010/0013969 A1 | 1/2010 | Ui |
| 2010/0140732 A1 | 6/2010 | Eminoglu et al. |
| 2010/0194956 A1 | 8/2010 | Yuan et al. |
| 2010/0232227 A1 | 9/2010 | Lee |
| 2010/0276572 A1 | 11/2010 | Iwabuchi et al. |
| 2011/0049589 A1 | 3/2011 | Chuang et al. |
| 2011/0122304 A1 | 5/2011 | Sedelnikov |
| 2011/0149116 A1 | 6/2011 | Kim |
| 2011/0155892 A1 | 6/2011 | Neter et al. |
| 2011/0254986 A1 | 10/2011 | Nishimura et al. |
| 2012/0016817 A1 | 1/2012 | Smith et al. |
| 2012/0039548 A1 | 2/2012 | Wang et al. |
| 2012/0068051 A1 | 3/2012 | Ahn et al. |
| 2012/0092677 A1 | 4/2012 | Suehira et al. |
| 2012/0105475 A1 | 5/2012 | Tseng |
| 2012/0105668 A1 | 5/2012 | Velarde et al. |
| 2012/0113119 A1 | 5/2012 | Massie |
| 2012/0127284 A1 | 5/2012 | Bar-Zeev et al. |
| 2012/0133807 A1 | 5/2012 | Wu et al. |
| 2012/0138775 A1 | 6/2012 | Cheon et al. |
| 2012/0153123 A1 | 6/2012 | Mao et al. |
| 2012/0188420 A1 | 7/2012 | Black et al. |
| 2012/0200499 A1 | 8/2012 | Osterhout et al. |
| 2012/0205520 A1 | 8/2012 | Hsieh et al. |
| 2012/0212465 A1 | 8/2012 | White et al. |
| 2012/0241591 A1 | 9/2012 | Wan et al. |

(56) References Cited

U.S. PATENT DOCUMENTS

| | | |
|---|---|---|
| 2012/0262616 A1 | 10/2012 | Sa et al. |
| 2012/0267511 A1 | 10/2012 | Kozlowski |
| 2012/0273654 A1 | 11/2012 | Hynecek et al. |
| 2012/0305751 A1 | 12/2012 | Kusuda |
| 2013/0020466 A1 | 1/2013 | Ayers et al. |
| 2013/0056809 A1 | 3/2013 | Mao et al. |
| 2013/0057742 A1 | 3/2013 | Nakamura et al. |
| 2013/0068929 A1 | 3/2013 | Solhusvik et al. |
| 2013/0069787 A1 | 3/2013 | Petrou |
| 2013/0082313 A1 | 4/2013 | Manabe |
| 2013/0113969 A1 | 5/2013 | Manabe et al. |
| 2013/0126710 A1 | 5/2013 | Kondo |
| 2013/0141619 A1 | 6/2013 | Lim et al. |
| 2013/0187027 A1 | 7/2013 | Qiao et al. |
| 2013/0207219 A1 | 8/2013 | Ahn |
| 2013/0214127 A1 | 8/2013 | Ohya et al. |
| 2013/0214371 A1 | 8/2013 | Asatsuma et al. |
| 2013/0218728 A1 | 8/2013 | Hashop et al. |
| 2013/0221194 A1 | 8/2013 | Manabe |
| 2013/0229543 A1 | 9/2013 | Hashimoto et al. |
| 2013/0229560 A1 | 9/2013 | Kondo |
| 2013/0234029 A1 | 9/2013 | Bikumandla |
| 2013/0293752 A1 | 11/2013 | Peng et al. |
| 2013/0299674 A1 | 11/2013 | Fowler et al. |
| 2014/0021574 A1 | 1/2014 | Egawa |
| 2014/0042299 A1 | 2/2014 | Wan et al. |
| 2014/0042582 A1 | 2/2014 | Kondo |
| 2014/0070974 A1 | 3/2014 | Park et al. |
| 2014/0078336 A1 | 3/2014 | Beck et al. |
| 2014/0085523 A1 | 3/2014 | Hynecek |
| 2014/0176770 A1 | 6/2014 | Kondo |
| 2014/0211052 A1 | 7/2014 | Choi |
| 2014/0232890 A1 | 8/2014 | Yoo et al. |
| 2014/0247382 A1 | 9/2014 | Moldovan et al. |
| 2014/0306276 A1 | 10/2014 | Yamaguchi |
| 2014/0368687 A1 | 12/2014 | Yu et al. |
| 2015/0070544 A1 | 3/2015 | Smith et al. |
| 2015/0077611 A1 | 3/2015 | Yamashita et al. |
| 2015/0083895 A1 | 3/2015 | Hashimoto et al. |
| 2015/0085134 A1 | 3/2015 | Novotny et al. |
| 2015/0090863 A1 | 4/2015 | Mansoorian et al. |
| 2015/0172574 A1 | 6/2015 | Honda et al. |
| 2015/0179696 A1 | 6/2015 | Kurokawa et al. |
| 2015/0189209 A1 | 7/2015 | Yang et al. |
| 2015/0201142 A1 | 7/2015 | Smith et al. |
| 2015/0208009 A1 | 7/2015 | Oh et al. |
| 2015/0229859 A1 | 8/2015 | Guidash et al. |
| 2015/0237274 A1 | 8/2015 | Yang et al. |
| 2015/0279884 A1 | 10/2015 | Kusumoto |
| 2015/0281613 A1 | 10/2015 | Vogelsang et al. |
| 2015/0287766 A1 | 10/2015 | Kim et al. |
| 2015/0309311 A1 | 10/2015 | Cho |
| 2015/0309316 A1 | 10/2015 | Osterhout et al. |
| 2015/0312461 A1 | 10/2015 | Kim et al. |
| 2015/0312502 A1 | 10/2015 | Borremans |
| 2015/0312557 A1 | 10/2015 | Kim |
| 2015/0350582 A1 | 12/2015 | Korobov et al. |
| 2015/0358569 A1 | 12/2015 | Egawa |
| 2015/0358571 A1 | 12/2015 | Dominguez Castro et al. |
| 2015/0358593 A1 | 12/2015 | Sato |
| 2015/0381907 A1 | 12/2015 | Boettiger et al. |
| 2015/0381911 A1 | 12/2015 | Shen et al. |
| 2016/0011422 A1 | 1/2016 | Thurber et al. |
| 2016/0018645 A1 | 1/2016 | Haddick et al. |
| 2016/0021302 A1 | 1/2016 | Cho et al. |
| 2016/0028974 A1 | 1/2016 | Guidash et al. |
| 2016/0028980 A1 | 1/2016 | Kameyama et al. |
| 2016/0037111 A1 | 2/2016 | Dai et al. |
| 2016/0078614 A1 | 3/2016 | Ryu et al. |
| 2016/0088253 A1 | 3/2016 | Tezuka |
| 2016/0100113 A1 | 4/2016 | Oh et al. |
| 2016/0100115 A1 | 4/2016 | Kusano |
| 2016/0111457 A1 | 4/2016 | Sekine |
| 2016/0112626 A1 | 4/2016 | Shimada |
| 2016/0118992 A1 | 4/2016 | Milkov |
| 2016/0165160 A1 | 6/2016 | Hseih et al. |
| 2016/0197117 A1 | 7/2016 | Nakata et al. |
| 2016/0204150 A1 | 7/2016 | Oh et al. |
| 2016/0210785 A1 | 7/2016 | Balachandreswaran et al. |
| 2016/0240570 A1 | 8/2016 | Barna et al. |
| 2016/0249004 A1 | 8/2016 | Saeki et al. |
| 2016/0255293 A1 | 9/2016 | Gesset |
| 2016/0277010 A1 | 9/2016 | Park et al. |
| 2016/0307945 A1 | 10/2016 | Madurawe |
| 2016/0307949 A1 | 10/2016 | Madurawe |
| 2016/0337605 A1 | 11/2016 | Ito |
| 2016/0353045 A1 | 12/2016 | Kawahito et al. |
| 2016/0360127 A1 | 12/2016 | Dierickx et al. |
| 2017/0013215 A1 | 1/2017 | McCarten |
| 2017/0039906 A1 | 2/2017 | Jepsen |
| 2017/0041571 A1 | 2/2017 | Tyrrell et al. |
| 2017/0053962 A1 | 2/2017 | Oh et al. |
| 2017/0059399 A1 | 3/2017 | Suh et al. |
| 2017/0062501 A1 | 3/2017 | Velichko et al. |
| 2017/0069363 A1 | 3/2017 | Baker |
| 2017/0070691 A1 | 3/2017 | Nishikido |
| 2017/0099422 A1 | 4/2017 | Goma et al. |
| 2017/0099446 A1 | 4/2017 | Cremers et al. |
| 2017/0104021 A1 | 4/2017 | Park et al. |
| 2017/0104946 A1 | 4/2017 | Hong |
| 2017/0111600 A1* | 4/2017 | Wang .................. H04N 5/3537 |
| 2017/0141147 A1 | 5/2017 | Raynor |
| 2017/0154909 A1 | 6/2017 | Ishizu |
| 2017/0170223 A1 | 6/2017 | Hynecek et al. |
| 2017/0195602 A1 | 7/2017 | Iwabuchi et al. |
| 2017/0201693 A1 | 7/2017 | Sugizaki et al. |
| 2017/0207268 A1 | 7/2017 | Kurokawa |
| 2017/0228345 A1 | 8/2017 | Gupta et al. |
| 2017/0251151 A1 | 8/2017 | Hicks |
| 2017/0270664 A1 | 9/2017 | Hoogi et al. |
| 2017/0272667 A1 | 9/2017 | Hynecek |
| 2017/0272768 A1 | 9/2017 | Tall et al. |
| 2017/0280031 A1 | 9/2017 | Price et al. |
| 2017/0293799 A1 | 10/2017 | Skogo et al. |
| 2017/0310910 A1 | 10/2017 | Smith et al. |
| 2017/0318250 A1 | 11/2017 | Sakakibara et al. |
| 2017/0324917 A1 | 11/2017 | Mlinar et al. |
| 2017/0338262 A1 | 11/2017 | Hirata |
| 2017/0339327 A1 | 11/2017 | Koshkin et al. |
| 2017/0346579 A1 | 11/2017 | Barghi |
| 2017/0350755 A1 | 12/2017 | Geurts |
| 2017/0359497 A1 | 12/2017 | Mandelli et al. |
| 2017/0366766 A1 | 12/2017 | Geurts et al. |
| 2018/0019269 A1 | 1/2018 | Klipstein |
| 2018/0077368 A1 | 3/2018 | Suzuki |
| 2018/0115725 A1 | 4/2018 | Zhang et al. |
| 2018/0136471 A1 | 5/2018 | Miller et al. |
| 2018/0143701 A1 | 5/2018 | Suh et al. |
| 2018/0152650 A1 | 5/2018 | Sakakibara et al. |
| 2018/0167575 A1 | 6/2018 | Watanabe et al. |
| 2018/0175083 A1 | 6/2018 | Takahashi |
| 2018/0176545 A1 | 6/2018 | Aflaki Beni |
| 2018/0204867 A1 | 7/2018 | Kim et al. |
| 2018/0220093 A1 | 8/2018 | Murao et al. |
| 2018/0224658 A1 | 8/2018 | Teller |
| 2018/0227516 A1 | 8/2018 | Mo et al. |
| 2018/0241953 A1 | 8/2018 | Johnson |
| 2018/0270436 A1 | 9/2018 | Ivarsson et al. |
| 2018/0276841 A1 | 9/2018 | Krishnaswamy et al. |
| 2018/0376046 A1* | 12/2018 | Liu ....................... H04N 5/232 |
| 2018/0376090 A1 | 12/2018 | Liu |
| 2019/0035154 A1 | 1/2019 | Liu |
| 2019/0046044 A1 | 2/2019 | Tzvieli et al. |
| 2019/0052788 A1 | 2/2019 | Liu |
| 2019/0052821 A1 | 2/2019 | Berner et al. |
| 2019/0056264 A1 | 2/2019 | Liu |
| 2019/0057995 A1 | 2/2019 | Liu |
| 2019/0058058 A1 | 2/2019 | Liu |
| 2019/0098232 A1 | 3/2019 | Mori et al. |
| 2019/0104263 A1 | 4/2019 | Ochiai et al. |
| 2019/0104265 A1 | 4/2019 | Totsuka et al. |
| 2019/0110039 A1 | 4/2019 | Linde et al. |
| 2019/0123088 A1 | 4/2019 | Kwon |
| 2019/0141270 A1 | 5/2019 | Otaka et al. |

(56) References Cited

U.S. PATENT DOCUMENTS

| | | | |
|---|---|---|---|
| 2019/0149751 A1 | 5/2019 | Wise | |
| 2019/0157330 A1 | 5/2019 | Sato et al. | |
| 2019/0172227 A1 | 6/2019 | Kasahara | |
| 2019/0172868 A1* | 6/2019 | Chen | H01L 27/1462 |
| 2019/0191116 A1 | 6/2019 | Madurawe | |
| 2019/0246036 A1 | 8/2019 | Wu et al. | |
| 2019/0253650 A1 | 8/2019 | Kim | |
| 2019/0327439 A1 | 10/2019 | Chen et al. | |
| 2019/0331914 A1 | 10/2019 | Lee et al. | |
| 2019/0335151 A1 | 10/2019 | Rivard et al. | |
| 2019/0348460 A1 | 11/2019 | Chen et al. | |
| 2019/0355782 A1 | 11/2019 | Do et al. | |
| 2019/0363118 A1 | 11/2019 | Berkovich et al. | |
| 2019/0371845 A1 | 12/2019 | Chen et al. | |
| 2019/0376845 A1 | 12/2019 | Liu et al. | |
| 2019/0379388 A1 | 12/2019 | Gao et al. | |
| 2019/0379827 A1 | 12/2019 | Berkovich et al. | |
| 2019/0379846 A1 | 12/2019 | Chen et al. | |
| 2020/0007800 A1 | 1/2020 | Berkovich et al. | |
| 2020/0053299 A1 | 2/2020 | Zhang et al. | |
| 2020/0059589 A1 | 2/2020 | Liu et al. | |
| 2020/0068189 A1 | 2/2020 | Chen et al. | |
| 2020/0186731 A1 | 6/2020 | Chen et al. | |
| 2020/0195875 A1 | 6/2020 | Berkovich et al. | |
| 2020/0217714 A1 | 7/2020 | Liu | |
| 2020/0228745 A1 | 7/2020 | Otaka | |
| 2020/0374475 A1* | 11/2020 | Fukuoka | H01L 27/286 |
| 2021/0026796 A1 | 1/2021 | Graif et al. | |
| 2021/0099659 A1 | 4/2021 | Miyauchi et al. | |
| 2021/0185264 A1 | 6/2021 | Wong et al. | |
| 2021/0227159 A1 | 7/2021 | Sambonsugi | |
| 2021/0368124 A1 | 11/2021 | Berkovich et al. | |
| 2023/0080288 A1 | 3/2023 | Berkovich et al. | |
| 2023/0092325 A1 | 3/2023 | Tsai et al. | |
| 2023/0239582 A1 | 7/2023 | Berkovich et al. | |

FOREIGN PATENT DOCUMENTS

| | | |
|---|---|---|
| CN | 1812506 A | 8/2006 |
| CN | 101753866 A | 6/2010 |
| CN | 103002228 A | 3/2013 |
| CN | 103207716 A | 7/2013 |
| CN | 104125418 A | 10/2014 |
| CN | 104204904 A | 12/2014 |
| CN | 104469195 A | 3/2015 |
| CN | 104704812 A | 6/2015 |
| CN | 104733485 A | 6/2015 |
| CN | 104754255 A | 7/2015 |
| CN | 204633945 A | 9/2015 |
| CN | 105144699 A | 12/2015 |
| CN | 105529342 A | 4/2016 |
| CN | 105706439 A | 6/2016 |
| CN | 205666884 U | 10/2016 |
| CN | 106255978 A | 12/2016 |
| CN | 106791504 A | 5/2017 |
| CN | 107852473 A | 3/2018 |
| CN | 109298528 A | 2/2019 |
| DE | 202016105510 | 10/2016 |
| EP | 0675345 | 10/1995 |
| EP | 1681856 | 7/2006 |
| EP | 1732134 | 12/2006 |
| EP | 1746820 | 1/2007 |
| EP | 1788802 A1 | 5/2007 |
| EP | 2037505 A1 | 3/2009 |
| EP | 2063630 | 5/2009 |
| EP | 2538664 | 12/2012 |
| EP | 2804074 A2 | 11/2014 |
| EP | 2833619 | 2/2015 |
| EP | 3032822 | 6/2016 |
| EP | 3229457 A1 | 10/2017 |
| EP | 3258683 | 12/2017 |
| EP | 3425352 | 1/2019 |
| EP | 3439039 A1 | 2/2019 |
| EP | 3744085 A2 | 12/2020 |
| EP | 3744085 A2 | 12/2020 |
| JP | H08195906 A | 7/1996 |
| JP | 2001008101 A | 1/2001 |
| JP | 2002199292 A | 7/2002 |
| JP | 2003319262 A | 11/2003 |
| JP | 2005328493 A | 11/2005 |
| JP | 2006197382 A | 7/2006 |
| JP | 2006203736 A | 8/2006 |
| JP | 2007074447 A | 3/2007 |
| JP | 2011216966 A | 10/2011 |
| JP | 2012054495 A | 3/2012 |
| JP | 2012054876 A | 3/2012 |
| JP | 2012095349 A | 5/2012 |
| JP | 2013009087 A | 1/2013 |
| JP | 2013055581 A | 3/2013 |
| JP | 2013172203 A | 9/2013 |
| JP | 2013225774 A | 10/2013 |
| JP | 2014107596 A | 6/2014 |
| JP | 2014165733 A | 9/2014 |
| JP | 2014236183 A | 12/2014 |
| JP | 2015065524 A | 4/2015 |
| JP | 2015126043 A | 7/2015 |
| JP | 2015530855 A | 10/2015 |
| JP | 2015211259 A | 11/2015 |
| JP | 2016092661 A | 5/2016 |
| JP | 2016513942 A | 5/2016 |
| JP | 2017509251 A | 3/2017 |
| KR | 100574959 | 4/2006 |
| KR | 20080019652 A | 3/2008 |
| KR | 20090023549 A | 3/2009 |
| KR | 20110050351 | 5/2011 |
| KR | 20110134941 A | 12/2011 |
| KR | 20120058337 A | 6/2012 |
| KR | 20120117953 A | 10/2012 |
| KR | 20150095841 | 8/2015 |
| KR | 20160008267 A | 1/2016 |
| KR | 20160008287 | 1/2016 |
| TW | 201448184 A | 12/2014 |
| TW | 201719874 A | 6/2017 |
| TW | 201728161 A | 8/2017 |
| TW | I624694 B | 5/2018 |
| WO | 2006124592 A2 | 11/2006 |
| WO | 2006129762 A1 | 12/2006 |
| WO | 2010117462 A1 | 10/2010 |
| WO | 2013099723 A1 | 7/2013 |
| WO | WO-2014055391 A2 | 4/2014 |
| WO | 2014144391 A1 | 9/2014 |
| WO | 2015135836 A1 | 9/2015 |
| WO | 2015182390 A1 | 12/2015 |
| WO | 2016014860 A1 | 1/2016 |
| WO | WO-2016095057 A1 | 6/2016 |
| WO | 2016194653 A1 | 12/2016 |
| WO | WO-2017003477 A1 | 1/2017 |
| WO | WO-2017013806 A1 | 1/2017 |
| WO | WO-2017047010 A1 | 3/2017 |
| WO | 2017058488 | 4/2017 |
| WO | 2017069706 | 4/2017 |
| WO | 2017169882 | 10/2017 |
| WO | WO-2017169446 A1 | 10/2017 |
| WO | WO-2019018084 A1 | 1/2019 |
| WO | WO-2019111528 A1 | 6/2019 |
| WO | WO-2019145578 A1 | 8/2019 |
| WO | 2019168929 | 9/2019 |

OTHER PUBLICATIONS

U.S. Appl. No. 16/566,583, "Corrected Notice of Allowability", dated Dec. 11, 2020, 2 pages.

U.S. Appl. No. 15/719,345, "Notice of Allowance", dated Sep. 3, 2020, 12 pages.

U.S. Appl. No. 16/454,787, "Notice of Allowance", dated Sep. 9, 2020, 9 pages.

U.S. Appl. No. 16/707,988, "Non-Final Office Action", dated Sep. 22, 2020, 15 pages.

U.S. Appl. No. 15/668,241, Advisory Action, dated Oct. 23, 2019, 5 pages.

U.S. Appl. No. 15/668,241, Final Office Action, dated Jun. 17, 2019, 19 pages.

(56) References Cited

OTHER PUBLICATIONS

U.S. Appl. No. 15/668,241, Non-Final Office Action, dated Dec. 21, 2018, 3 pages.
U.S. Appl. No. 15/668,241, Notice of Allowance, dated Jun. 29, 2020, 8 pages.
U.S. Appl. No. 15/668,241, Notice of Allowance, dated Mar. 5, 2020, 8 pages.
U.S. Appl. No. 15/668,241, "Supplemental Notice of Allowability", dated Apr. 29, 2020, 5 pages.
U.S. Appl. No. 15/719,345, Final Office Action, dated Apr. 29, 2020, 14 pages.
U.S. Appl. No. 15/719,345, Non- Final Office Action, dated Nov. 25, 2019, 14 pages.
U.S. Appl. No. 15/719,345, Notice of Allowance, dated Aug. 12, 2020, 11 pages.
U.S. Appl. No. 15/801,216, Advisory Action, dated Apr. 7, 2020, 3 pages.
U.S. Appl. No. 15/801,216, Final Office Action, dated Dec. 26, 2019, 5 pages.
U.S. Appl. No. 15/801,216, Non-Final Office Action, dated Jun. 27, 2019, 13 pages.
U.S. Appl. No. 15/801,216, Notice of Allowance, dated Jun. 23, 2020, 5 pages.
U.S. Appl. No. 15/847,517, Non-Final Office Action, dated Nov. 23, 2018, 21 pages.
U.S. Appl. No. 15/847,517, Notice of Allowance, dated May 1, 2019, 11 pages.
U.S. Appl. No. 15/861,588, Non-Final Office Action, dated Jul. 10, 2019, 11 pages.
U.S. Appl. No. 15/861,588, Notice of Allowance, dated Nov. 26, 2019, 9 pages.
U.S. Appl. No. 15/876,061, "Corrected Notice of Allowability", dated Apr. 28, 2020, 3 pages.
U.S. Appl. No. 15/876,061, Non-Final Office Action, dated Sep. 18, 2019, 23 pages.
U.S. Appl. No. 15/876,061, "Notice of Allowability", dated May 6, 2020, 2 pages.
U.S. Appl. No. 15/876,061, Notice of Allowance, dated Feb. 4, 2020, 13 pages.
U.S. Appl. No. 15/927,896, Non-Final Office Action, dated May 1, 2019, 10 pages.
U.S. Appl. No. 15/983,379, Notice of Allowance, dated Oct. 18, 2019, 9 pages.
U.S. Appl. No. 15/983,391, Non-Final Office Action, dated Aug. 29, 2019, 12 pages.
U.S. Appl. No. 15/983,391, Notice of Allowance, dated Apr. 8, 2020, 8 pages.
U.S. Appl. No. 16/177,971, Final Office Action, dated Feb. 27, 2020, 9 pages.
U.S. Appl. No. 16/177,971, Non-Final Office Action, dated Sep. 25, 2019, 9 pages.
U.S. Appl. No. 16/177,971, Notice of Allowance, dated Apr. 24, 2020, 6 pages.
U.S. Appl. No. 16/210,748, Final Office Action, dated Jul. 7, 2020, 11 pages.
U.S. Appl. No. 16/210,748, Non-Final Office Action, dated Jan. 31, 2020, 11 pages.
U.S. Appl. No. 16/249,420, Non-Final Office Action, dated Jul. 22, 2020, 9 pages.
U.S. Appl. No. 16/286,355, Non-Final Office Action, dated Oct. 1, 2019, 6 pages.
U.S. Appl. No. 16/286,355, Notice of Allowance, dated Feb. 12, 2020, 7 pages.
U.S. Appl. No. 16/286,355, Notice of Allowance, dated Jun. 4, 2020, 7 pages.
U.S. Appl. No. 16/369,763, Non-Final Office Action, dated Jul. 22, 2020, 15 pages.
U.S. Appl. No. 16/382,015, Notice of Allowance, dated Jun. 11, 2020, 11 pages.
U.S. Appl. No. 16/384,720, Non-Final Office Action, dated May 1, 2020, 6 pages.
U.S. Appl. No. 16/431,693, Non-Final Office Action, dated Jan. 30, 2020, 6 pages.
U.S. Appl. No. 16/431,693, Notice of Allowance, dated Jun. 24, 2020, 7 pages.
U.S. Appl. No. 16/435,449, Notice of Allowance, dated Jul. 27, 2020, 8 pages.
U.S. Appl. No. 16/436,049, Non-Final Office Action, dated Jun. 30, 2020, 11 pages.
U.S. Appl. No. 16/436,049, Non-Final Office Action, dated Mar. 4, 2020, 9 pages.
U.S. Appl. No. 16/454,787, Notice of Allowance, dated Apr. 22, 2020, 10 pages.
U.S. Appl. No. 16/454,787, Notice of Allowance, dated Jul. 9, 2020, 9 pages.
U.S. Appl. No. 16/566,583, Final Office Action, dated Apr. 15, 2020, 24 pages.
U.S. Appl. No. 16/566,583, Non-Final Office Action, dated Oct. 1, 2019, 10 pages.
U.S. Appl. No. 16/566,583, Non-Final Office Action, dated Jul. 27, 2020, 11 pages.
Cho et al., "A Low Power Dual CDS for a Column-Parallel CMOS Image Sensor", Journal of Semiconductor Technology and Science, vol. 12, No. 4, Dec. 30, 2012, pp. 388-396.
Application No. EP18179838.0, Extended European Search Report, dated May 24, 2019, 17 pages.
EP18179838.0, "Partial European Search Report", dated Dec. 5, 2018, 14 pages.
Application No. EP18179846.3, Extended European Search Report, dated Dec. 7, 2018, 10 pages.
Application No. EP18179851.3, Extended European Search Report, dated Dec. 7, 2018, 8 pages.
Application No. EP18188684.7, Extended European Search Report, dated Jan. 16, 2019, 10 pages.
Application No. EP18188684.7, Office Action, dated Nov. 26, 2019, 9 pages.
Application No. EP18188962.7, Extended European Search Report, dated Oct. 23, 2018, 8 pages.
Application No. EP18188962.7, Office Action, dated Aug. 28, 2019, 6 pages.
Application No. EP18188968.4, Extended European Search Report, dated Oct. 23, 2018, 8 pages.
Application No. EP18188968.4, Office Action, dated Aug. 14, 2019, 5 pages.
Application No. EP18189100.3, Extended European Search Report, dated Oct. 9, 2018, 8 pages.
Kavusi et al., "Quantitative Study of High-Dynamic-Range Image Sensor Architectures", Proceedings of Society of Photo-Optical Instrumentation Engineers—The International Society for Optical Engineering, vol. 5301, Jun. 2004, pp. 264-275.
Application No. PCT/US2018/039350, International Preliminary Report on Patentability, dated Jan. 9, 2020, 10 pages.
Application No. PCT/US2018/039350, International Search Report and Written Opinion, dated Nov. 15, 2018, 13 pages.
Application No. PCT/US2018/039352, International Search Report and Written Opinion, dated Oct. 26, 2018, 10 pages.
Application No. PCT/US2018/039431, International Search Report and Written Opinion, dated Nov. 7, 2018, 14 pages.
Application No. PCT/US2018/045661, International Search Report and Written Opinion, dated Nov. 30, 2018, 11 Pages.
Application No. PCT/US2018/045666, International Preliminary Report on Patentability, dated Feb. 27, 2020, 11 pages.
Application No. PCT/US2018/045666, International Search Report and Written Opinion, dated Dec. 3, 2018, 13 pages.
Application No. PCT/US2018/045673, International Search Report and Written Opinion, dated Dec. 4, 2018, 13 pages.
Application No. PCT/US2018/046131, International Search Report and Written Opinion, dated Dec. 3, 2018, 10 pages.
Application No. PCT/US2018/064181, International Preliminary Report on Patentability, dated Jun. 18, 2020, 9 pages.
Application No. PCT/US2018/064181, International Search Report and Written Opinion, dated Mar. 29, 2019, 12 pages.

(56) References Cited

OTHER PUBLICATIONS

Application No. PCT/US2019/014044, International Search Report and Written Opinion, dated May 8, 2019, 11 pages.
Application No. PCT/US2019/019756, International Search Report and Written Opinion, dated Jun. 13, 2019, 11 pages.
Application No. PCT/US2019/025170, International Search Report and Written Opinion, dated Jul. 9, 2019, 11 pages.
Application No. PCT/US2019/027727, International Search Report and Written Opinion, dated Jun. 27, 2019, 11 pages.
Application No. PCT/US2019/027729, International Search Report and Written Opinion, dated Jun. 27, 2019, 10 pages.
Application No. PCT/US2019/031521, International Search Report and Written Opinion, dated Jul. 11, 2019, 11 pages.
Application No. PCT/US2019/035724, International Search Report and Written Opinion, dated Sep. 10, 2019, 12 pages.
Application No. PCT/US2019/036484, International Search Report and Written Opinion, dated Sep. 19, 2019, 10 pages.
Application No. PCT/US2019/036492, International Search Report and Written Opinion, dated Sep. 25, 2019, 9 pages.
Application No. PCT/US2019/036536, International Search Report and Written Opinion, dated Sep. 26, 2019, 14 pages.
Application No. PCT/US2019/036575, International Search Report and Written Opinion, dated Sep. 30, 2019, 16 pages.
Application No. PCT/US2019/039410, International Search Report and Written Opinion, dated Sep. 30, 2019, 11 pages.
Application No. PCT/US2019/039758, International Search Report and Written Opinion, dated Oct. 11, 2019, 13 pages.
Application No. PCT/US2019/047156, International Search Report and Written Opinion, dated Oct. 23, 2019, 9 pages.
Application No. PCT/US2019/048241, International Search Report and Written Opinion, dated Jan. 28, 2020, 16 pages.
Application No. PCT/US2019/049756, International Search Report and Written Opinion, dated Dec. 16, 2019, 8 pages.
Application No. PCT/US2019/059754, International Search Report and Written Opinion, dated Mar. 24, 2020, 15 pages.
Application No. PCT/US2019/065430, International Search Report and Written Opinion, dated Mar. 6, 2020, 15 pages.
Snoeij, "A Low Power Column-Parallel 12-Bit ADC for CMOS Imagers", Institute of Electrical and Electronics Engineers Workshop on Charge-Coupled Devices and Advanced Image Sensors, Jun. 2005, pp. 169-172.
Tanner et al., "Low-Power Digital Image Sensor for Still Picture Image Acquisition", Visual Communications and Image Processing, vol. 4306, Jan. 22, 2001, 8 pages.
Xu et al., "A New Digital-Pixel Architecture for CMOS Image Sensor With Pixel-Level ADC and Pulse Width Modulation using a 0.18 Mu M CMOS Technology", Institute of Electrical and Electronics Engineers Conference on Electron Devices and Solid-State Circuits, Dec. 16-18, 2003, pp. 265-268.
U.S. Appl. No. 16/707,988, "Notice of Allowance", dated May 5, 2021, 14 pages.
U.S. Appl. No. 16/435,451, "Non-Final Office Action", dated Feb. 1, 2021, 14 pages.
U.S. Appl. No. 16/566,583, "Corrected Notice of Allowability", dated Feb. 3, 2021, 2 pages.
U.S. Appl. No. 16/820,594, "Non-Final Office Action", dated Jul. 2, 2021, 8 pages.
U.S. Appl. No. 17/072,840, "Non-Final Office Action", dated Jun. 8, 2021, 7 pages.
U.S. Appl. No. 17/150,925, "Notice of Allowance", dated Jul. 8, 2021, 10 pages.
U.S. Appl. No. 16/435,451, Final Office Action dated Jul. 12, 2021, 13 pages.
U.S. Appl. No. 16/436,049, Notice of Allowance dated Oct. 21, 2020, 8 pages.
U.S. Appl. No. 16/707,988, Corrected Notice of Allowability dated Jul. 26, 2021, 2 pages.
European Application No. 19737299.8, Office Action dated Jul. 7, 2021, 5 pages.
U.S. Appl. No. 16/899,908, Notice of Allowance dated Sep. 17, 2021, 11 pages.
Taiwan Application No. 107124385, Office Action dated Sep. 30, 2021, 17 pages (8 pages of Original Document and 9 pages of English Translation).
Advisory Action dated Oct. 8, 2020 for U.S. Appl. No. 16/210,748, filed Dec. 5, 2018, 4 Pages.
Amir M.F., et al., "3-D Stacked Image Sensor With Deep Neural Network Computation," IEEE Sensors Journal, IEEE Service Center, New York, NY, US, May 15, 2018, vol. 18 (10), pp. 4187-4199, XP011681876.
Chuxi L., et al., "A Memristor-Based Processing-in-Memory Architechture for Deep Convolutional Neural Networks Approximate Computation," Journal of Computer Research and Development, Jun. 30, 2017, vol. 54 (6), pp. 1367-1380.
Communication Pursuant Article 94(3) dated Dec. 23, 2021 for European Application No. 19744961.4, filed Jun. 28, 2019, 8 pages.
Communication Pursuant Article 94(3) dated Jan. 5, 2022 for European Application No. 19740456.9, filed Jun. 27, 2019, 12 pages.
Corrected Notice of Allowability dated Apr. 9, 2021 for U.S. Appl. No. 16/255,528, filed Jan. 23, 2019, 5 Pages.
Extended European Search Report for European Application No. 19743908.6, dated Sep. 30, 2020, 9 Pages.
Final Office Action dated Oct. 18, 2021 for U.S. Appl. No. 16/716,050, filed Dec. 16, 2019, 18 Pages.
Final Office Action dated Oct. 21, 2021 for U.S. Appl. No. 16/421,441, filed May 23, 2019, 23 Pages.
Final Office Action dated Jan. 27, 2021 for U.S. Appl. No. 16/255,528, filed Jan. 23, 2019, 31 Pages.
Final Office Action dated Jul. 28, 2021 for U.S. Appl. No. 17/083,920, filed Oct. 29, 2020, 19 Pages.
International Search Report and Written Opinion for International Application No. PCT/US2019/014904, dated Aug. 5, 2019, 7 Pages.
International Search Report and Written Opinion for International Application No. PCT/US2019/019765, dated Jun. 14, 2019, 9 Pages.
International Search Report and Written Opinion for International Application No. PCT/US2019/034007, dated Oct. 28, 2019, 18 Pages.
International Search Report and Written Opinion for International Application No. PCT/US2019/066805, dated Mar. 6, 2020, 9 Pages.
International Search Report and Written Opinion for International Application No. PCT/US2019/066831, dated Feb. 27, 2020, 11 Pages.
International Search Report and Written Opinion for International Application No. PCT/US2020/044807, dated Sep. 30, 2020, 12 Pages.
International Search Report and Written Opinion for International Application No. PCT/US2020/058097, dated Feb. 12, 2021, 09 Pages.
International Search Report and Written Opinion for International Application No. PCT/US2020/059636, dated Feb. 11, 2021, 18 Pages.
International Search Report and Written Opinion for International Application No. PCT/US2021/031201, dated Aug. 2, 2021, 13 Pages.
International Search Report and Written Opinion for International Application No. PCT/US2021/033321, dated Sep. 6, 2021, 11 pages.
International Search Report and Written Opinion for International Application No. PCT/US2021/041775, dated Nov. 29, 2021, 14 pages.
Millet L., et al., "A 5500-Frames/s 85-GOPS/W 3-D Stacked BSI Vision Chip Based on Parallel In-Focal-Plane Acquisition and Processing," IEEE Journal of Solid-State Circuits, USA, Apr. 1, 2019, vol. 54 (4), pp. 1096-1105, XP011716786.
Non-Final Office Action dated Jan. 1, 2021 for U.S. Appl. No. 16/715,792, filed Dec. 16, 2019, 15 Pages.
Non-Final Office Action dated Sep. 2, 2021 for U.S. Appl. No. 16/910,844, filed Jun. 24, 2020, 7 Pages.
Non-Final Office Action dated May 7, 2021 for U.S. Appl. No. 16/421,441, filed May 23, 2019, 17 Pages.

(56) References Cited

OTHER PUBLICATIONS

Non-Final Office Action dated Jul. 10, 2020 for U.S. Appl. No. 16/255,528, filed Jan. 23, 2019, 27 Pages.
Non-Final Office Action dated May 14, 2021 for U.S. Appl. No. 16/716,050, filed Dec. 16, 2019, 16 Pages.
Non-Final Office Action dated Apr. 21, 2021 for U.S. Appl. No. 16/453,538, filed Jun. 26, 2019, 16 Pages.
Non-Final Office Action dated Apr. 21, 2021 for U.S. Appl. No. 17/083,920, filed Oct. 29, 2020, 17 Pages.
Non-Final Office Action dated Oct. 21, 2021 for U.S. Appl. No. 17/083,920, filed Oct. 29, 2020, 19 Pages.
Non-Final Office Action dated ed Jul. 25, 2019 for U.S. Appl. No. 15/909,162, filed Mar. 1, 2018, 20 Pages.
Non-Final Office Action dated Apr. 27, 2021 for U.S. Appl. No. 16/829,249, filed Mar. 25, 2020, 9 Pages.
Notice of Allowance dated Apr. 1, 2021 for U.S. Appl. No. 16/255,528, filed Jan. 23, 2019, 7 Pages.
Notice of Allowance dated Nov. 2, 2021 for U.S. Appl. No. 16/453,538, filed Jun. 26, 2019, 8 Pages.
Notice of Allowance dated Dec. 8, 2021 for U.S. Appl. No. 16/829,249, filed Mar. 25, 2020, 6 pages.
Notice of Allowance dated Oct. 14, 2020 for U.S. Appl. No. 16/384,720, filed Apr. 15, 2019, 8 Pages.
Notice of Allowance dated Oct. 15, 2020 for U.S. Appl. No. 16/544,136, filed Aug. 19, 2019, 11 Pages.
Notice of Allowance dated Apr. 16, 2021 for U.S. Appl. No. 16/715,792, filed Dec. 16, 2019, 10 Pages.
Notice of Allowance dated Sep. 16, 2020 for U.S. Appl. No. 16/435,449, filed Jun. 7, 2019, 7 Pages.
Notice of Allowance dated Mar. 18, 2020 for U.S. Appl. No. 15/909,162, filed Mar. 1, 2018, 9 Pages.
Notice of Allowance dated Nov. 18, 2020 for U.S. Appl. No. 16/249,420, filed Jan. 16, 2019, 8 Pages.
Notice of Allowance dated Dec. 21, 2021 for U.S. Appl. No. 16/550,851, filed Aug. 26, 2019, 10 pages.
Notice of Allowance dated Oct. 21, 2020 for U.S. Appl. No. 16/436,049, filed Jun. 10, 2019, 8 Pages.
Notice of Allowance dated Dec. 22, 2021 for U.S. Appl. No. 16/910,844, filed Jun. 24, 2020, 7 pages.
Notice of Allowance dated Jan. 22, 2021 for U.S. Appl. No. 16/369,763, filed Mar. 29, 2019, 8 Pages.
Notice of Allowance dated Nov. 24, 2021 for U.S. Appl. No. 16/910,844, filed Jun. 24, 2020, 8 pages.
Notice of Allowance dated Aug. 25, 2021 for U.S. Appl. No. 16/715,792, filed Dec. 16, 2019, 9 Pages.
Notice of Allowance dated Aug. 26, 2020 for U.S. Appl. No. 16/384,720, filed Apr. 15, 2019, 8 Pages.
Notice of Allowance dated Aug. 30, 2021 for U.S. Appl. No. 16/829,249, filed Mar. 25, 2020, 8 pages.
Notice of Reason for Rejection dated Nov. 16, 2021 for Japanese Application No. 2019- 571699, filed Jun. 25, 2018, 13 pages.
Office Action dated Jul. 3, 2020 for Chinese Application No. 201810821296, filed Jul. 24, 2018, 17 Pages.
Office Action dated Jul. 7, 2021 for European Application No. 19723902.3, filed Apr. 1, 2019, 3 Pages.
Office Action dated Jul. 7, 2021 for European Application No. 19737299.8, filed Jun. 11, 2019, 5 Pages.
Office Action dated Mar. 9, 2021 for Chinese Application No. 201810821296, filed Jul. 24, 2018, 10 Pages.
Office Action dated Dec. 14, 2021 for Japanese Application No. 2019571598, filed Jun. 26, 2018, 12 pages.
Office Action dated Jun. 28, 2020 for Chinese Application No. 201810821296, filed Jul. 24, 2018, 2 Pages.
Partial International Search Report and Provisional Opinion for International Application No. PCT/US2021/041775, dated Oct. 8, 2021, 12 pages.
Restriction Requirement dated Feb. 2, 2021 for U.S. Appl. No. 16/716,050, filed Dec. 16, 2019, 7 Pages.

Sebastian A., et al., "Memory Devices and Applications for In-memory Computing," Nature Nanotechnology, Nature Publication Group, Inc, London, Mar. 30, 2020, vol. 15 (7), pp. 529-544, XP037194929.
Shi C., et al., "A 1000fps Vision Chip Based on a Dynamically Reconfigurable Hybrid Architecture Comprising a PE Array and Self-Organizing Map Neural Network," International Solid-State Circuits Conference, Session 7, Image Sensors, Feb. 10, 2014, pp. 128-130, XP055826878.
Snoeij M.F., et al., "A low Power col. Parallel 12-bit ADC for CMOS Imagers," XP007908033, Jun. 1, 2005, pp. 169-172.
Corrected Notice of Allowability dated Jul. 26, 2021 for U.S. Appl. No. 16/707,988, filed Dec. 9, 2019, 2 Pages.
Final Office Action dated Dec. 3, 2021 for U.S. Appl. No. 17/072,840, filed Oct. 16, 2020, 23 pages.
Final Office Action dated Jul. 12, 2021 for U.S. Appl. No. 16/435,451, filed Jun. 7, 2019, 13 Pages.
International Preliminary Report on Patentability for International Application No. PCT/US2020/044807, dated Feb. 17, 2022, 10 pages.
Non-Final Office Action dated Jul. 2, 2021 for U.S. Appl. No. 16/820,594, filed Mar. 16, 2020, 8 Pages.
Non-Final Office Action dated Jun. 8, 2021 for U.S. Appl. No. 17/072,840, filed Oct. 16, 2020, 7 Pages.
Notice of Allowance dated Nov. 3, 2020 for U.S. Appl. No. 16/566,583, filed Sep. 10, 2019, 11 Pages.
Notice of Allowance dated Jan. 7, 2022 for U.S. Appl. No. 16/899,908, filed Jun. 12, 2020, 10 pages.
Notice of Allowance dated Jul. 8, 2021 for U.S. Appl. No. 17/150,925, filed Jan. 15, 2021, 10 Pages.
Notice of Allowance dated Feb. 16, 2022 for U.S. Appl. No. 17/150,925, filed Jan. 15, 2021, 9 pages.
Notice of Allowance dated Nov. 17, 2021 for U.S. Appl. No. 16/899,908, filed Jun. 12, 2020, 7 Pages.
Notice of Allowance dated Sep. 17, 2021 for U.S. Appl. No. 16/899,908, filed Jun. 12, 2020, 11 Pages.
Notice of Allowance dated Nov. 22, 2021 for U.S. Appl. No. 16/820,594, filed Mar. 16, 2020, 18 pages.
Notice of Allowance dated Nov. 22, 2021 for U.S. Appl. No. 16/820,594, filed Mar. 16, 2020, 8 pages.
Notice of Allowance dated Oct. 25, 2021 for U.S. Appl. No. 16/435,451, filed Jun. 7, 2019, 8 Pages.
Advisory Action dated Oct. 1, 2021 for U.S. Appl. No. 17/083,920, filed Oct. 29, 2020, 4 pages.
Corrected Notice of Allowance dated Mar. 7, 2022 for U.S. Appl. No. 17/150,925, filed Jan. 15, 2021, 2 Pages.
International Search Report and Written Opinion for International Application No. PCT/US2021/054327, dated Feb. 14, 2022, 8 pages.
International Search Report and Written Opinion for International Application No. PCT/US2021/057966, dated Feb. 22, 2022, 15 pages.
Non-Final Office Action dated Mar. 2, 2022 for U.S. Appl. No. 17/127,670, filed Dec. 18, 2020, 18 pages.
Notice of Allowance dated Mar. 2, 2022 for U.S. Appl. No. 16/453,538, filed Jun. 26, 2019, 8 pages.
Notice of Allowance dated Feb. 14, 2022 for U.S. Appl. No. 16/715,792, filed Dec. 16, 2019, 9 pages.
Notice of Allowance dated Feb. 22, 2022 for U.S. Appl. No. 17/083,920, filed Oct. 29, 2020, 10 pages.
Notification of the First Office Action dated Oct. 28, 2021 for Chinese Application No. 2019800218483, filed Jan. 24, 2019, 17 pages.
Office Action dated Mar. 17, 2022 for Taiwan Application No. 20180124384, 26 pages.
Office Action dated Mar. 29, 2022 for Japanese Patent Application No. 2020520431, filed on Jun. 25, 2018, 10 pages.
International Search Report and Written Opinion for International Application No. PCT/US2021/065174 dated Mar. 28, 2022, 10 pages.
Office Action dated Mar. 15, 2022 for Japanese Patent Application No. 2020505830, filed on Aug. 9, 2018, 12 pages.

(56) References Cited

OTHER PUBLICATIONS

Notice of Allowance dated Mar. 7, 2022 for U.S. Appl. No. 16/421,441, filed May 23, 2019, 18 pages.
Notice of Allowance dated Mar. 11, 2022 for U.S. Appl. No. 16/716,050, filed Dec. 16, 2019, 13 pages.
Notice of Allowance dated Jul. 5, 2022 for U.S. Appl. No. 16/899,908, filed Jun. 12, 2020, 10 pages.
Notice of Allowance dated Jun. 8, 2022 for U.S. Appl. No. 17/150,925, filed Jan. 15, 2021, 10 pages.
Office Action for European Application No. 18179851.3, dated May 19, 2022, 7 pages.
Office Action dated Jul. 5, 2022 for Korean Application No. 10-2020-7002533, filed Jun. 25, 2018, 13 pages.
Office Action dated May 18, 2022 for Taiwan Application No. 108122878, 24 pages.
Office Action dated Jul. 12, 2022 for Japanese Application No. 2019-571699, filed Jun. 25, 2018, 5 pages.
Office Action dated Jul. 19, 2022 for Japanese Application No. 2019571598, filed Jun. 26, 2018, 10 pages.
Office Action dated Sep. 26, 2022 for Korean Patent Application No. 10-2020-7002496, filed on Jun. 26, 2018, 17 pages.
Notice of Allowance dated Oct. 21, 2022 for U.S. Appl. No. 16/899,908, filed Jun. 12, 2020, 10 pages.
Office Action dated Sep. 29, 2022 for Taiwan Application No. 108122878, filed Jun. 28, 2019, 9 pages.
Final Office Action dated Dec. 2, 2022 for U.S. Appl. No. 17/072,840, filed Oct. 16, 2020, 9 pages.
Notice of Allowance dated Nov. 21, 2022 for U.S. Appl. No. 17/242,152, filed Apr. 27, 2021, 10 pages.
Office Action dated Nov. 1, 2022 for Japanese Patent Application No. 2020-520431, filed on Jun. 25, 2018, 11 pages.
Office Action dated Nov. 15, 2022 for Taiwan Application No. 108120143, filed Jun. 11, 2019, 8 pages.
Office Action dated Aug. 30, 2022 for Japanese Patent Application No. 2020505830, filed on Aug. 9, 2018, 5 pages.
Corrected Notice of Allowability dated Jan. 9, 2023 for U.S. Appl. No. 17/150,925, filed Jan. 15, 2021, 8 pages.
Notice of Allowance dated Apr. 7, 2021 for U.S. Appl. No. 16/436,137, filed Jun. 10, 2019, 9 pages.
Notice of Allowance dated Dec. 9, 2022 for U.S. Appl. No. 16/435,451, filed Jun. 7, 2019, 8 pages.
Notice of Allowance dated Feb. 10, 2023 for U.S. Appl. No. 16/899,908, filed Jun. 12, 2020, 9 pages.
Notice of Allowance dated Dec. 13, 2022 for U.S. Appl. No. 16/820,594, filed Mar. 16, 2020, 5 pages.
Notice of Allowance dated Dec. 22, 2022 for U.S. Appl. No. 17/496,712, filed Oct. 7, 2021, 13 pages.
Office Action dated Nov. 2, 2022 for Taiwan Application No. 107128759, filed Aug. 17, 2018, 16 pages.
Office Action dated Dec. 1, 2022 for Korean Application No. 10-2020-7002306, filed Jun. 25, 2018, 13 pages.
Office Action dated Jan. 5, 2023 for Chinese Application No. 201980043907.7, filed Jun. 28, 2019, 14 pages.
Office Action dated Feb. 7, 2023 for Japanese Application No. 2019-571699, filed Jun. 25, 2018, 5 pages.
International Preliminary Report on Patentability for International Application No. PCT/US2021/054327, dated Apr. 20, 2023, 7 pages.
International Preliminary Report on Patentability for International Application No. PCT/US2021/057966, dated May 19, 2023, 12 pages.
Notice of Allowance dated Jun. 1, 2023 for U.S. Appl. No. 16/899,908, filed Jun. 12, 2020, 9 pages.
Notice of Allowance dated Mar. 1, 2023 for U.S. Appl. No. 17/242,152, filed Apr. 27, 2021, 9 pages.
Notice of Allowance dated Apr. 13, 2023 for U.S. Appl. No. 17/072,840, filed Oct. 16, 2020, 6 pages.
Notice of Allowance dated Apr. 24, 2023 for U.S. Appl. No. 17/496,712, filed Oct. 7, 2021, 12 pages.
Notice of Allowance dated Mar. 27, 2023 for U.S. Appl. No. 16/820,594, filed Mar. 16, 2020, 5 pages.
Office Action dated Jun. 1, 2023 for Korean Application No. 10-2020-7002306, filed Jun. 25, 2018, 3 pages.
Office Action dated Mar. 10, 2023 for Chinese Application No. 201880053600.0, filed Jun. 25, 2018, 10 pages.
Office Action dated Feb. 15, 2023 for Chinese Application No. 201980049477.X, filed Jun. 11, 2019, 19 pages.
Office Action dated Mar. 16, 2023 for Korean Patent Application No. 10-2020-7002496, filed on Jun. 26, 2018, 3 pages.
Office Action dated May 9, 2023 for Japanese Patent Application No. 2020-520431, filed on Jun. 25, 2018, 6 pages.
Office Action dated May 9, 2023 for Japanese Patent Application No. 2020-563959, filed on Nov. 12, 2020, 5 pages.
Notice of Allowance dated Oct. 2, 2023 for U.S. Appl. No. 16/435,451, filed Jun. 7, 2019, 10 pages.
Notice of Allowance dated Oct. 4, 2023 for U.S. Appl. No. 17/242,152, filed Apr. 27, 2021, 9 pages.
Corrected Notice of Allowance dated Aug. 9, 2023 for U.S. Appl. No. 17/072,840, filed Oct. 16, 2020, 3 pages.
International Preliminary Report on Patentability for International Application No. PCT/US2021/065174 dated Jul. 13, 2023, 9 pages.
Notice of Allowance dated Sep. 13, 2023 for U.S. Appl. No. 16/899,908, filed Jun. 12, 2020, 9 pages.
Notice of Allowance dated Jun. 16, 2023 for U.S. Appl. No. 17/242,152, filed Apr. 27, 2021, 9 pages.
Notice of Allowance dated Aug. 18, 2023 for U.S. Appl. No. 17/496,712, filed Oct. 7, 2021, 12 pages.
Notice of Allowance dated Jul. 19, 2023 for U.S. Appl. No. 16/820,594, filed Mar. 16, 2020, 5 pages.
Notice of Allowance dated Jun. 22, 2023 for U.S. Appl. No. 16/435,451, filed Jun. 7, 2019, 10 pages.
Notice of Allowance dated Jul. 31, 2023 for U.S. Appl. No. 17/072,840, filed Oct. 16, 2020, 6 pages.
Office Action dated Jul. 4, 2023 for Korean Application No. 10-2020-7002533, filed Jun. 25, 2018, 3 pages.
Office Action dated Jul. 4, 2023 for Japanese Application No. 2019571598, filed Jun. 26, 2018, 34 pages.

* cited by examiner

… erate, using the quantizer, the fourth value based on comparing the second voltage against a second ramping threshold voltage.

In one example, an apparatus is provided. The apparatus comprises: a first photodiode configured to generate a first charge in response to a first component of light within a first exposure period having a first duration; a second photodiode configured to generate a second charge in response to a second component of the light within a second exposure period having a second duration; a first charge sensing unit configured to accumulate at least a part of the first charge within the first exposure period; a second charge sensing unit configured to accumulate at least a part of the second charge within the second exposure period; a quantizer; and a controller configured to: determine, using the quantizer and within a first measurement period having a third duration, whether a first quantity of the at least a part of the first charge accumulated at the first charge sensing unit exceeds a first threshold, and a first time it takes for the first quantity to exceed the first threshold, wherein the first duration and the third duration are individually programmable; based on whether the first quantity exceeds the first threshold, output a first value representing the first time or a second value, from the quantizer, representing a second quantity of the first charge generated by the first photodiode within the first exposure period to represent an intensity of the first component of the light; determine, using the quantizer and within a second measurement period having a fourth duration, whether a third quantity of the at least a part of the second charge accumulated at the second charge sensing unit exceeds a second threshold, and a second time it takes for the second quantity to exceed the second threshold, wherein the second duration and the fourth duration are individually programmable; and based on whether the third quantity exceeds the second threshold, output a third value representing the second time or a fourth value, from the quantizer, representing a fourth quantity of the second charge generated by the second photodiode within the second exposure period to represent an intensity of the second component of the light.

In one aspect, the second measurement period overlaps in time with the first exposure period.

In one aspect, the controller is configured to determine, using the quantizer, the second value and the fourth value after the first measurement period and the second measurement period.

In one aspect, the at least a part of the first charge is a first part of the first charge. The at least a part of the second charge is a first part of the second charge. The first photodiode is configured to: accumulate a second part of the first charge as first residual charge until the first photodiode becomes saturated by the first residual charge; and output the first part of the first charge as first overflow charge to the first charge sensing unit when the first photodiode is saturated by the first residual charge. The second photodiode is configured to: accumulate a second part of the second charge as second residual charge until the second photodiode becomes saturated by the second residual charge; and output the first part of the second charge as second overflow charge to the second charge sensing unit when the second photodiode is saturated by the second residual charge. The controller is configured to: generate, using the quantizer, the first value based on measuring the first time it takes for the first quantity of the first overflow charge to exceed the first threshold; generate, using the quantizer, the second value based on measuring a quantity of the first overflow charge or a quantity of the first residual charge; generate, using the quantizer, the third value based on measuring the second time it takes for the second quantity of the second overflow charge to exceed the second threshold; and generate, using the quantizer, the fourth value based on measuring a quantity of the second overflow charge or a quantity of the second residual charge.

In one aspect, the apparatus further comprises a first memory and a second memory. The controller is configured: store a first indication that the first overflow charge exceeds the first threshold; based on the first indication, store the first value in the first memory and not to overwrite the first value with the second value in the first memory; store a second indication that the second overflow charge exceeds the second threshold; and based on the second indication, store the third value in the second memory and not to overwrite the third value with the fourth value in the second memory.

In one aspect, the second exposure period starts after the first measurement period ends.

In one aspect, the first photodiode and the second photodiode are part of a pixel cell. The first component and the second component of the light have different frequency ranges.

In one aspect, the first photodiode and the second photodiode are, respectively, of a first pixel cell and a second pixel cell. The first component and the second component of the light have the same frequency range.

In one aspect, the apparatus further comprises a third photodiode configured to generate and accumulate a third residual charge in response to a third component of the light within a third exposure period having a third duration. The controller is configured to determine, using a quantizer, a fifth value representing a fifth quantity of the third residual charge generated by the third photodiode within the third exposure period to represent an intensity of the third component of the light. The third exposure period starts after the first exposure period starts and after the second exposure period starts.

In one example, a method is provided. The method comprises: setting an exposure period to have a first duration; setting a measurement period to have a second duration, the measurement period being set separately from the exposure period; enabling a photodiode to generate a charge in response to light within the exposure period having the first duration; accumulating, at a charge sensing unit, at least a part of the charge within the exposure period; determining, using a quantizer and within the measurement period having a second duration, whether a first quantity of the at least a part of the charge accumulated at the charge sensing unit exceeds a threshold, and a time it takes for the first quantity to exceed the threshold, wherein the first duration and the second duration are individually programmed; and based on whether the first quantity exceeds the threshold, outputting a first value representing the time or a second value representing a second quantity of the charge generated by the photodiode within the exposure period to represent an intensity of the light.

In one example, a method is provided. The method comprises: setting a first exposure period to have a first duration; setting a first measurement period to have a second duration, the first measurement period being set separately from the first exposure period; setting a second exposure period to have a third duration; setting a second measurement period to have a fourth duration, the second measurement period being set separately from the second exposure period; enabling a first photodiode to generate a first charge in response to a first component of light within the first exposure period having the first duration; enabling a second photodiode to generate a second charge in response to a second component of the light within the second exposure period having the second duration; accumulating, by a first charge sensing unit, at least a part of the first charge within the first exposure period; accumulating, by a second charge sensing unit, at least a part of the second charge within the second exposure period; determining, using a quantizer and within the first measurement period having a third duration, whether a first quantity of the at least a part of the first charge accumulated at the first charge sensing unit exceeds a first threshold, and a first time it takes for the first quantity to exceed the first threshold; based on whether the first quantity exceeds the first threshold, outputting a first value representing the first time or a second value representing a second quantity of the first charge generated by the first photodiode within the first exposure period to represent an intensity of the first component of the light; determining, using the quantizer and within a second measurement period having a fourth duration, whether a third quantity of the at least a part of the second charge accumulated at the second charge sensing unit exceeds a second threshold, and a second time it takes for the second quantity to exceed the second threshold; and based on whether the third quantity exceeds the second threshold, outputting a third value representing the second time or a fourth value representing a fourth quantity of the second charge generated by the second photodiode within the second exposure period to represent an intensity of the second component of the light.

BRIEF DESCRIPTION OF THE DRAWINGS

Illustrative examples are described with reference to the following figures.

Figure 1A:
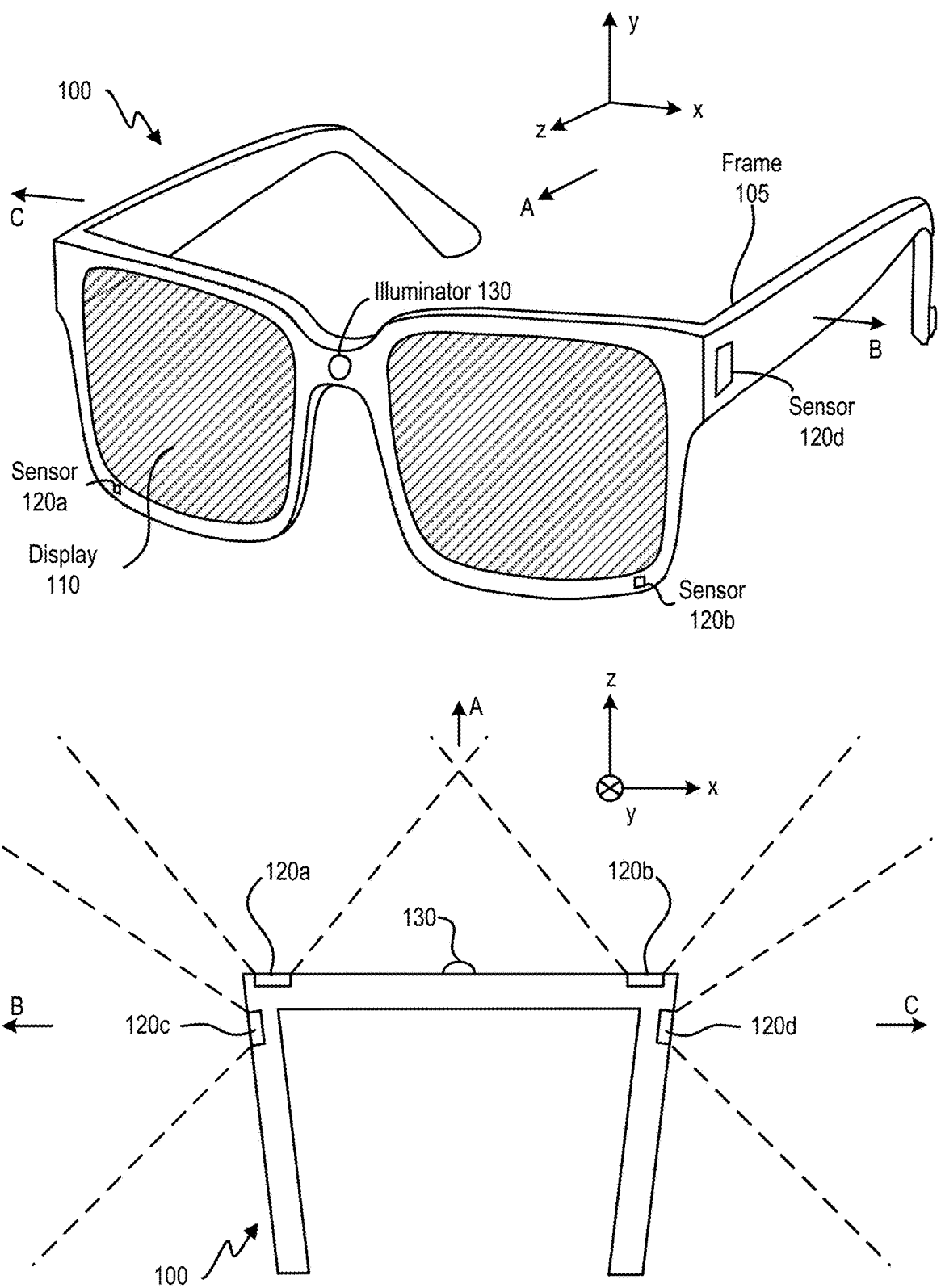
FIGS. 1A and 1B are diagrams of an example of a near-eye display.

The figures depict examples of the present disclosure for purposes of illustration only. One skilled in the art will readily recognize from the following description that alternative examples of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive examples. However, it will be apparent that various examples may be practiced without these specific details. The figures and description are not intended to be restrictive.

A typical image sensor includes an array of pixel cells. Each pixel cell includes a photodiode to measure the intensity incident light by converting photons into charge (e.g., electrons or holes). The charge generated by the photodiode can be converted to a voltage by a charge sensing unit, which can include a floating drain node. The voltage can be quantized by an analog-to-digital converter (ADC) into a digital value. The digital value can represent an intensity of light received by the pixel cell and can form a pixel, which can correspond to light received from a spot of a scene. An image comprising an array of pixels can be derived from the digital outputs of the array of pixel cells.

An image sensor can be used to perform different modes of imaging, such as 2D and 3D sensing. The 2D and 3D sensing can be performed based on light of different wavelength ranges. For example, visible light can be used for 2D sensing, whereas invisible light (e.g., infra-red light) can be used for 3D sensing. An image sensor may include an optical filter array to allow visible light of different optical wavelength ranges and colors (e.g., red, green, blue, monochrome, etc.) to a first set of pixel cells assigned for 2D sensing, and invisible light to a second set of pixel cells assigned for 3D sensing.

To perform 2D sensing, a photodiode at a pixel cell can generate charge at a rate that is proportional to an intensity of visible light component (e.g., red, green, blue, monochrome, etc.) incident upon the pixel cell, and the quantity of charge accumulated in an exposure period can be used to represent the intensity of visible light (or a certain color component of the visible light). The charge can be stored temporarily at the photodiode and then transferred to a capacitor (e.g., a floating diffusion) to develop a voltage. The voltage can be sampled and quantized by an analog-to-digital converter (ADC) to generate an output corresponding to the intensity of visible light. An image pixel value can be generated based on the outputs from multiple pixel cells configured to sense different color components of the visible light (e.g., red, green, and blue colors).

Moreover, to perform 3D sensing, light of a different wavelength range (e.g., infra-red light) can be projected onto an object, and the reflected light can be detected by the pixel cells. The light can include structured light, light pulses, etc. The pixel cells outputs can be used to perform depth sensing operations based on, for example, detecting patterns of the reflected structured light, measuring a time-of-flight of the light pulse, etc. To detect patterns of the reflected structured light, a distribution of quantities of charge generated by the pixel cells during the exposure period can be determined, and pixel values can be generated based on the voltages corresponding to the quantities of charge. For time-of-flight measurement, the timing of generation of the charge at the photodiodes of the pixel cells can be determined to represent the times when the reflected light pulses are received at the pixel cells. Time differences between when the light pulses are projected to the object and when the reflected light pulses are received at the pixel cells can be used to provide the time-of-flight measurement.

A pixel cell array can be used to generate information of a scene. In some examples, each pixel cell (or at least some of the pixel cells) of the pixel cell array can be used to perform collocated 2D and 3D sensing at the same time. For example, a pixel cell may include multiple photodiodes each configured to convert a different spectral component of light to charge. For 2D sensing, a photodiode can be configured to convert visible light (e.g., monochrome, or for a color of a particular frequency range) to charge, whereas another photodiode can be configured to convert infra-red light to charge for 3D sensing. Having the same set of pixel cells to perform sensing of different spectral components of light can facilitate the correspondence between 2D and 3D images of different spectral components of light generated by the pixel cells. Moreover, given that every pixel cell of a pixel cell array can be used to generate the image, the full spatial resolution of the pixel cell array can be utilized for the imaging.

The 2D and 3D imaging data can be fused for various applications that provide virtual-reality (VR), augmented-reality (AR) and/or mixed reality (MR) experiences. For example, a wearable VR/AR/MR system may perform a scene reconstruction of an environment in which the user of the system is located. Based on the reconstructed scene, the VR/AR/MR can generate display effects to provide an interactive experience. To reconstruct a scene, the 3D image data can be used to determine the distances between physical objects in the scene and the user. Moreover, 2D image data can capture visual attributes including textures, colors, and reflectivity of these physical objects. The 2D and 3D image data of the scene can then be merged to create, for example, a 3D model of the scene including the visual attributes of the objects. As another example, a wearable VR/AR/MR system can also perform a head tracking operation based on a fusion of 2D and 3D image data. For example, based on the 2D image data, the VR/AR/AR system can extract certain image features to identify an object. Based on the 3D image data, the VR/AR/AR system can track a location of the identified object relative to the wearable device worn by the user. The VR/AR/AR system can track the head movement based on, for example, tracking the change in the location of the identified object relative to the wearable device as the user's head moves.

To improve the correlation of 2D and 3D image data, an array of pixel cells can be configured to provide collocated imaging of different components of incident light from a spot of a scene. Specifically, each pixel cell can include a plurality of photodiodes, and a plurality of corresponding charge sensing units. Each photodiode of the plurality of photodiodes is configured to convert a different light component of incident light to charge. To enable the photodiodes to receive different light components of the incident light, the photodiodes can be formed in a stack which provides different absorption distances for the incident light for different photodiodes, or can be formed on a plane under an array of optical filters. Each charge sensing unit includes one or more capacitors to sense the charge of the corresponding photodiode by converting the charge to a voltage, which can be quantized by an ADC to generate a digital representation of an intensity of an incident light component converted by each photodiode. The ADC includes a comparator. As part of a quantization operation, the comparator can compare the voltage with a reference to output a decision. The output of the comparator can control when a memory stores a value from a free-running counter. The value can provide a result of quantizing the voltage.

One major challenge of including multiple photodiodes in a pixel cell is how to reduce the size and power consumption of the pixel cell, which can impact a number of pixel cells that can be fit into a pixel cell array. The number of pixel cells in a pixel cell array can dominate the available resolution of the imaging. Specifically, in addition to the photodiodes, a pixel cell may include processing circuits to support measurement of the charge generated by each photodiode and to support the generation of a pixel value based on the measurements. Moreover, each pixel cell may also include memory devices (e.g., static random-access memory (SRAM)) to store the measurement results while waiting to fetch the measurement results to the VR/AR/AR application for processing. The processing circuits and memory devices typically have considerable footprints and consume considerable amounts of power. For example, a pixel cell may include a charge sensing unit, which includes one or more charge storage devices (e.g., a floating drain node, a capacitor, etc.) to store the charge generated by a photodiode and to convert the charge to a voltage, and a buffer to buffer the voltage. Moreover, the processing circuits may include a quantizer to quantize the voltage to a digital value. The quantizer typically includes a comparator which includes analog circuits (e.g., differential pair, output stage, current source, etc.), which have large footprints and consume lots of power. Further, the memory devices typically include multiple memory banks (e.g., SRAM cells) to store the bits of the measurement result. The memory devices have significant footprints and can consume lots of power, especially if the memory devices are constructed using high bandwidth transistor devices to improve the operation speed. To reduce the footprint and power consumption of the image sensor, and to include photodiodes in the image sensor to improve resolution, the processing circuits and memory devices can be shared among groups of the photodiodes. Each photodiode within the group can take turn in accessing the processing circuits to measure the charge generated by the photodiode, and accessing the memory to store the measurement result.

Besides footprint and power, there are other performance metrics of an image sensor, such as dynamic range, power, frame rate, etc. The dynamic range can refer to a range of light intensities measurable by the image sensor. For dynamic range, the upper limit can be defined based on the linearity of the light intensity measurement operation provided by the image sensor, whereas the lower limit can be defined based on the noise signals (e.g., dark charge, thermal noise, etc.) that affect the light intensity measurement operation. On the other hand, various factors can affect the frame rate, which can refer to the amount of time it takes for the image sensor to generate an image frame. The factors may include, for example, the time of completion of the quantization operation, various delays introduced to the quantization operation, etc.

To increase the dynamic range of the light intensity measurement operation, the ADC can quantize the voltages based on different quantization operations associated with different intensity ranges. Specifically, each photodiode can generate a quantity of charge within an exposure period, with the quantity of charge representing the incident light intensity. Each photodiode also has a quantum well to store at least some of the charge as residual charge. The quantum well capacity can be set based on a bias voltage on the switch between the photodiode and the charge sensing unit. For a low light intensity range, the photodiode can store the entirety of the charge as residual charge in the quantum well. In a PD ADC quantization operation, the ADC can quantize a first voltage generated by the charge sensing unit from sensing a quantity of the residual charge to provide a digital representation of the low light intensity. As the residual charge is typically much less susceptible to dark current in the photodiode, the noise floor of the low light intensity measurement can be lowered, which can further extend the lower limit of the dynamic range.

Moreover, for a medium light intensity range, the quantum well can be saturated by the residual charge, and the photodiode can transfer the remaining charge as overflow charge to the charge sensing unit, which can generate a second voltage from sensing a quantity of the overflow charge. In a FD ADC quantization operation, the ADC can quantize the second voltage to provide a digital representation of the medium light intensity. For both low and medium light intensities, the one or more capacitors in the charge sensing unit are not yet saturated, and the magnitudes of the first voltage and second voltage correlate with the light intensity. Accordingly for both low and medium light intensities, the comparator of the ADC can compare the first voltage or second voltage against a ramping voltage to generate a decision. The decision can control the memory to store a counter value which can represent a quantity of residual charge or overflow charge.

For a high light intensity range, the overflow charge can saturate the one or more capacitors in the charge sensing unit. As a result, the magnitudes of the second voltage no longer tracks the light intensity, and non-linearity can be introduced to the light intensity measurement. To reduce the non-linearity caused by the saturation of the capacitors, the ADC can perform a time-to-saturation (TTS) measurement operation within the exposure period by comparing the second voltage, which can keep rising or falling as additional charge is accumulated at the charge sensing unit, with a static threshold to generate a decision. When the second voltage reaches the static threshold, a decision can be generated to control the memory to store a counter value. The counter value can represent a time when the second voltage reaches a saturation threshold.

Compared with FD ADC and PD ADC in which the counter value can be linearly related to the incident light intensity, in TTS measurement the counter value can be non-linearly related to the incident light intensity, where the second voltage reaches the static threshold within a shorter time when the incident light intensity increases and vice versa. Moreover, the duration of the TTS measurement operation, as well as the duration of the exposure period, are typically controlled by a controller based on a clock signal supplied to the controller. In some examples, the controller can completely align the TTS measurement operation with the exposure period, such that they start and end at the same time to have the same duration, and the duration can be set based on the cycle period of the clock signal. The cycle period of the clock signal can be set based on a target operation speed of the controller, which can be adjusted based on, for example, a frame rate, a power target, etc., of the image sensor.

Although the TTS measurement operation can reduce the non-linearity caused by the saturation of the capacitors and increase the upper limit of the dynamic range, various issues can arise if the TTS measurement period aligns completely, or at least scales up linearly, with the exposure period. One potential issue is power consumption. Specifically, during the TTS measurement operation both the voltage buffer of the charge sensing unit and the comparator of the ADC are powered on to compare the second voltage with the static threshold to generate the decision. Both the voltage buffer and the comparator are analog devices and can consume huge static power when powered on. If the exposure period has a relatively long duration, and the TTS measurement operation is performed within the entirety of the exposure period, both the voltage buffer and the comparator can consume huge amount of power for a long period of time, leading to huge power consumption at the image sensor. The exposure period for the photodiode can be extended due to various reasons. For example, as explained above, the exposure period can be extended due to a lower operation speed of the controller for a lower frame rate, a reduced power target, etc., of the image sensor. Moreover, in a case where the image sensor operates in a low ambient light environment, the exposure period can be extended to allow the photodiode to generate more charge within the exposure period for measurement, which can reduce the signal-to-noise ratio.

In addition, performing the TTS measurement within the entirety of the exposure period may allow only one photodiode, within a group of photodiodes that shares a quantizer, to perform the TTS measurement operation. This can create differences in dynamic ranges among the photodiodes. Specifically, to support a global shutter operation, it is desirable to have each photodiode of an image sensor to perform measurement of light within the same exposure period, or within exposure periods that are substantially aligned in time. But if a group of photodiodes shares a quantizer, and one photodiode uses the quantizer to perform the TTS measurement within the entirety of the exposure period, other photodiodes may be unable to perform the TTS measurement within that exposure period. As a result, only one photodiode can use TTS measurement operation to extend the upper limit of dynamic range, while other photodiodes cannot, which can lead to different dynamic ranges among the photodiodes. In a case where different photodiodes within a group measure different frequency components of light, such arrangements can lead to uneven performances of the image sensor in measuring the different frequency components of incident light.

The present disclosure relates to an image sensor that can address at least some of the issues above. In one example, the image sensor includes a pixel cell, which can include a photodiode, a charge sensing unit, a quantizer, and a controller. The photodiode is configured to generate a charge in response to light within an exposure period having a first duration. The photodiode can accumulate at least a part of the charge as residual charge, and then output the remaining charge as overflow charge after the photodiode becomes saturated by the residual charge. The charge sensing unit is configured to accumulate the overflow charge output by the photodiode within the exposure period. The controller is configured to determine, using the quantizer and within a TTS (time-to-saturation) measurement period having a second duration, whether a first quantity of the overflow charge accumulated at the charge sensing unit exceeds a threshold, and a TTS measurement for the first quantity to exceed the threshold. The controller is further configured to, based on whether the first quantity exceeds the threshold, output a first value representing the TTS measurement, or a second value representing a second quantity of the charge (the residual charge, the overflow charge, etc.) generated by the photodiode within the exposure period, to represent an intensity of the light. The second value can be generated based on, for example, the aforementioned FD ADC (to measure a quantity of the overflow charge) and PD ADC (to measure a quantity of the residual charge) operations. The first value and the second value can generated by a counter based on a timing of the decision of the quantizer.

In the present disclosure, the second duration of the TTS measurement period can be programmed separately from the first duration of the exposure period, such that when the first duration of the exposure period is increased (e.g., due to a lower operation speed of the controller, to enable the photodiode to generate more charge in a low ambient light environment, etc.), the second duration of the TTS measurement period can remain fixed, or at least does not increase by the same amount or by the same proportion. Various techniques are proposed to allow the duration of the TTS measurement operation to be set separately from the duration of the exposure period. Specifically, TTS duration setting and exposure period setting can be supplied from separate registers, which allow the two settings to be individually programmable. In addition, the controller and the counter can operate on clock signals of different frequencies, such that when the clock frequency of the controller increases to increase the exposure period, the duration of the TTS operation can remain fixed or at least do not increase by the same proportion.

In addition, the second duration of the TTS measurement period can set a lower limit of the first duration of the exposure period. This can ensure that the exposure period does not end during the TTS measurement period. The second duration of the TTS measurement period can be set based on, for example, a frequency of the counter clock, the bit resolution of the TTS operation, etc. Specifically, the second duration can be set to allow the counter to sweep through the entire range of counter values representing the range of TTS measurement results, which in turn represents the number of bits used to represent the TTS measurement. On the other hand, the first duration of the exposure period can be increased without the corresponding increase in the second duration of the TTS measurement period, as long as the first duration exceeds the second duration.

Various techniques are proposed to improve the performance of the image sensor based on the difference in durations between the TTS measurement period and the exposure period. For example, various components of the processing circuit, such as the voltage buffer of the charge sensing unit, the comparator of the ADC, etc., can be disabled between the end of the TTS measurement period and the end of the exposure period. With such arrangement, the exposure period of the photodiode can be extended without corresponding increase in the power consumption of the image sensor. Moreover, in a case where the charge in the charge sensing unit exceeds the saturation threshold and the TTS is measured, the image sensor can also provide the TTS measurement before the exposure period ends. This can reduce the latency in providing the light intensity measurement results and allow the application that consumes the light intensity measurement results to operate at a higher speed.

As another example, the threshold for saturation detection (and TTS measurement) can be scaled from a reference threshold. The reference threshold can correspond to a case where the exposure period and the TTS measurement period have the same duration. The scaling can be based on a ratio between the first duration and the second duration. The reduced threshold can account for the fact that the total quantity of charge generated by the photodiode within the TTS measurement period is less than within the exposure period. As the subsequent FD ADC and PD ADC operations measure the total quantity of charge generated by the photodiode within the exposure period, while the TTS measurement is based on a reduced quantity of charge generated within the shortened TTS measurement period, scaling the threshold can reduce the dead zone in the range of light intensity to be measured, such that the intensity range of detection is not (or less) affected by the shortened TTS measurement period.

In another example, an image sensor can include a first photodiode and a second photodiode. The first photodiode is configured to generate a first charge in response to a first component of light within a first exposure period having a first duration. The first photodiode can accumulate at least a part of the first charge as first residual charge, and then output the remaining first charge as first overflow charge after the first photodiode becomes saturated by the first residual charge. The second photodiode is configured to generate a second charge in response to a second component of the light within a second exposure period having a second duration. The second photodiode can accumulate at least a part of the second charge as second residual charge, and then output the remaining second charge as second overflow charge after the second photodiode becomes saturated by the second residual charge. In some examples, the two photodiodes can be part of a pixel cell to detect different frequency components of the incident light (e.g., different color components, visible component versus infra-red components, etc.) for collocated 2D/3D sensing, in which case the first component and the second component can have different frequency ranges. In some examples, the two photodiodes can be of different pixel cells and configured to detect the same frequency component of the incident light, in which case the first component and the second component can have the same frequency range.

The image sensor further includes a first charge sensing unit, a second charge sensing unit, a quantizer, and a controller. The first charge sensing unit is configured to accumulate the first overflow charge within the first exposure period, whereas the second charge sensing unit is configured to accumulate the second overflow charge within the second exposure period. The controller can determine, using the quantizer and within a first TTS measurement period having a third duration, whether a first quantity of the at least a part of the first charge accumulated at the first charge sensing unit exceeds a first threshold, and a first TTS it takes for the first quantity to exceed the first threshold. Based on whether the first quantity exceeds the first threshold, the controller can output a first value representing the first TTS or a second value representing a second quantity of the first charge generated by the first photodiode within the first exposure period to represent an intensity of the first component of the light. Moreover, the controller can determine, using the quantizer and within a second TTS measurement period having a fourth duration, whether a third quantity of the at least a part of the second charge accumulated at the second charge sensing unit exceeds a second threshold, and a second TTS it takes for the second quantity to exceed the second threshold. Based on whether the third quantity exceeds the second threshold, the controller can output a third value representing the second TTS or a fourth value representing a fourth quantity of the second charge generated by the second photodiode within the second exposure period to represent an intensity of the second component of the light.

As in the previous examples of the present disclosure, the second duration of the first TTS measurement period can be individually programmable from the first duration of the first exposure period, such that when the first duration of the first exposure period is increased (e.g., to accommodate a lower operation speed of the controller, to enable the photodiode to generate more charge in a low ambient light environment, etc.), the second duration of the first TTS measurement period can remain fixed, or at least does not increase by the same amount or by the same proportion. Likewise, the third duration of the second TTS measurement period can be individually programmable from the fourth duration of the second exposure period, such that when the third duration of the second exposure period is increased, the fourth duration of the second TTS measurement period can also remain fixed, or at least does not increase by the same amount or by the same proportion. As in the previous examples, the first threshold and the second threshold for saturation detection can be scaled according to, respectively, the ratio between the first duration and the third duration (for the first photodiode) and the ratio between the second duration and the fourth duration (for the second photodiode).

In some examples, the first exposure period of the first photodiode can be extended to overlap with both first and second TTS measurement periods, such that a TTS measurement operation can be performed for each photodiode within the first exposure period. This allows the upper limit of dynamic range to be extended for both photodiodes, which can provide a more uniform detection performance among photodiodes that share a quantizer. Moreover, the second exposure period for the second photodiode (which includes the second TTS measurement periods) can overlap substantially with the first exposure period for the first photodiode, which can improve the global shutter operation of the image sensor. Following the first TTS measurement period and the second TTS measurement period, the controller can use the quantizer to perform FD ADC and/or PD ADC operations to generate the second value for the first photodiode, and output the second value if the first overflow charge (if any) does not exceed the first threshold. Moreover, the controller can also use the quantizer to perform FD ADC and/or PD ADC operations to generate the fourth value for the second photodiode, and output the fourth value if the second overflow charge (if any) does not exceed the second threshold.

In some examples, the image sensor can include a first memory and a second memory to store the intensity measurement results of, respectively, the first photodiode and the second photodiode. Based on determining that the first overflow charge exceeds the first threshold, the controller can store the first value from the TTS operation for the first photodiode in the first memory. Moreover, based on determining that the second overflow charge exceeds the second threshold, the controller can store the third value from the TTS operation for the second photodiode in the second memory. The controller can also include a first output logic circuit for the first memory and a second output logic circuit for the second memory. The first output logic circuit can store a first indication that the first overflow charge exceeds the first threshold, whereas the second output logic circuit can store a second indication that the second overflow charge exceeds the second threshold. Based on the first indication, the controller can either stop the subsequent FD ADC and PD ADC operations for the first photodiode, or at least not to overwrite the first value in the first memory with the second value from the FD ADC/PD ADC operations. Moreover, based on the second indication, the controller can either stop the subsequent FD ADC and PD ADC operations for the second photodiode, or at least not to overwrite the third value in the second memory with the fourth value from the FD ADC/PD ADC operations. In some examples, as described above, based on the first and second indications, the controller can perform a read out of the first value and the third value from, respectively, the first memory and the second memory, before the first and second exposure periods end. This can reduce the latency in providing the light intensity measurement results and allow the application that consumes the light intensity measurement results to operate at a higher speed. All these can improve the performances of the image sensor and the system that uses the outputs of the image sensor.

The disclosed techniques may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some examples, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1A is a diagram of an example of a near-eye display 100. Near-eye display 100 presents media to a user. Examples of media presented by near-eye display 100 include one or more images, video, and/or audio. In some examples, audio is presented via an external device (e.g., speakers and/or headphones) that receives audio information from the near-eye display 100, a console, or both, and presents audio data based on the audio information. Near-eye display 100 is generally configured to operate as a virtual reality (VR) display. In some examples, near-eye display 100 is modified to operate as an augmented reality (AR) display and/or a mixed reality (MR) display.

Near-eye display 100 includes a frame 105 and a display 110. Frame 105 is coupled to one or more optical elements.

Display 110 is configured for the user to see content presented by near-eye display 100. In some examples, display 110 comprises a waveguide display assembly for directing light from one or more images to an eye of the user.

Near-eye display 100 further includes image sensors 120a, 120b, 120c, and 120d. Each of image sensors 120a, 120b, 120c, and 120d may include a pixel array configured to generate image data representing different fields of views along different directions. For example, sensors 120a and 120b may be configured to provide image data representing two fields of view towards a direction A along the Z axis, whereas sensor 120c may be configured to provide image data representing a field of view towards a direction B along the X axis, and sensor 120d may be configured to provide image data representing a field of view towards a direction C along the X axis.

In some examples, sensors 120a-120d can be configured as input devices to control or influence the display content of the near-eye display 100, to provide an interactive VR/AR/MR experience to a user who wears near-eye display 100. For example, sensors 120a-120d can generate physical image data of a physical environment in which the user is located. The physical image data can be provided to a location tracking system to track a location and/or a path of movement of the user in the physical environment. A system can then update the image data provided to display 110 based on, for example, the location and orientation of the user, to provide the interactive experience. In some examples, the location tracking system may operate a SLAM algorithm to track a set of objects in the physical environment and within a view of field of the user as the user moves within the physical environment. The location tracking system can construct and update a map of the physical environment based on the set of objects, and track the location of the user within the map. By providing image data corresponding to multiple fields of views, sensors 120a-120d can provide the location tracking system a more holistic view of the physical environment, which can lead to more objects to be included in the construction and updating of the map. With such an arrangement, the accuracy and robustness of tracking a location of the user within the physical environment can be improved.

In some examples, near-eye display 100 may further include one or more active illuminators 130 to project light into the physical environment. The light projected can be associated with different frequency spectrums (e.g., visible light, infra-red light, ultra-violet light, etc.), and can serve various purposes. For example, illuminator 130 may project light in a dark environment (or in an environment with low intensity of infra-red light, ultra-violet light, etc.) to assist sensors 120a-120d in capturing images of different objects within the dark environment to, for example, enable location tracking of the user. Illuminator 130 may project certain markers onto the objects within the environment, to assist the location tracking system in identifying the objects for map construction/updating.

In some examples, illuminator 130 may also enable stereoscopic imaging. For example, one or more of sensors 120a or 120b can include both a first pixel array for visible light sensing and a second pixel array for infra-red (IR) light sensing. The first pixel array can be overlaid with a color filter (e.g., a Bayer filter), with each pixel of the first pixel array being configured to measure intensity of light associated with a particular color (e.g., one of red, green or blue colors). The second pixel array (for IR light sensing) can also be overlaid with a filter that allows only IR light through, with each pixel of the second pixel array being configured to measure intensity of IR lights. The pixel arrays can generate an RGB image and an IR image of an object, with each pixel of the IR image being mapped to each pixel of the RGB image. Illuminator 130 may project a set of IR markers on the object, the images of which can be captured by the IR pixel array. Based on a distribution of the IR markers of the object as shown in the image, the system can estimate a distance of different parts of the object from the IR pixel array, and generate a stereoscopic image of the object based on the distances. Based on the stereoscopic image of the object, the system can determine, for example, a relative position of the object with respect to the user, and can update the image data provided to display 100 based on the relative position information to provide the interactive experience.

As discussed above, near-eye display 100 may be operated in environments associated with a very wide range of light intensity. For example, near-eye display 100 may be operated in an indoor environment or in an outdoor environment, and/or at different times of the day. Near-eye display 100 may also operate with or without active illuminator 130 being turned on. As a result, image sensors 120a-120d may need to have a wide dynamic range to be able to operate properly (e.g., to generate an output that correlates with the intensity of incident light) across a very wide range of light intensity associated with different operating environments for near-eye display 100.

Figure 1B:
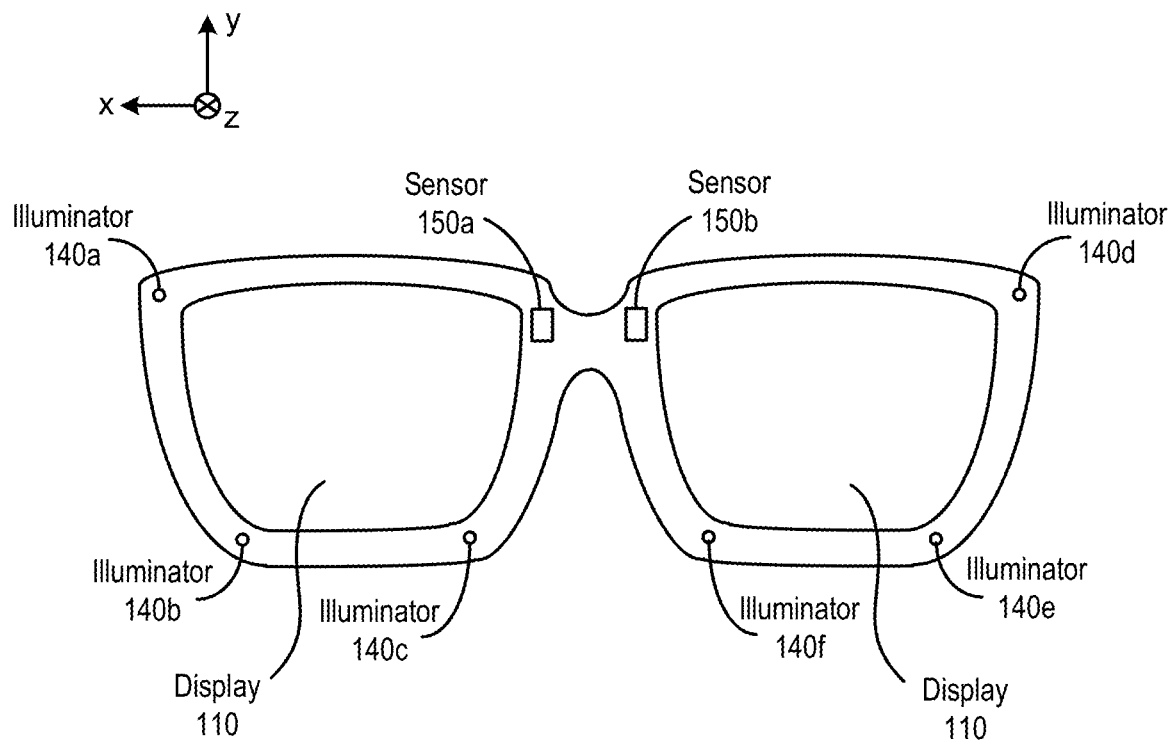

FIG. 1B is a diagram of another example of near-eye display 100. FIG. 1B illustrates a side of near-eye display 100 that faces the eyeball(s) 135 of the user who wears near-eye display 100. As shown in FIG. 1B, near-eye display 100 may further include a plurality of illuminators 140a, 140b, 140c, 140d, 140e, and 140f. Near-eye display 100 further includes a plurality of image sensors 150a and 150b. Illuminators 140a, 140b, and 140c may emit lights of certain frequency range (e.g., NIR) towards direction D (which is opposite to direction A of FIG. 1A). The emitted light may be associated with a certain pattern, and can be reflected by the left eyeball of the user. Sensor 150a may include a pixel array to receive the reflected light and generate an image of the reflected pattern. Similarly, illuminators 140d, 140e, and 140f may emit NIR lights carrying the pattern. The NIR lights can be reflected by the right eyeball of the user, and may be received by sensor 150b. Sensor 150b may also include a pixel array to generate an image of the reflected pattern. Based on the images of the reflected pattern from sensors 150a and 150b, the system can determine a gaze point of the user, and update the image data provided to display 100 based on the determined gaze point to provide an interactive experience to the user.

As discussed above, to avoid damaging the eyeballs of the user, illuminators 140a, 140b, 140c, 140d, 140e, and 140f are typically configured to output lights of very low intensities. In a case where image sensors 150a and 150b comprise the same sensor devices as image sensors 120a-120d of FIG. 1A, the image sensors 120a-120d may need to be able to generate an output that correlates with the intensity of incident light when the intensity of the incident light is very low, which may further increase the dynamic range requirement of the image sensors.

Moreover, the image sensors 120a-120d may need to be able to generate an output at a high speed to track the movements of the eyeballs. For example, a user's eyeball can perform a very rapid movement (e.g., a saccade movement) in which there can be a quick jump from one eyeball position to another. To track the rapid movement of the user's eyeball, image sensors 120a-120d need to generate images of the eyeball at high speed. For example, the rate at which the image sensors generate an image frame (the frame rate) needs to at least match the speed of movement of the eyeball. The high frame rate requires short total exposure period for all of the pixel cells involved in generating the image frame, as well as high speed for converting the sensor outputs into digital values for image generation. Moreover, as discussed above, the image sensors also need to be able to operate at an environment with low light intensity.

Figure 1B:
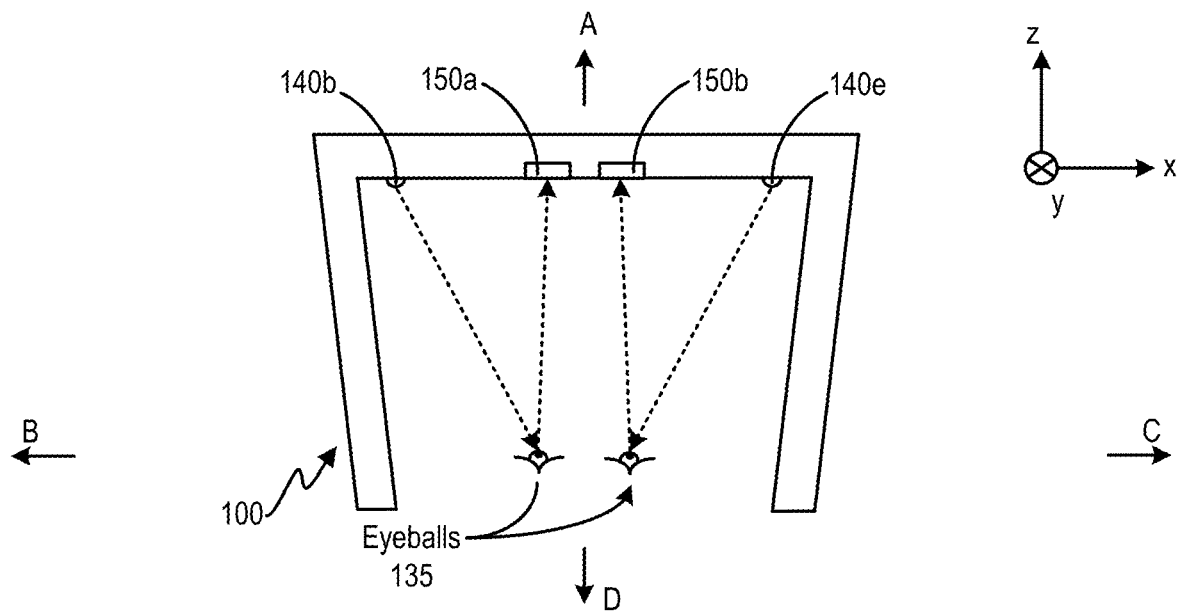
Figure 2:
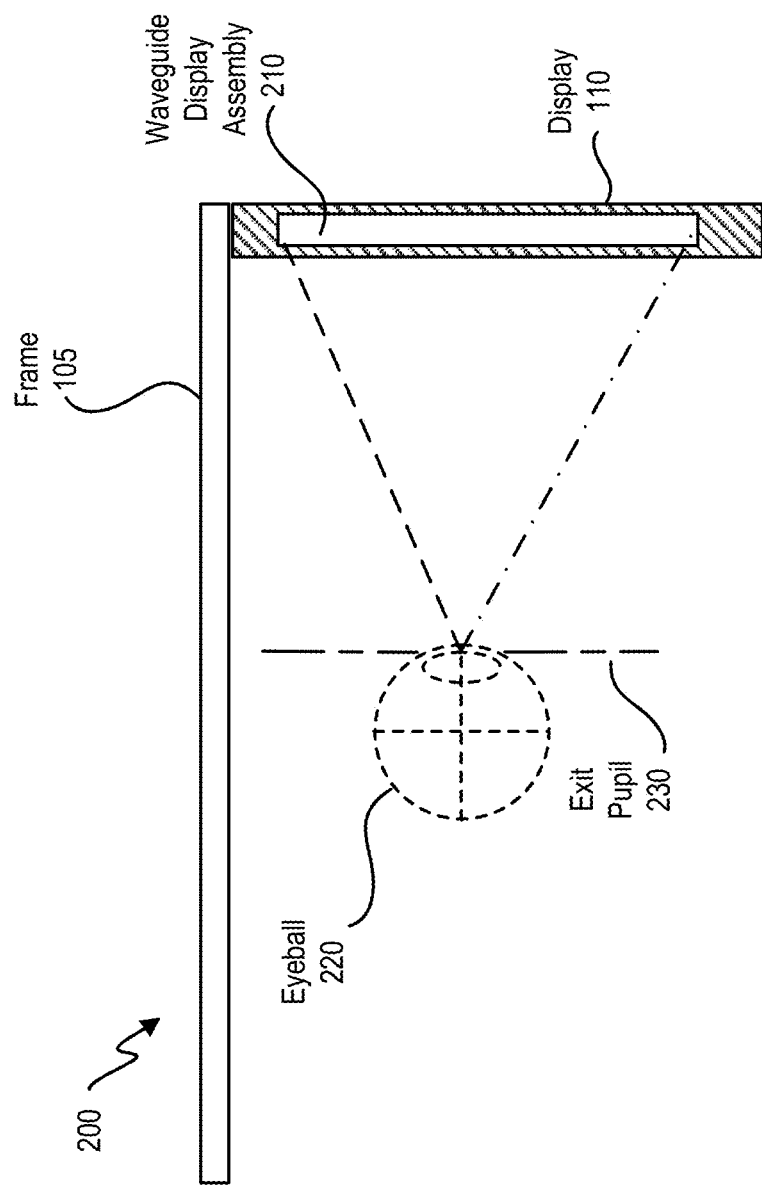
FIG. 2 is an example of a cross section of the near-eye display.

FIG. 2 is an example of a cross section 200 of near-eye display 100 illustrated in FIG. 1. Display 110 includes at least one waveguide display assembly 210. An exit pupil 230 is a location where a single eyeball 220 of the user is positioned in an eyebox region when the user wears the near-eye display 100. For purposes of illustration, FIG. 2 shows the cross section 200 associated eyeball 220 and a single waveguide display assembly 210, but a second waveguide display is used for a second eye of a user.

Waveguide display assembly 210 is configured to direct image light to an eyebox located at exit pupil 230 and to eyeball 220. Waveguide display assembly 210 may be composed of one or more materials (e.g., plastic, glass, etc.) with one or more refractive indices. In some examples, near-eye display 100 includes one or more optical elements between waveguide display assembly 210 and eyeball 220.

In some examples, waveguide display assembly 210 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g., multi-planar colored display). In some configurations, the stacked waveguide display is a monochromatic display that can be projected on multiple planes (e.g., multi-planar monochromatic display). The varifocal waveguide display is a display that can adjust a focal position of image light emitted from the waveguide display. In alternate examples, waveguide display assembly 210 may include the stacked waveguide display and the varifocal waveguide display.

Figure 3:
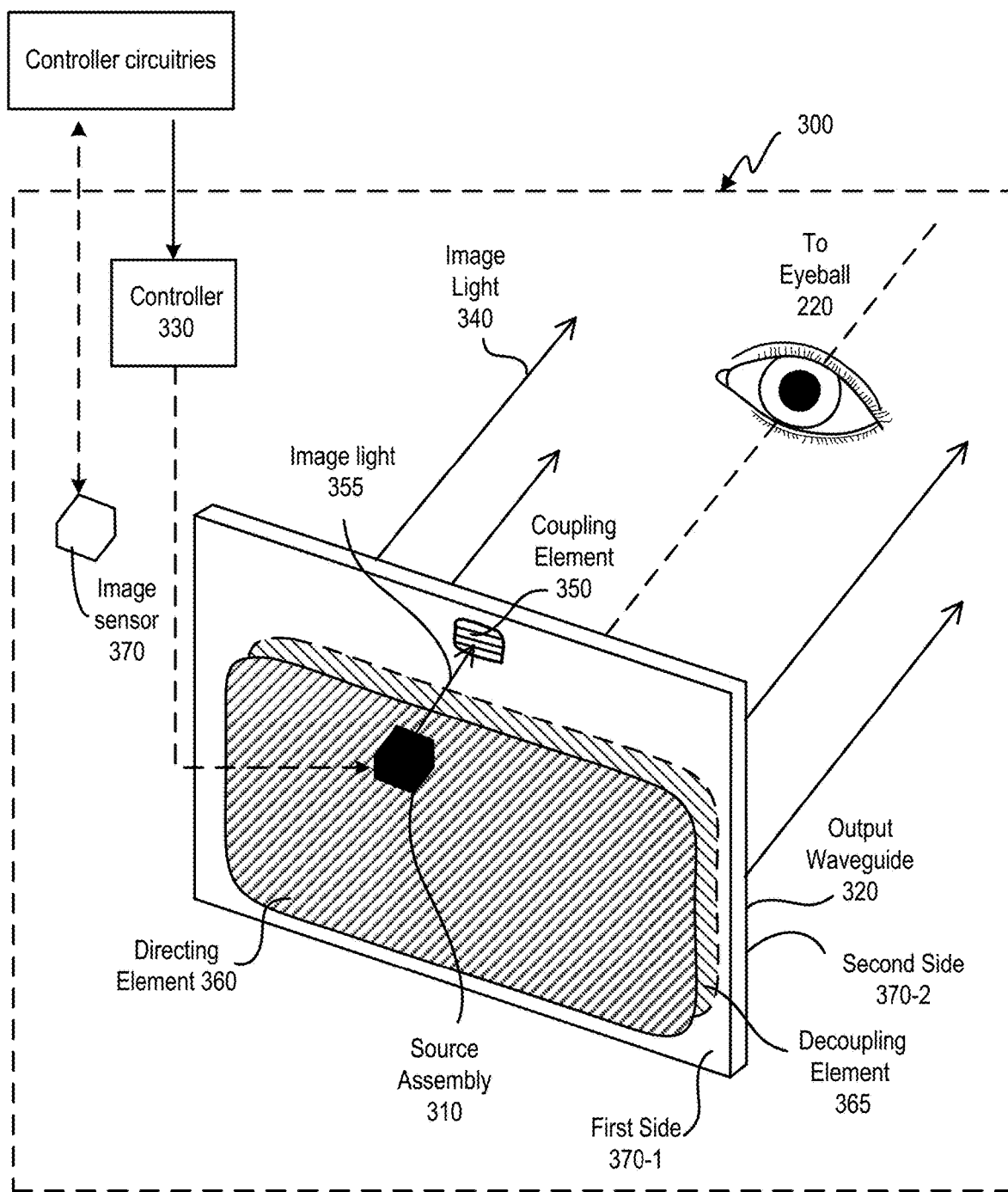
FIG. 3 illustrates an isometric view of an example of a waveguide display with a single source assembly.

FIG. 3 illustrates an isometric view of an example of a waveguide display 300. In some examples, waveguide display 300 is a component (e.g., waveguide display assembly 210) of near-eye display 100. In some examples, waveguide display 300 is part of some other near-eye display or other system that directs image light to a particular location.

Waveguide display 300 includes a source assembly 310, an output waveguide 320, and a controller 330. For purposes of illustration, FIG. 3 shows the waveguide display 300 associated with a single eyeball 220, but in some examples, another waveguide display separate, or partially separate, from the waveguide display 300 provides image light to another eye of the user.

Source assembly 310 generates image light 355. Source assembly 310 generates and outputs image light 355 to a coupling element 350 located on a first side 370-1 of output waveguide 320. Output waveguide 320 is an optical waveguide that outputs expanded image light 340 to an eyeball 220 of a user. Output waveguide 320 receives image light 355 at one or more coupling elements 350 located on the first side 370-1 and guides received input image light 355 to a directing element 360. In some examples, coupling element 350 couples the image light 355 from source assembly 310 into output waveguide 320. Coupling element 350 may be, e.g., a diffraction grating, a holographic grating, one or more cascaded reflectors, one or more prismatic surface elements, and/or an array of holographic reflectors.

Directing element 360 redirects the received input image light 355 to decoupling element 365 such that the received input image light 355 is decoupled out of output waveguide 320 via decoupling element 365. Directing element 360 is part of, or affixed to, first side 370-1 of output waveguide 320. Decoupling element 365 is part of, or affixed to, second side 370-2 of output waveguide 320, such that directing element 360 is opposed to the decoupling element 365. Directing element 360 and/or decoupling element 365 may be, e.g., a diffraction grating, a holographic grating, one or more cascaded reflectors, one or more prismatic surface elements, and/or an array of holographic reflectors.

Second side 370-2 represents a plane along an x-dimension and a y-dimension. Output waveguide 320 may be composed of one or more materials that facilitate total internal reflection of image light 355. Output waveguide 320 may be composed of e.g., silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 330 controls scanning operations of source assembly 310. The controller 330 determines scanning instructions for the source assembly 310. In some examples, the output waveguide 320 outputs expanded image light 340 to the user's eyeball 220 with a large field of view (FOV). For example, the expanded image light 340 is provided to the user's eyeball 220 with a diagonal FOV (in x and y) of 60 degrees and/or greater and/or 150 degrees and/or less. The output waveguide 320 is configured to provide an eyebox with a length of 20 mm or greater and/or equal to or less than 50 mm; and/or a width of 10 mm or greater and/or equal to or less than 50 mm.

Moreover, controller 330 also controls image light 355 generated by source assembly 310, based on image data provided by image sensor 370. Image sensor 370 may be located on first side 370-1 and may include, for example, image sensors 120a-120d of FIG. 1A to generate image data of a physical environment in front of the user (e.g., for location determination). Image sensor 370 may also be located on second side 370-2 and may include image sensors 150a and 150b of FIG. 1B to generate image data of eyeball 220 (e.g., for gaze point determination) of the user. Image sensor 370 may interface with a remote console that is not located within waveguide display 300. Image sensor 370 may provide image data to the remote console, which may determine, for example, a location of the user, a gaze point of the user, etc., and determine the content of the images to be displayed to the user. The remote console can transmit instructions to controller 330 related to the determined content. Based on the instructions, controller 330 can control the generation and outputting of image light 355 by source assembly 310.

Figure 4:
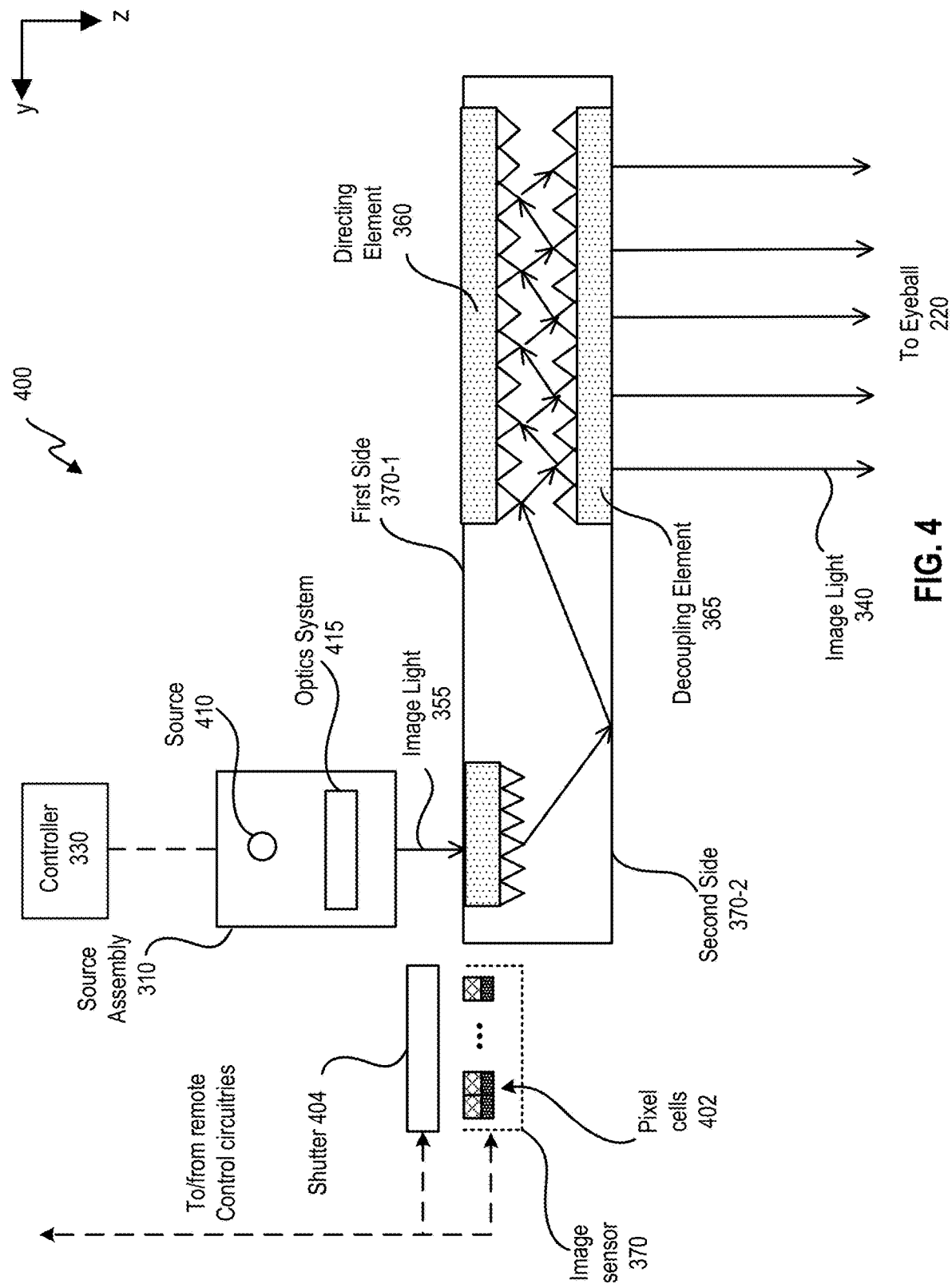
FIG. 4 illustrates a cross section of an example of the waveguide display.

FIG. 4 illustrates an example of a cross section 400 of the waveguide display 300. The cross section 400 includes source assembly 310, output waveguide 320, and image sensor 370. In the example of FIG. 4, image sensor 370 may include a set of pixel cells 402 located on first side 370-1 to generate an image of the physical environment in front of the user. In some examples, there can be a mechanical shutter 404 interposed between the set of pixel cells 402 and the physical environment to control the exposure of the set of pixel cells 402. In some examples, the mechanical shutter 404 can be replaced by an electronic shutter gate, as to be discussed below. Each of pixel cells 402 may correspond to one pixel of the image. Although not shown in FIG. 4, it is understood that each of pixel cells 402 may also be overlaid with a filter to control the frequency range of the light to be sensed by the pixel cells.

After receiving instructions from the remote console, mechanical shutter 404 can open and expose the set of pixel cells 402 in an exposure period. During the exposure period, image sensor 370 can obtain samples of lights incident on the set of pixel cells 402, and generate image data based on an intensity distribution of the incident light samples detected by the set of pixel cells 402. Image sensor 370 can then provide the image data to the remote console, which determines the display content, and provide the display content information to controller 330. Controller 330 can then determine image light 355 based on the display content information.

Source assembly 310 generates image light 355 in accordance with instructions from the controller 330. Source assembly 310 includes a source 410 and an optics system 415. Source 410 is a light source that generates coherent or partially coherent light. Source 410 may be, e.g., a laser diode, a vertical cavity surface emitting laser, and/or a light emitting diode.

Optics system 415 includes one or more optical components that condition the light from source 410. Conditioning light from source 410 may include, e.g., expanding, collimating, and/or adjusting orientation in accordance with instructions from controller 330. The one or more optical components may include one or more lenses, liquid lenses, mirrors, apertures, and/or gratings. In some examples, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In examples where coupling element 350 is diffraction grating, a pitch of the diffraction grating is chosen such that total internal reflection occurs in output waveguide 320, and image light 355 propagates internally in output waveguide 320 (e.g., by total internal reflection), toward decoupling element 365.

Directing element 360 redirects image light 355 toward decoupling element 365 for decoupling from output waveguide 320. In examples where directing element 360 is a diffraction grating, the pitch of the diffraction grating is chosen to cause incident image light 355 to exit output waveguide 320 at angle(s) of inclination relative to a surface of decoupling element 365.

In some examples, directing element 360 and/or decoupling element 365 are structurally similar. Expanded image light 340 exiting output waveguide 320 is expanded along one or more dimensions (e.g., may be elongated along x-dimension). In some examples, waveguide display 300 includes a plurality of source assemblies 310 and a plurality of output waveguides 320. Each of source assemblies 310 emits a monochromatic image light of a specific band of wavelength corresponding to a primary color (e.g., red, green, or blue). Each of output waveguides 320 may be stacked together with a distance of separation to output an expanded image light 340 that is multi-colored.

Figure 5:
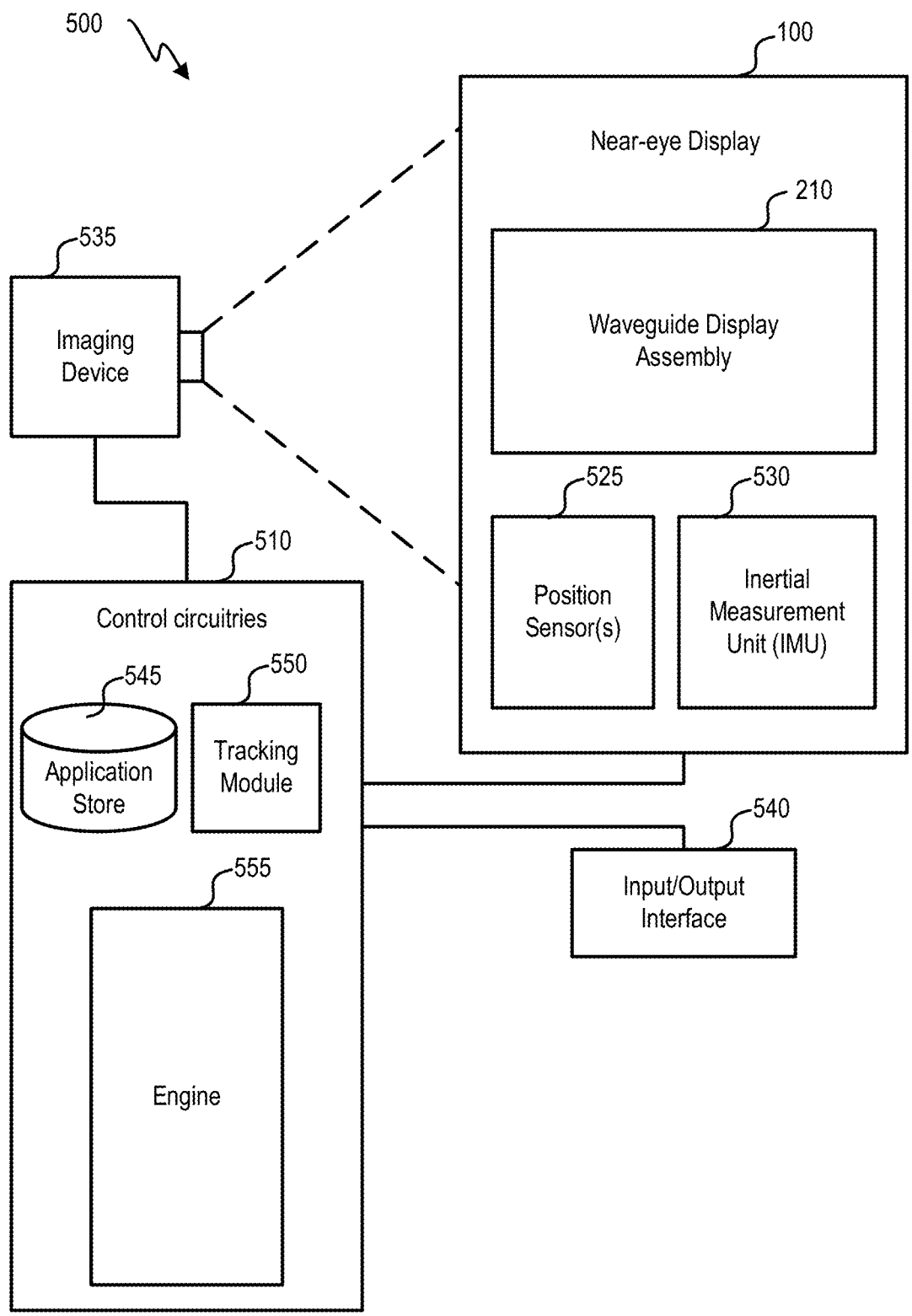
FIG. 5 is a block diagram of an example of a system including the near-eye display.

FIG. 5 is a block diagram of an example of a system 500 including the near-eye display 100. The system 500 comprises near-eye display 100, an imaging device 535, an input/output interface 540, and image sensors 120a-120d and 150a-150b that are each coupled to control circuitries 510. System 500 can be configured as a head-mounted device, a wearable device, etc.

Near-eye display 100 is a display that presents media to a user. Examples of media presented by the near-eye display 100 include one or more images, video, and/or audio. In some examples, audio is presented via an external device (e.g., speakers and/or headphones) that receives audio information from near-eye display 100 and/or control circuitries 510 and presents audio data based on the audio information to a user. In some examples, near-eye display 100 may also act as an AR eyewear glass. In some examples, near-eye display 100 augments views of a physical, real-world environment, with computer-generated elements (e.g., images, video, sound, etc.).

Near-eye display 100 includes waveguide display assembly 210, one or more position sensors 525, and/or an inertial measurement unit (IMU) 530. Waveguide display assembly 210 includes source assembly 310, output waveguide 320, and controller 330.

IMU 530 is an electronic device that generates fast calibration data indicating an estimated position of near-eye display 100 relative to an initial position of near-eye display 100 based on measurement signals received from one or more of position sensors 525.

Imaging device 535 may generate image data for various applications. For example, imaging device 535 may generate image data to provide slow calibration data in accordance with calibration parameters received from control circuitries 510. Imaging device 535 may include, for example, image sensors 120a-120d of FIG. 1A for generating image data of a physical environment in which the user is located, for performing location tracking of the user. Imaging device 535 may further include, for example, image sensors 150a-150b of FIG. 1B for generating image data for determining a gaze point of the user, to identify an object of interest of the user.

The input/output interface 540 is a device that allows a user to send action requests to the control circuitries 510. An action request is a request to perform a particular action. For example, an action request may be to start or end an application or to perform a particular action within the application.

Control circuitries 510 provide media to near-eye display 100 for presentation to the user in accordance with information received from one or more of: imaging device 535, near-eye display 100, and input/output interface 540. In some examples, control circuitries 510 can be housed within system 500 configured as a head-mounted device. In some examples, control circuitries 510 can be a standalone console device communicatively coupled with other components of system 500. In the example shown in FIG. 5, control circuitries 510 include an application store 545, a tracking module 550, and an engine 555.

The application store 545 stores one or more applications for execution by the control circuitries 510. An application is a group of instructions, that, when executed by a processor, generates content for presentation to the user. Examples of applications include: gaming applications, conferencing applications, video playback applications, or other suitable applications.

Tracking module 550 calibrates system 500 using one or more calibration parameters and may adjust one or more calibration parameters to reduce error in determination of the position of the near-eye display 100.

Tracking module 550 tracks movements of near-eye display 100 using slow calibration information from the imaging device 535. Tracking module 550 also determines positions of a reference point of near-eye display 100 using position information from the fast calibration information.

Engine 555 executes applications within system 500 and receives position information, acceleration information, velocity information, and/or predicted future positions of near-eye display 100 from tracking module 550. In some examples, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), or a gaze point of the user (e.g., based on image data provided by imaging device 535), a distance between an object and user (e.g., based on image data provided by imaging device 535).

Figure 6:
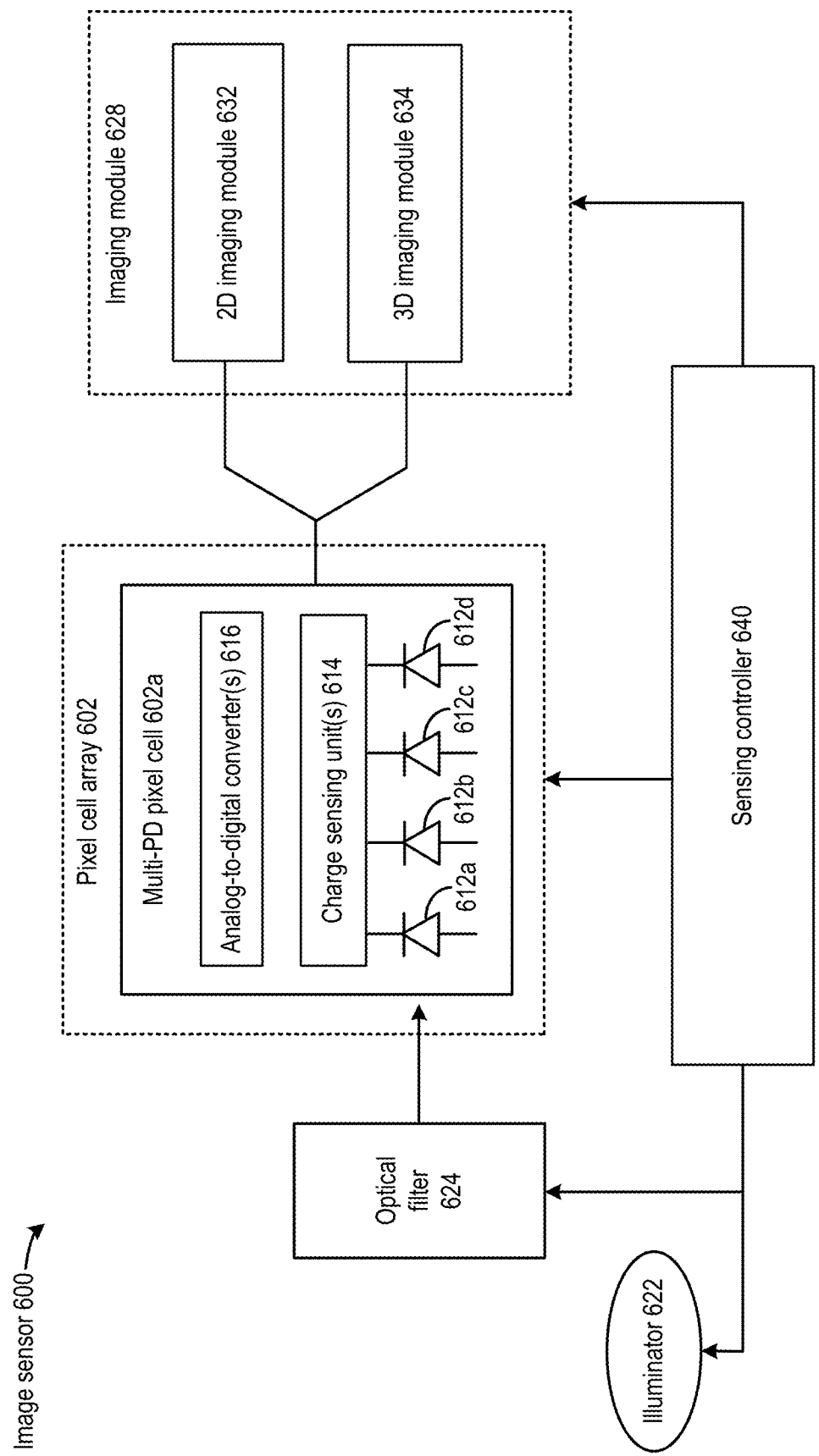
FIG. 6 illustrates block diagrams of examples of an image sensor.

FIG. 6 illustrates an example of an image sensor 600. Image sensor 600 can be part of near-eye display 100, and can provide 2D and 3D image data to control circuitries 510 of FIG. 5 to control the display content of near-eye display 100. As shown in FIG. 6, image sensor 600 may include an array of pixel cells 602 including pixel cell 602a. Pixel cell 602a can include a plurality of photodiodes 612 including, for example, photodiodes 612a, 612b, 612c, and 612d, one or more charge sensing units 614, and one or more analog-to-digital converters 616. The plurality of photodiodes 612 can convert different components of incident light to charge. For example, photodiode 612a-612c can correspond to different visible light channels, in which photodiode 612a can convert a visible blue component (e.g., a wavelength range of 450-490 nanometers (nm)) to charge. Photodiode 612b can convert a visible green component (e.g., a wavelength range of 520-560 nm) to charge. Photodiode 612c can convert a visible red component (e.g., a wavelength range of 635-700 nm) to charge. Moreover, photodiode 612d can convert an infra-red component (e.g., 700-1000 nm) to charge. Each of the one or more charge sensing units 614 can include a charge storage device and a buffer to convert the charge generated by photodiodes 612a-612d to voltages, which can be quantized by one or more ADCs 616 into digital values. The digital values generated from photodiodes 612a-612c can represent the different visible light components of a pixel, and each can be used for 2D sensing in a particular visible light channel. Moreover, the digital value generated from photodiode 612d can represent the infra-red light component of the same pixel and can be used for 3D sensing. Although FIG. 6 shows that pixel cell 602a includes four photodiodes, it is understood that the pixel cell can include a different number of photodiodes (e.g., two, three, etc.).

In some examples, image sensor 600 may also include an illuminator 622, an optical filter 624, an imaging module 628, and a sensing controller 630. Illuminator 622 may be an infra-red illuminator, such as a laser, a light emitting diode (LED), etc., that can project infra-red light for 3D sensing. The projected light may include, for example, structured light, light pulses, etc. Optical filter 624 may include an array of filter elements overlaid on the plurality of photodiodes 612a-612d of each pixel cell including pixel cell 602a. Each filter element can set a wavelength range of incident light received by each photodiode of pixel cell 602a. For example, a filter element over photodiode 612a may transmit the visible blue light component while blocking other components, a filter element over photodiode 612b may transmit the visible green light component, a filter element over photodiode 612c may transmit the visible red light component, whereas a filter element over photodiode 612d may transmit the infra-red light component.

Image sensor 600 further includes an imaging module 628. Imaging module 628 may further include a 2D imaging module 632 to perform 2D imaging operations and a 3D imaging module 634 to perform 3D imaging operations. The operations can be based on digital values provided by ADCs 616. For example, based on the digital values from each of photodiodes 612a-612c, 2D imaging module 632 can generate an array of pixel values representing an intensity of an incident light component for each visible color channel, and generate an image frame for each visible color channel. Moreover, 3D imaging module 634 can generate a 3D image based on the digital values from photodiode 612d. In some examples, based on the digital values, 3D imaging module 634 can detect a pattern of structured light reflected by a surface of an object, and compare the detected pattern with the pattern of structured light projected by illuminator 622 to determine the depths of different points of the surface with respect to the pixel cells array. For detection of the pattern of reflected light, 3D imaging module 634 can generate pixel values based on intensities of infra-red light received at the pixel cells. As another example, 3D imaging module 634 can generate pixel values based on time-of-flight of the infra-red light transmitted by illuminator 622 and reflected by the object.

Figure 7A:
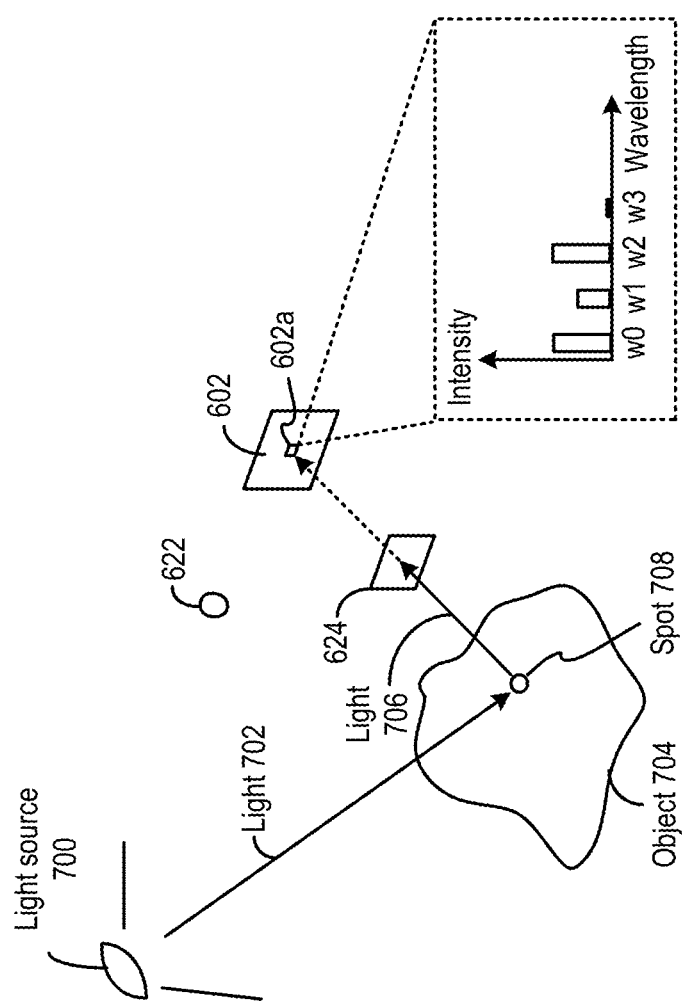
FIGS. 7A, 7B, and 7C illustrate operations for determining light intensities of different ranges by examples of FIG. 6.
Figure 7B:
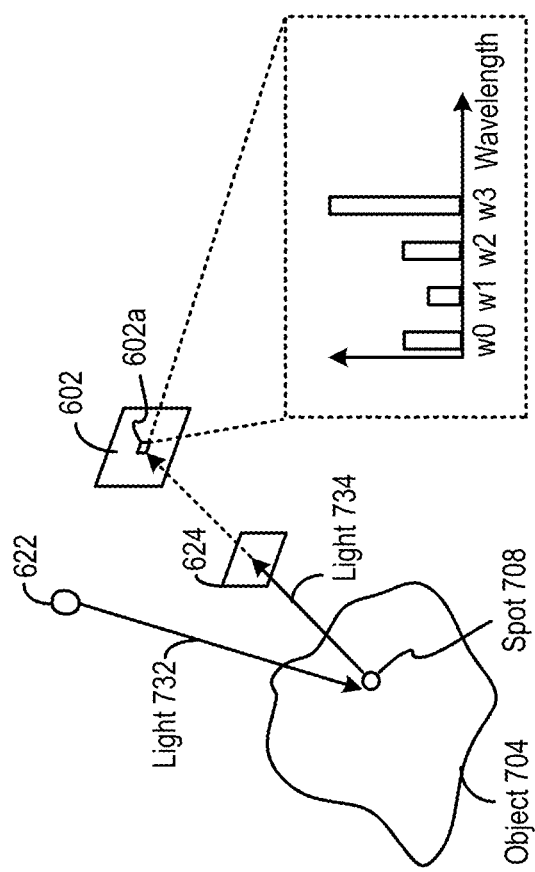
Figure 7C:
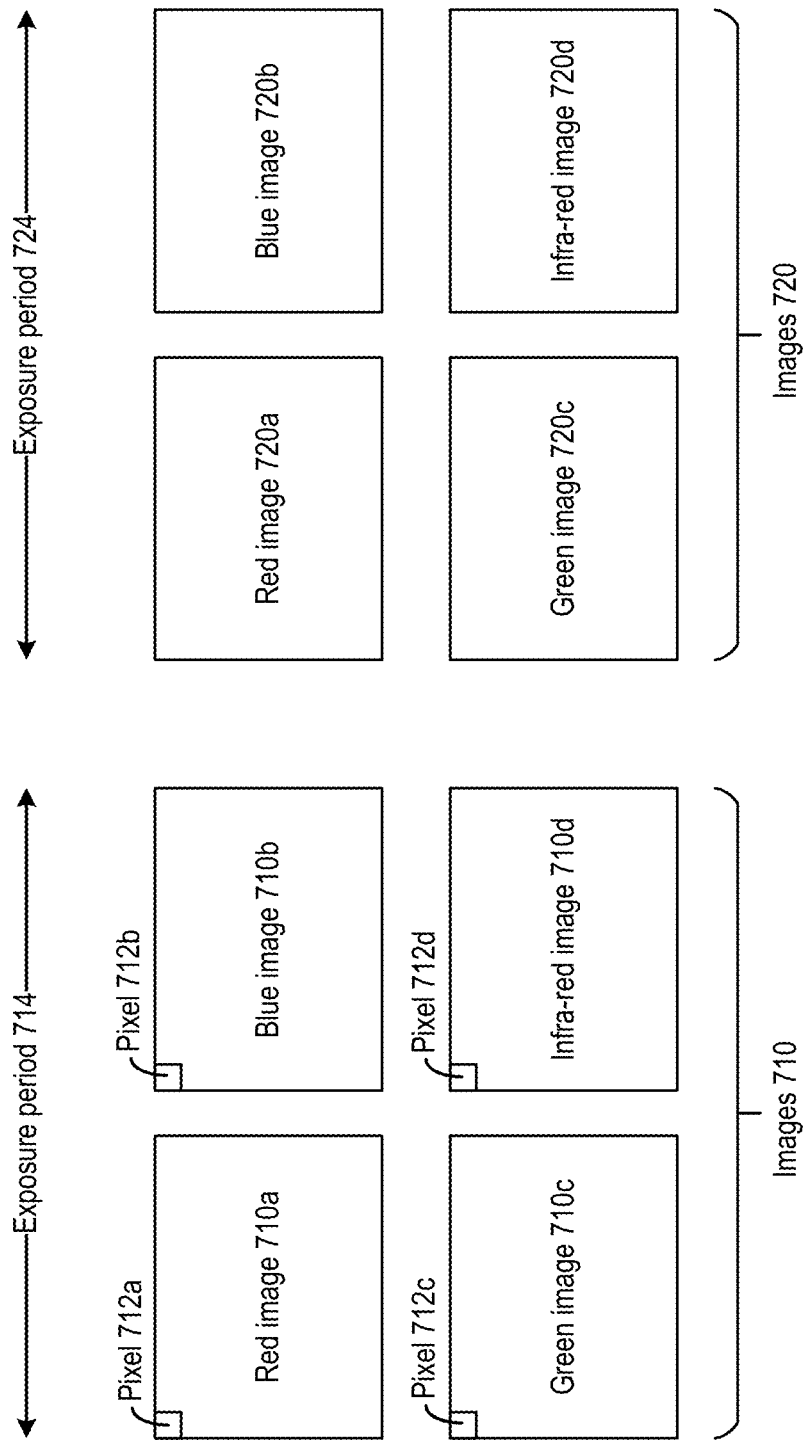

Image sensor 600 further includes a sensing controller 640 to control different components of image sensor 600 to perform 2D and 3D imaging of an object. Reference is now made to FIG. 7A-FIG. 7C, which illustrate examples of operations of image sensor 600 for 2D and 3D imaging. FIG. 7A illustrates an example of operations for 2D imaging. For 2D imaging, pixel cells array 602 can detect visible light in the environment including visible light reflected off an object. For example, referring to FIG. 7A, visible light source 700 (e.g., a light bulb, the sun, or other sources of ambient visible light) can project visible light 702 onto an object 704. Visible light 706 can be reflected off a spot 708 of object 704. Visible light 706 can also include the ambient infra-red light component. Visible light 706 can be filtered by optical filter array 624 to pass different components of visible light 706 of wavelength ranges w0, w1, w2, and w3 to, respectively, photodiodes 612a, 612b, 612c, and 612d of pixel cell 602a. Wavelength ranges w0, w1, w2, and w3 an correspond to, respectively, blue, green, red, and infra-red. As shown in FIG. 7A, as the infra-red illuminator 622 is not turned on, the intensity of infra-red component (w3) is contributed by the ambient infra-red light and can be very low. Moreover, different visible components of visible light 706 can also have different intensities. Charge sensing units 614 can convert the charge generated by the photodiodes to voltages, which can be quantized by ADCs 616 into digital values representing the red, blue, and green components of a pixel representing spot 708. Referring to FIG. 7C, after the digital values are generated, sensing controller 640 can control 2D imaging module 632 to generate, based on the digital values, sets of images including a set of images 710, which includes a red image frame 710a, a blue image frame 710b, and a green image frame 710c each representing one of red, blue, or green color image of a scene captured with the same exposure period 714. Each pixel from the red image (e.g., pixel 712a), from the blue image (e.g., pixel 712b), and from the green image (e.g., pixel 712c) can represent visible components of light from the same spot (e.g., spot 708) of a scene. A different set of images 720 can be generated by 2D imaging module 632 in a subsequent exposure period 724. Each of red image 710a, blue image 710*b*, and green image 710*c* can represent the scene in a specific color channel and can be provided to an application to, for example, extract image features from the specific color channel. As each image represents the same scene and each corresponding pixel of the images represent light from the same spot of the scene, the correspondence of images between different color channels can be improved.

Furthermore, image sensor 600 can also perform 3D imaging of object 704. Referring to FIG. 7B, sensing controller 610 can control illuminator 622 to project infra-red light 732, which can include a light pulse, structured light, etc., onto object 704. Infra-red light 732 can have a wavelength range of 700 nanometers (nm) to 1 millimeter (mm). Infra-red light 734 can reflect off spot 708 of object 704 and can propagate towards pixel cells array 602 and pass through optical filter 624, which can provide the infra-red component (of wavelength range w3) to photodiode 612*d* to convert to charge. Charge sensing units 614 can convert the charge to a voltage, which can be quantized by ADCs 616 into digital values. Referring to FIG. 7C, after the digital values are generated, sensing controller 640 can control 3D imaging module 634 to generate, based on the digital values, an infra-red image 710*d* of the scene as part of images 710 captured within exposure period 714. As infra-red image 710*d* can represent the same scene in the infra-red channel and a pixel of infra-red image 710*d* (e.g., pixel 712*d*) represents light from the same spot of the scene as other corresponding pixels (pixels 712*a*-712*c*) in other images within images 710, the correspondence between 2D and 3D imaging can be improved as well.

Figure 8A:
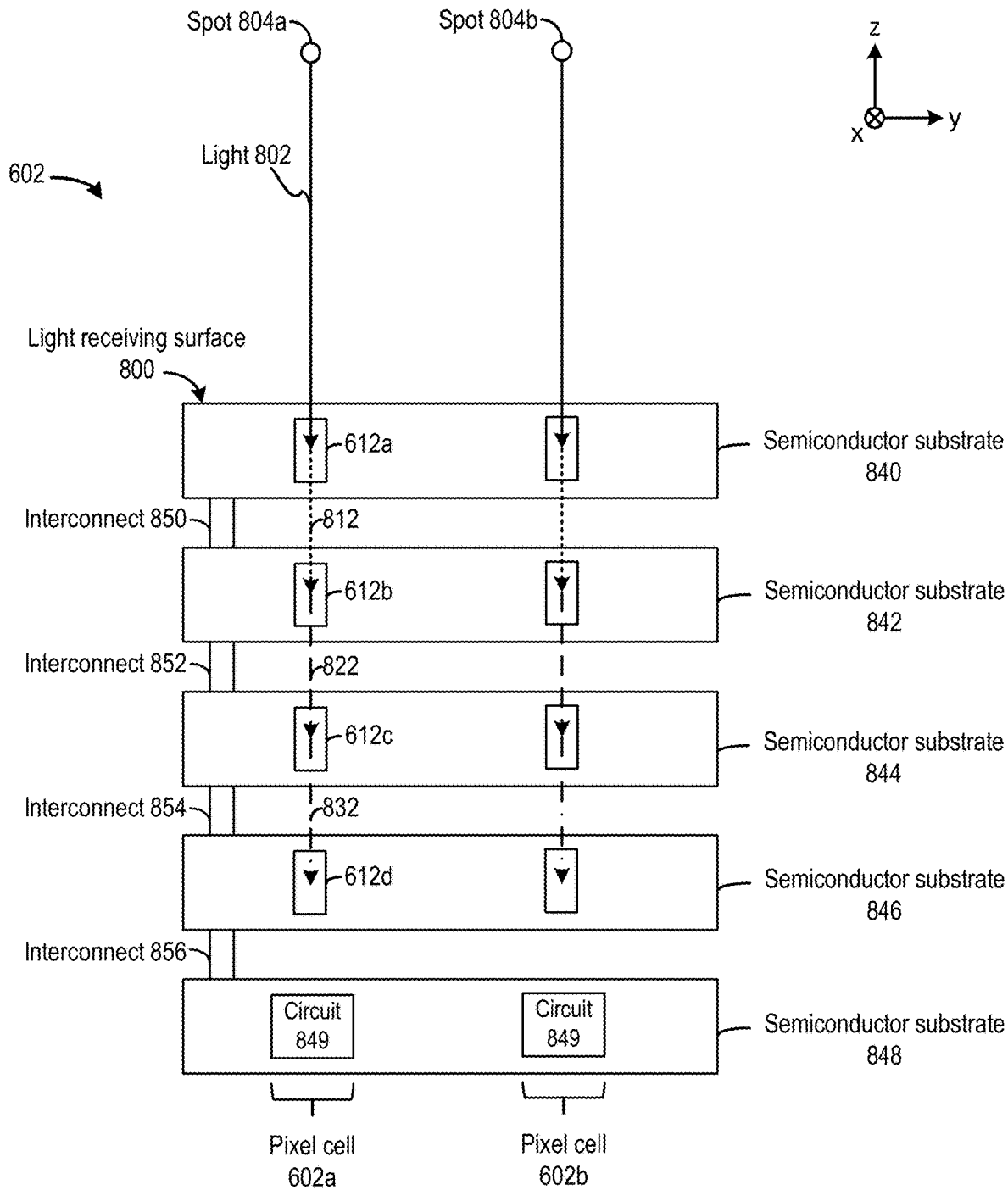
FIGS. 8A, 8B, 8C, 8D, and 8E illustrate examples of components of the image sensor of FIG. 6.

FIG. 8A-FIG. 8E illustrate examples of arrangements of photodiodes 612 in an image sensor, such as within a pixel cell or between different pixel cells. As shown in FIG. 8A, the photodiodes 612*a*-612*d* in a pixel cell 602*a* can form a stack along an axis that is perpendicular to a light receiving surface 800 through which pixel cell 602*a* receives incident light 802 from a spot 804*a*. For example, the photodiodes 612*a*-612*d* can form a stack along a vertical axis (e.g., the z-axis) when the light receiving surface 800 is parallel with the x and y axes. Each photodiode can have a different distance from light receiving surface 800, and the distance can set the component of incident light 802 being absorbed and converted to charge by each photodiode. For example, photodiode 612*a* is closest to light receiving surface 800 and can absorb and convert the blue component to charge, which is of the shortest wavelength range among the other components. Light 812 includes the remaining components of light 802 (e.g., green, red, and infra-red) and can propagate to photodiode 612*b*, which can absorb and convert the green component. Light 822 includes the remaining components of light 812 (e.g., red and infra-red) and can propagate to photodiode 612*c*, which can absorb and convert the red component. The remaining infra-red component 832 can propagate to photodiode 612*d* to be converted to charge.

Each the photodiodes 612*a*, 612*b*, 612*c*, and 612*d* can be in a separate semiconductor substrate, which can be stacked to form image sensor 600. For example, photodiode 612*a* can be in a semiconductor substrate 840, photodiode 612*b* can be in a semiconductor substrate 842, photodiode 612*c* can be in a semiconductor substrate 844, whereas photodiode 612*d* can be in a semiconductor substrate 846. Each of substrates 840-846 can include a charge sensing unit, such as charge sensing units 614. Substrates 840-846 can form a sensor layer. Each semiconductor substrate can include other photodiodes of other pixel cells, such as pixel cells 602*b* to receive light from spot 804*b*. Image sensor 600 can include another semiconductor substrate 848 which can include pixel cell processing circuits 849 which can include, for example, ADCs 616, imaging module 628, sensing controller 640, etc. In some examples, charge sensing units 614 can be in semiconductor substrate 848. Semiconductor substrate 848 can form an application specific integrated circuit (ASIC) layer. Each semiconductor substrate can be connected to a metal interconnect, such as metal interconnects 850, 852, 854, and 856 to transfer the charge generated at each photodiode to processing circuit 849.

Figure 8B:
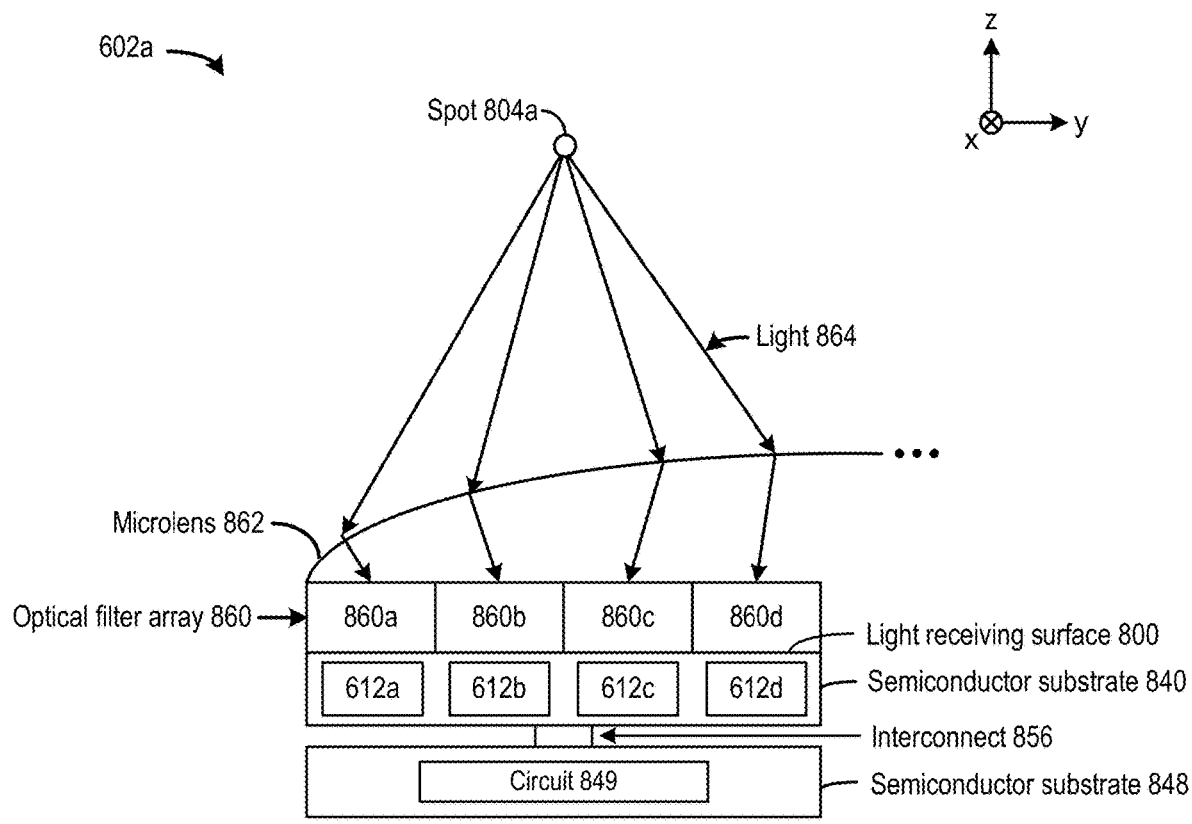
Figure 8B:
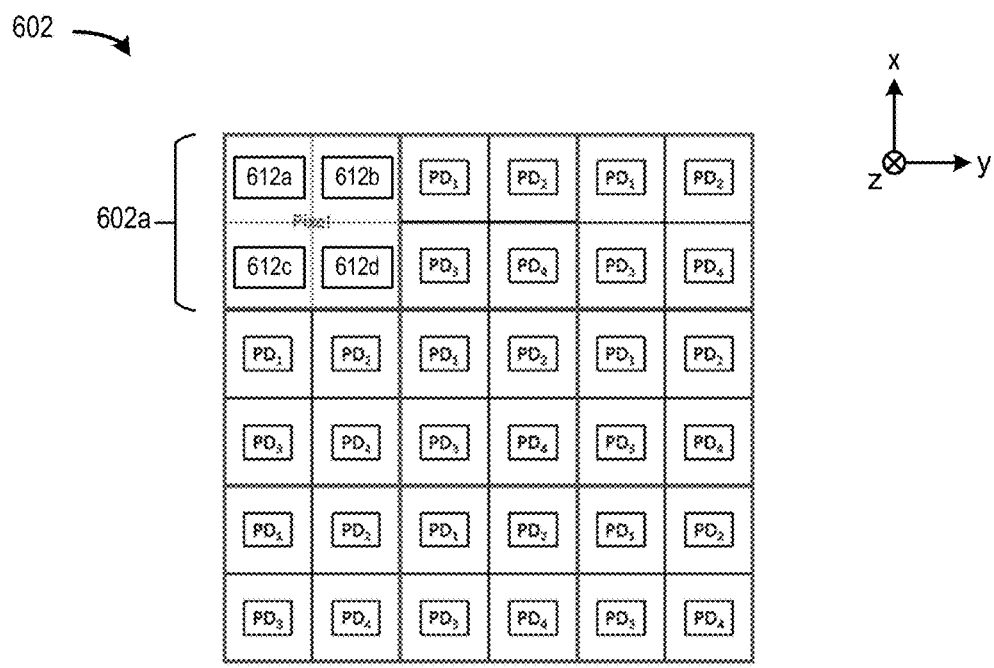
Figure 8C:
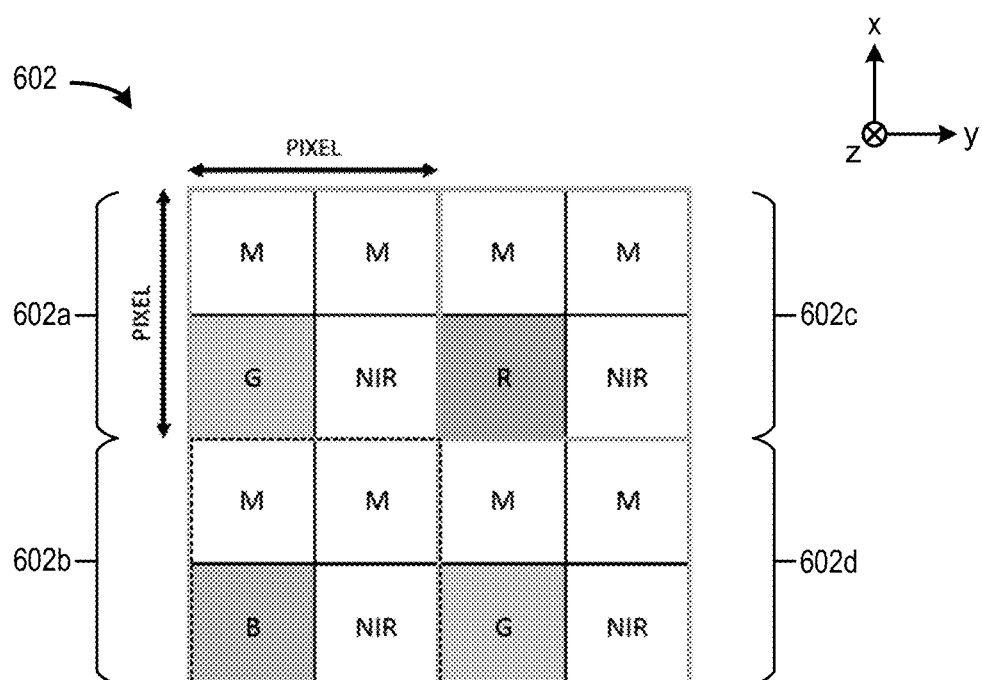
Figure 8C:
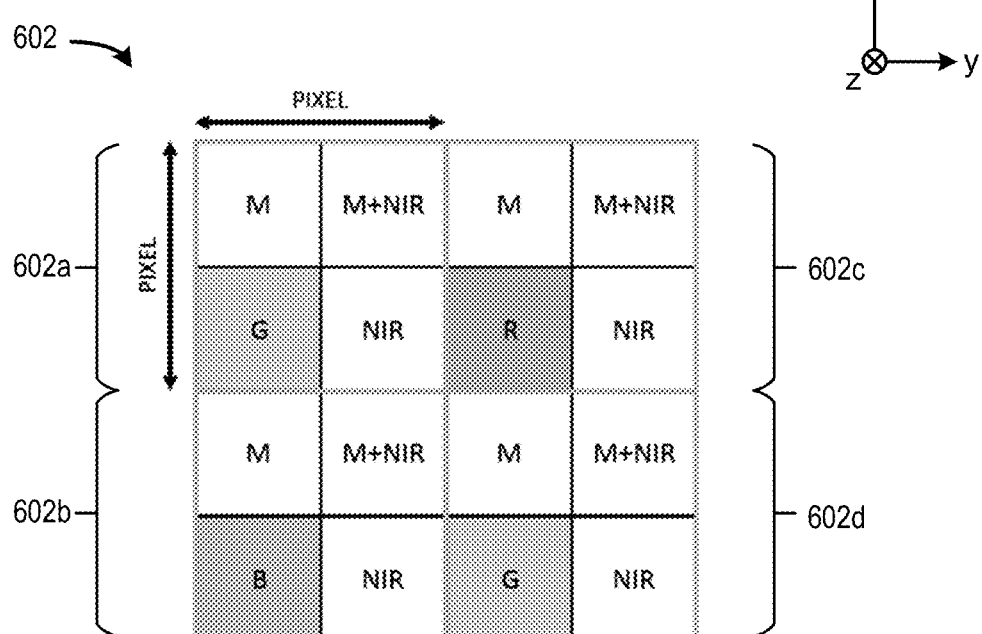
Figure 8D:
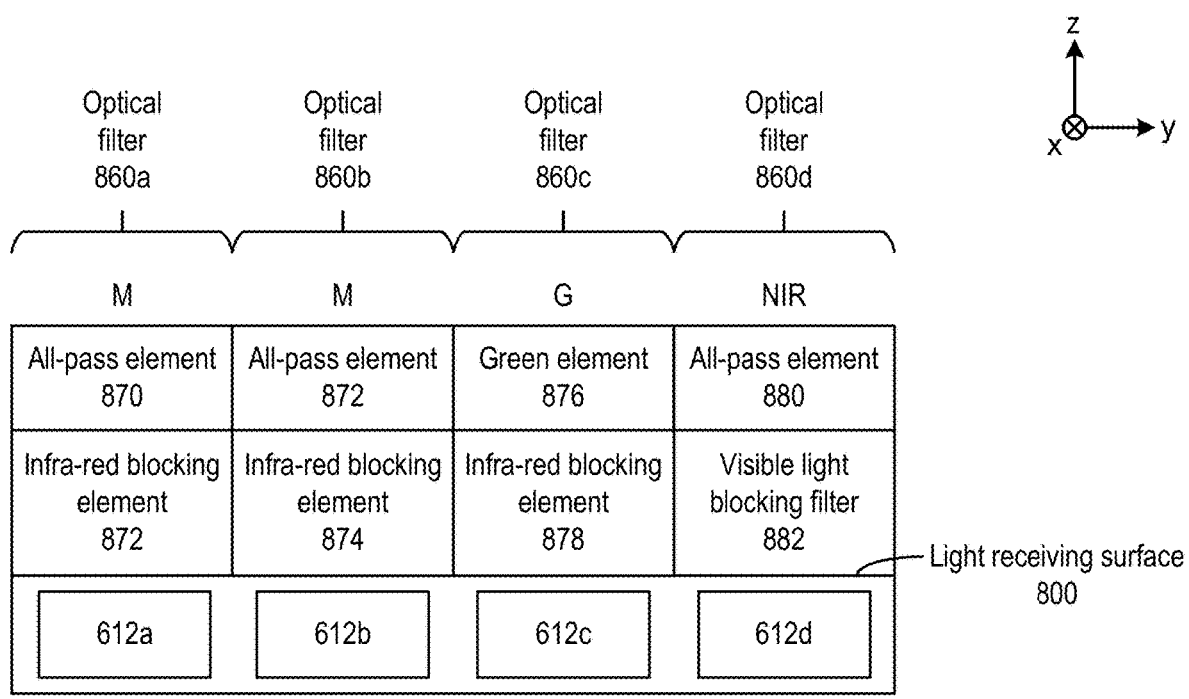
Figure 8D:
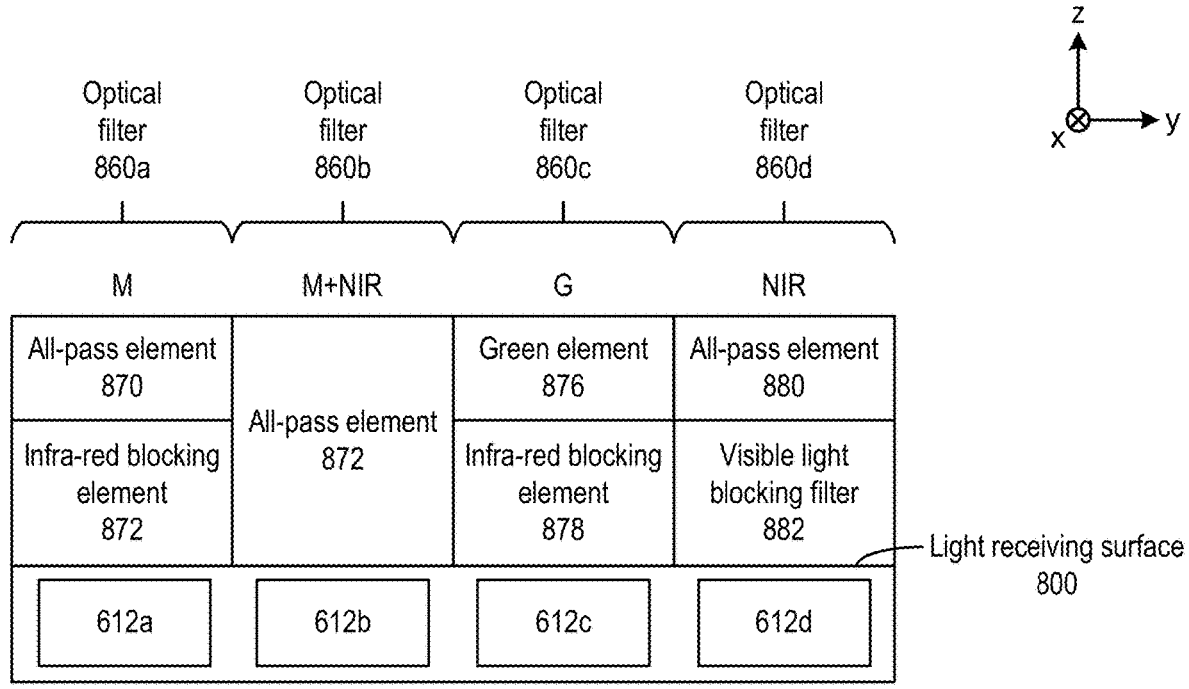

FIG. 8B-FIG. 8D illustrate other example arrangements of photodiodes 612 within a pixel cell. As shown in FIG. 8B-FIG. 8D, the plurality of photodiodes 612 can be arranged laterally parallel with light receiving surface 800. The top graph of FIG. 8B illustrates a side view of an example of pixel cell 602*a*, whereas the bottom graph of FIG. 8B illustrates a top view of pixel array 602 including pixel cell 602*a*. As shown in FIG. 8B, with light receiving surface 800 being parallel with the x and y axes, photodiodes 612*a*, 612*b*, 612*c*, and 612*d* can be arranged adjacent to each other also along the x and y axes in semiconductor substrate 840. Pixel cell 602*a* further includes an optical filter array 860 overlaid on the photodiodes. Optical filter array 860 can be part of optical filter 624. Optical filter array 860 can include a filter element overlaid on each of photodiodes 612*a*, 612*b*, 612*c*, and 612*d* to set a wavelength range of incident light component received by the respective photodiode. For example, filter element 860*a* is overlaid on photodiode 612*a* and can allow only visible blue light to enter photodiode 612*a*. Moreover, filter element 860*b* is overlaid on photodiode 612*b* and can allow only visible green light to enter photodiode 612*b*. Further, filter element 860*c* is overlaid on photodiode 612*c* and can allow only visible red light to enter photodiode 612*c*. Filter element 860*d* is overlaid on photodiode 612*d* and can allow only infra-red light to enter photodiode 612*d*. Pixel cell 602*a* further includes one or more microlens 862 which can project light 864 from a spot of a scene (e.g., spot 804*a*) via optical tiler array 860 to different lateral locations of light receiving surface 800, which allows each photodiode to become a sub-pixel of pixel cell 602*a* and to receive components of light from the same spot corresponding to a pixel. Pixel cell 602*a* can also include semiconductor substrate 848 which can include circuit 849 (e.g., charge sensing units 614, ADCs 616, etc.) to generate digital values from the charge generated by the photodiodes. Semiconductor substrates 840 and 848 can form a stack and can be connected with interconnect 856. In FIG. 8B, semiconductor substrate 840 can form a sensor layer, whereas semiconductor substrate 848 can form an ASIC layer.

The arrangements of FIG. 8B, in which the photodiodes are arranged laterally and an optical filter array is used to control the light components received by the photodiodes, can offer numerous advantages. For example, the number of stacks and the number of semiconductor substrates can be reduced, which not only reduce the vertical height but also the interconnects among the semiconductor substrates. Moreover, relying on filter elements rather than the propagation distance of light to set the wavelength ranges of the components absorbed by each photodiode can offer flexibilities in selecting the wavelength ranges. As shown in top graph of FIG. 8C, pixel cells array 602 can include different optical filter arrays 860 for different pixel cells. For example, each pixel cell of pixel cells array 602 can have an optical filter array that provides monochrome channel of a wavelength range of 380-740 nm (labelled with "M") for photodiodes 612*a* and 612*b*, and an infra-red channel of a wavelength range of 700-1000 nm (labelled with "NIR") for photodiode 612d. But the optical filter arrays may also provide a different visible color channel for the different pixel cells. For example, the optical filter arrays 860 for pixel cells array 602a, 602b, 602c, and 602d may provide, respectively, a visible green channel (labelled with "G"), a visible red channel (labelled with "R"), a visible blue channel (labelled with "B"), and a visible green channel for photodiode 612c of the pixel cells arrays. As another example, as shown in the bottom graph of FIG. 8C, each optical filter array 860 can provide a monochrome and infra-red channel (labelled "M+NIR") which spans a wavelength range of 380-1000 nm for photodiode 612b of each pixel cells array.

FIG. 8D illustrates examples of optical filter array 860 to provide the example channels shown in FIG. 8C. As shown in FIG. 8D, optical filter array 860 can include a stack of optical filters to select a wavelength range of light received by each photodiode within a pixel cell array. For example, referring to the top graph of FIG. 8D, optical filter 860a can include an all-pass element 870 (e.g., a transparent glass that passes both visible light and infra-red light) and an infra-red blocking element 872 forming a stack to provide a monochrome channel for photodiode 612a. Optical filter 860b can also include an all-pass element 874 and an infra-red blocking element 876 to also provide a monochrome channel for photodiode 612b. Further, optical filter 860c can include a green-pass element 876 which passes green visible light (but reject other visible light component), and an infra-red blocking element 878, to provide a green channel for photodiode 612c. Lastly, optical filter 860d can include an all-pass element 880 and a visible light blocking filter 882 (which can block out visible light but allows infra-red light to go through) to provide an infra-red channel for photodiode 612d. In another example, as shown in the bottom graph of FIG. 8D, optical filter 860b can include only all-pass element 872 to provide a monochrome and infra-red channel for photodiode 612b.

Figure 8E:
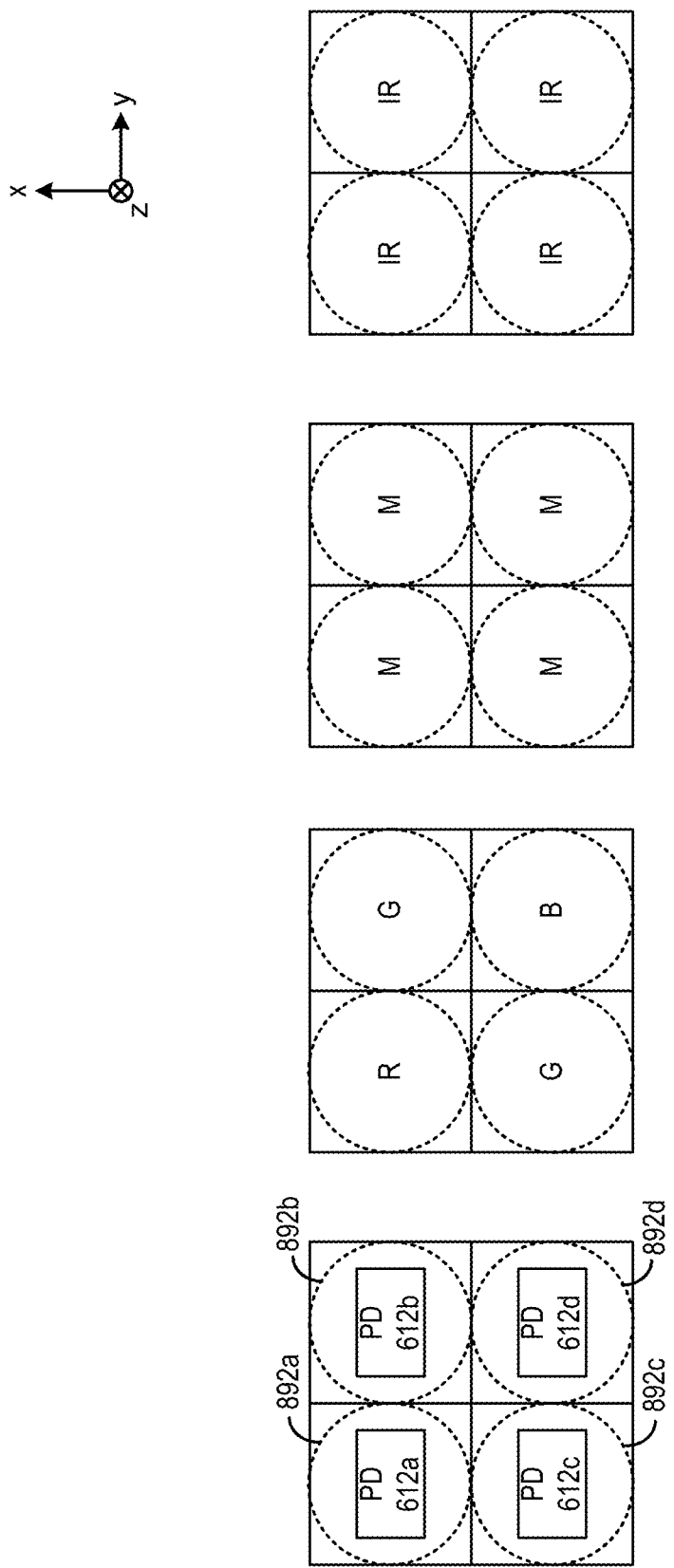

FIG. 8E illustrates another example optical configurations of photodiodes 612. As shown in FIG. 8E, instead of overlaying a microlens 862 over a plurality of photodiodes, as shown in FIG. 8B, a plurality of microlenses 892 can be overlaid over the plurality of photodiodes 612a-612d, which are arranged in a 2×2 format. For example, microlens 892a can be overlaid over photodiode 612a, microlens 892b can be overlaid over photodiode 612b, microlens 892c can be overlaid over photodiode 612c, whereas microlens 892d can be overlaid over photodiode 612d. With such arrangements, each photodiode can correspond to a pixel, which can shrink the required footprint of pixel cell array to achieve a target resolution.

Different patterns of filter arrays can be inserted between plurality of microlenses 862 and plurality of photodiodes 612. For example, as shown in FIG. 8E, a 2×2 color filter pattern comprising red (R), green (G), and blue (B) filters can be inserted between the microlenses and the photodiodes. Moreover, an all-pass filter pattern can also be inserted between the microlenses and the photodiodes so that each photodiode detects a monochrome channel. Also, an infra-red filter pattern can also be inserted between the microlenses and the photodiodes so that each photodiode detects infra-red light.

Figure 9:
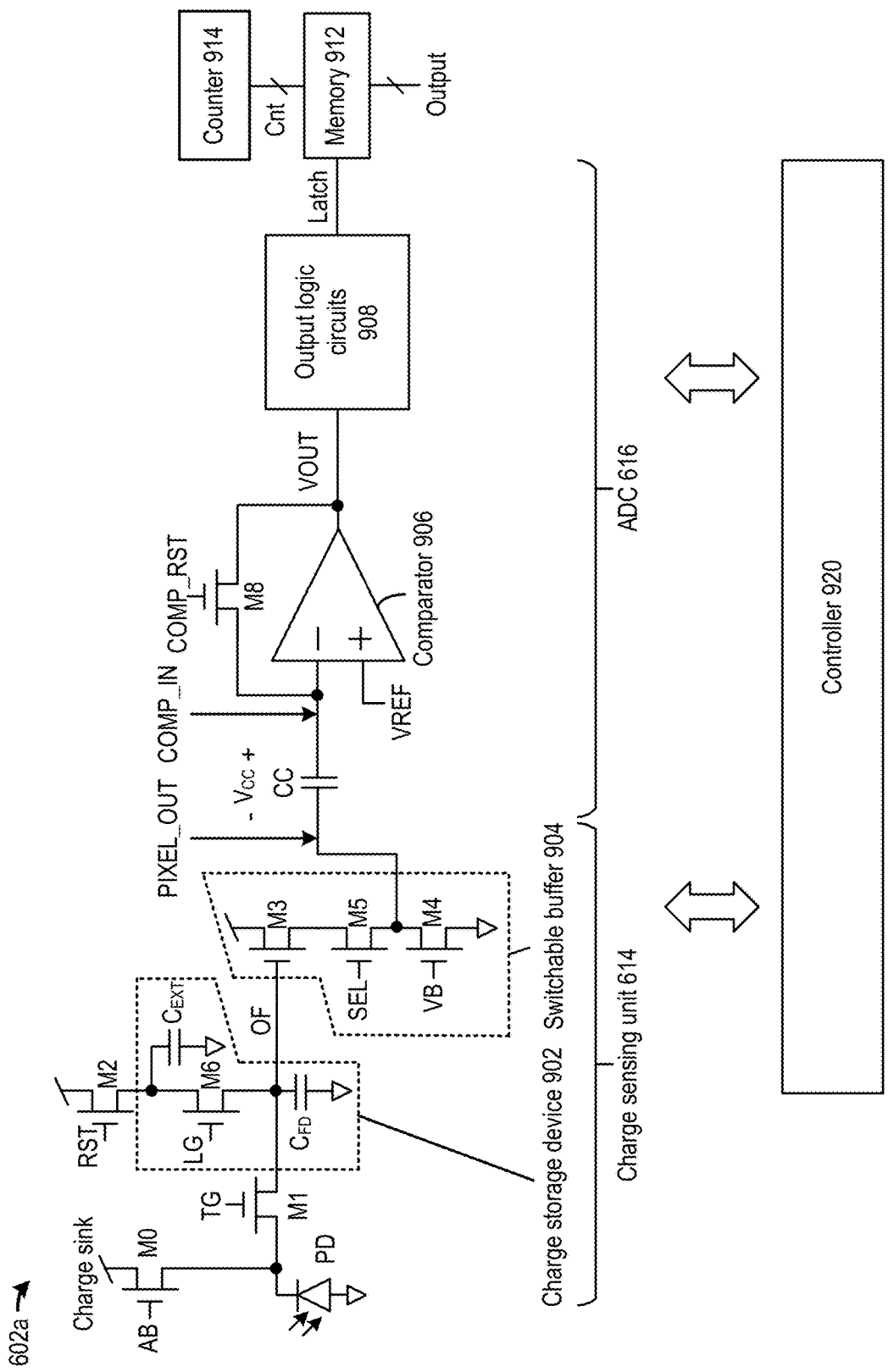
FIG. 9 illustrates examples of internal components of a pixel cell of FIG. 6.

Reference is now made to FIG. 9, which illustrates additional components of pixel cell 602a including an example of charge sensing unit 614 and ADC 616. As shown in FIG. 9, pixel cell 602a can include a photodiode PD (e.g., photodiode 612a), a charge draining transistor M0, a charge transfer transistor M1, a charge sensing unit 614 comprising a charge storage device 902 and a switchable buffer 904, and an ADC 616 comprising a CC capacitor, a comparator 906, and output logic circuits 908. The output of comparator 906 is coupled, via output logic circuits 908, with a memory bank 912 and a counter 914 which can be internal to or external to pixel cell 602a. Pixel cell 602 further includes a controller 920 to control the transistors, charge sensing unit 614, as well as ADC 616, As to be described below, controller 920 can set an exposure period to accumulate charge based on incident light, and can control charge sensing unit 614 and ADC 616 to perform multiple quantization operations associated with different light intensity ranges to generate a digital representation of the intensity of the incident light. Controller 920 can be internal to pixel cell 602a or part of sensing controller 640. Each transistor in pixel cell 602a can include, for example, a metal-oxide-semiconductor field-effect transistor (MOSFET), a bipolar junction transistor (BJT), etc. Photodiode PD, charge draining transistor M0, charge transfer transistor M1, and charge sensing unit 614 can be in a sensor layer (e.g., substrates 840-846 of FIG. 8A, substrate 840 of FIG. 8B), whereas ADC 616, memory bank 912, and counter 914 can be in an ASIC layer (e.g., substrate 848 of FIG. 8A and FIG. 8B), with the two substrates forming a stack.

Specifically, charge transfer transistor M1 can be controlled by a TG signal provided by controller 920 to transfer some of the charge to charge storage device 902. In one quantization operation, charge transfer transistor M1 can be biased at a partially-on state to set a quantum well capacity of photodiode PD, which also sets a quantity of residual charge stored at photodiode PD. After photodiode PD is saturated by the residual charge, overflow charge can flow through charge transfer transistor M1 to charge storage device 902. In another quantization operation, charge transfer transistor M1 can be fully turned on to transfer the residual charge from photodiode PD to charge storage device for measurement. Moreover, charge draining transistor M0 is coupled between photodiode PD and a charge sink. Charge draining transistor M0 can be controlled by an anti-blooming (AB) signal provided by controller 920 to start an exposure period, in which photodiode PD can generate and accumulate charge in response to incident light. Charge draining transistor M0 can also be controlled to provide an anti-blooming function to drain away additional charge generated by photodiode PD to the charge sink after charge storage device 902 saturates, to prevent the additional charge from leaking into neighboring pixel cells.

Charge storage device 902 has a configurable capacity and can convert the charge transferred from transistor M1 to a voltage at the OF node. Charge storage device 902 includes a $C_{FD}$ capacitor (e.g., a floating drain) and a $C_{EXT}$ capacitor (e.g., a MOS capacitor, a metal capacitor, etc.) connected by a M6 transistor. M6 transistor can be enabled by a LG signal to expand the capacity of charge storage device 902 by connecting $C_{FD}$ and $C_{EXT}$ capacitors in parallel, or to reduce the capacity by disconnecting the capacitors from each other. The capacity of charge storage device 902 can be reduced for measurement of residual charge to increase the charge-to-voltage gain and to reduce the quantization error. Moreover, the capacity of charge storage device 902 can also be increased for measurement of overflow charge to reduce the likelihood of saturation and to improve non-linearity. As to be described below, the capacity of charge storage device 902 can be adjusted for measurement of different light intensity ranges. Charge storage device 902 is also coupled with a reset transistor M2 which can be controlled by a reset signal RST, provided by controller 920, to reset $C_{FD}$ and C_{EXT} capacitors between different quantization operations. In some examples, with transistor M1 fully enabled, reset signal RST can also be used to control the start and end of the exposure period in which PD generates and accumulates charge in response to light. In such examples, charge draining transistor M0 can be omitted.

Switchable buffer 904 can be include a transistor M3 configured as a source follower to buffer the voltage at the OF node to improve its driving strength. The buffered voltage can be at the input node PIXEL_OUT of ADC 616. The M4 transistor provides a current source for switchable buffer 904 and can be biased by a VB signal. Switchable buffer 904 also includes a transistor M5 which be enabled or disabled by a SEL signal. When transistor M5 is disabled, source follower M3 can be disconnected from the PIXEL_OUT node. As to be described below, pixel cell 602a may include multiple charge sensing units 614 each including a switchable buffer 904, and one of the charge sensing units can be coupled with PIXEL_OUT (and ADC 616) at one time based on the SEL signal.

Figure 10:
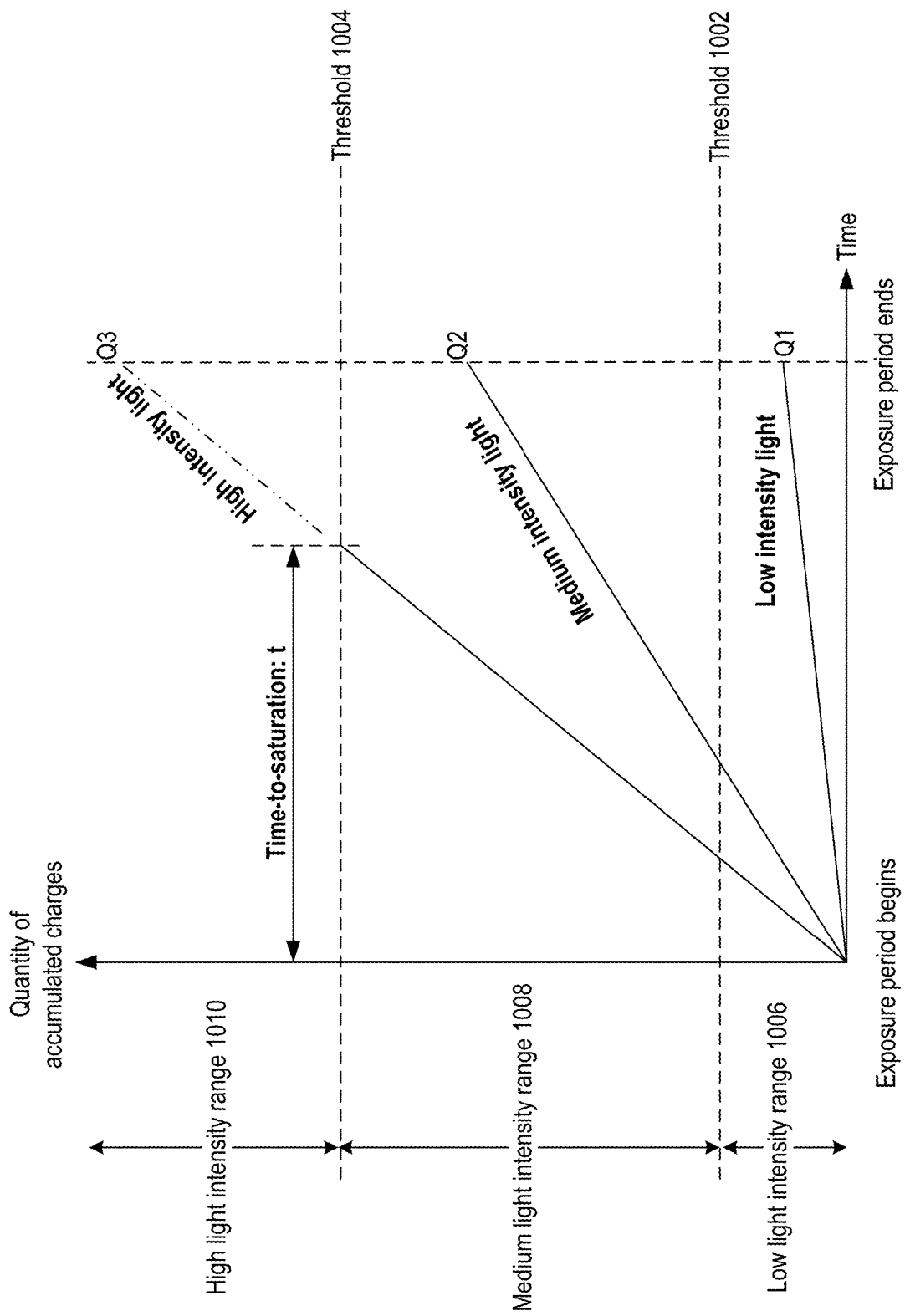
FIG. 10 illustrates examples of light intensity ranges to be measured by a pixel cell of FIG. 6.

As described above, charge generated by photodiode PD within an exposure period can be temporarily stored in charge storage device 902 and converted to a voltage. The voltage can be quantized to represent an intensity of the incident light based on a pre-determined relationship between the charge and the incident light intensity. Reference is now made to FIG. 10, which illustrates a quantity of charge accumulated with respect to time for different light intensity ranges. The total quantity of charge accumulated at a particular time point can reflect the intensity of light incident upon photodiode PD of FIG. 6 within an exposure period. The quantity can be measured when the exposure period ends. A threshold 1002 and a threshold 1004 can be defined for a threshold's quantity of charge defining a low light intensity range 1006, a medium light intensity range 1008, and a high light intensity range 1010 for the intensity of the incident light. For example, if the total accumulated charge is below threshold 1002 (e.g., Q1), the incident light intensity is within low light intensity range 1006. If the total accumulated charge is between threshold 1004 and threshold 1002 (e.g., Q2), the incident light intensity is within medium light intensity range 1008. If the total accumulated charge is above threshold 1004, the incident light intensity is within medium light intensity range 1010. The quantity of the accumulated charge, for low and medium light intensity ranges, can correlate with the intensity of the incident light, if the photodiode does not saturate within the entire low light intensity range 1006 and the measurement capacitor does not saturate within the entire medium light intensity range 1008.

The definitions of low light intensity range 1006 and medium light intensity range 1008, as well as thresholds 1002 and 1004, can be based on the full well capacity of photodiode PD and the capacity of charge storage device 902. For example, low light intensity range 706 can be defined such that the total quantity of residual charge stored in photodiode PD, at the end of the exposure period, is below or equal to the storage capacity of the photodiode, and threshold 1002 can be based on the full well capacity of photodiode PD. Moreover, medium light intensity range 1008 can be defined such that the total quantity of charge stored in charge storage device 902, at the end of the exposure period, is below or equal to the storage capacity of the measurement capacitor, and threshold 1004 can be based on the storage capacity of charge storage device 902. Typically threshold 1004 is can be based on a scaled storage capacity of charge storage device 902 to ensure that when the quantity of charge stored in charge storage device 902 is measured for intensity determination, the measurement capacitor does not saturate, and the measured quantity also relates to the incident light intensity. As to be described below, thresholds 1002 and 1004 can be used to detect whether photodiode PD and charge storage device 902 saturate, which can determine the intensity range of the incident light.

In addition, in a case where the incident light intensity is within high light intensity range 1010, the total overflow charge accumulated at charge storage device 902 may exceed threshold 1004 before the exposure period ends. As additional charge is accumulated, charge storage device 902 may reach full capacity before the end of the exposure period, and charge leakage may occur. To avoid measurement error caused due to charge storage device 902 reaching full capacity, a time-to-saturation measurement can be performed to measure the time duration it takes for the total overflow charge accumulated at charge storage device 902 to reach threshold 1004. A rate of charge accumulation at charge storage device 902 can be determined based on a ratio between threshold 1004 and the time-to-saturation, and a hypothetical quantity of charge (Q3) that could have been accumulated at charge storage device 902 at the end of the exposure period (if the capacitor had limitless capacity) can be determined by extrapolation according to the rate of charge accumulation. The hypothetical quantity of charge (Q3) can provide a reasonably accurate representation of the incident light intensity within high light intensity range 1010.

Referring back to FIG. 9, to measure high light intensity range 1010 and medium light intensity range 1008, charge transfer transistor M1 can be biased by TG signal in a partially turned-on state. For example, the gate voltage of charge transfer transistor M1 (TG) can be set based on a target voltage developed at photodiode PD corresponding to the full well capacity of the photodiode. With such arrangements, only overflow charge (e.g., charge generated by the photodiode after the photodiode saturates) will transfer through charge transfer transistor M1 to reach charge storage device 902, to measure time-to-saturation (for high light intensity range 1010) and/or the quantity of charge stored in charge storage device 902 (for medium light intensity range 1008). For measurement of medium and high light intensity ranges, the capacitance of charge storage device 902 (by connecting $C_{EXT}$ and $C_{FD}$) can also be maximized to increase threshold 1004.

Moreover, to measure low light intensity range 1006, charge transfer transistor M1 can be controlled in a fully turned-on state to transfer the residual charge stored in photodiode PD to charge storage device 902. The transfer can occur after the quantization operation of the overflow charge stored at charge storage device 902 completes and after charge storage device 902 is reset. Moreover, the capacitance of charge storage device 902 can be reduced. As described above, the reduction in the capacitance of charge storage device 902 can increase the charge-to-voltage conversion ratio at charge storage device 902, such that a higher voltage can be developed for a certain quantity of stored charge. The higher charge-to-voltage conversion ratio can reduce the effect of measurement errors (e.g., quantization error, comparator offset, etc.) introduced by subsequent quantization operation on the accuracy of low light intensity determination. The measurement error can set a limit on a minimum voltage difference that can be detected and/or differentiated by the quantization operation. By increasing the charge-to-voltage conversion ratio, the quantity of charge corresponding to the minimum voltage difference can be reduced, which in turn reduces the lower limit of a measurable light intensity by pixel cell 602a and extends the dynamic range.

The charge (residual charge and/or overflow charge) accumulated at charge storage device 902 can develop an analog voltage at the OF node, which can be buffered by switchable buffer 904 at PIXEL_OUT and quantized by ADC 616. As shown in FIG. 9, ADC 616 includes a comparator 906 which can be reset by a transistor M8, and output logic circuits 908. ADC 616 is also coupled with memory bank 912 and counter 914. Counter 914 can generate a set of count values based on a free-running clock signal, whereas memory bank 912 can be controlled, by comparator 906 via output logic circuits 908, to store a count value (e.g., the latest count value) generated by counter 914. In some examples, memory bank 912 can include an array of latch devices to store multiple bits as a pixel value. The stored count value can be output via pixel output buses 816.

Comparator 906 can compare an analog voltage COMP_IN, which is derived from PIXEL_OUT by the CC capacitor, against a threshold VREF, and generate a decision VOUT based on the comparison result. The CC capacitor can be used in a noise/offset compensation scheme to store the reset noise and comparator offset information in a VCC voltage, which can be added to the PIXEL_OUT voltage to generate the COMP_IN voltage, to cancel the reset noise component in the PIXEL_OUT voltage. The offset component remains in the COMP_IN voltage and can be cancelled out by the offset of comparator 906 when comparator 906 compares the COMP_IN voltage against threshold VREF to generate the decision VOUT. Comparator 906 can generate a logical one for VOUT if the COMP_IN voltage equals or exceeds VREF. Comparator 906 can also generate a logical zero for VOUT if the COMP_IN voltage falls below VREF. VOUT can control a latch signal which controls memory bank 912 to store a count value from counter 914.

Figure 11B:
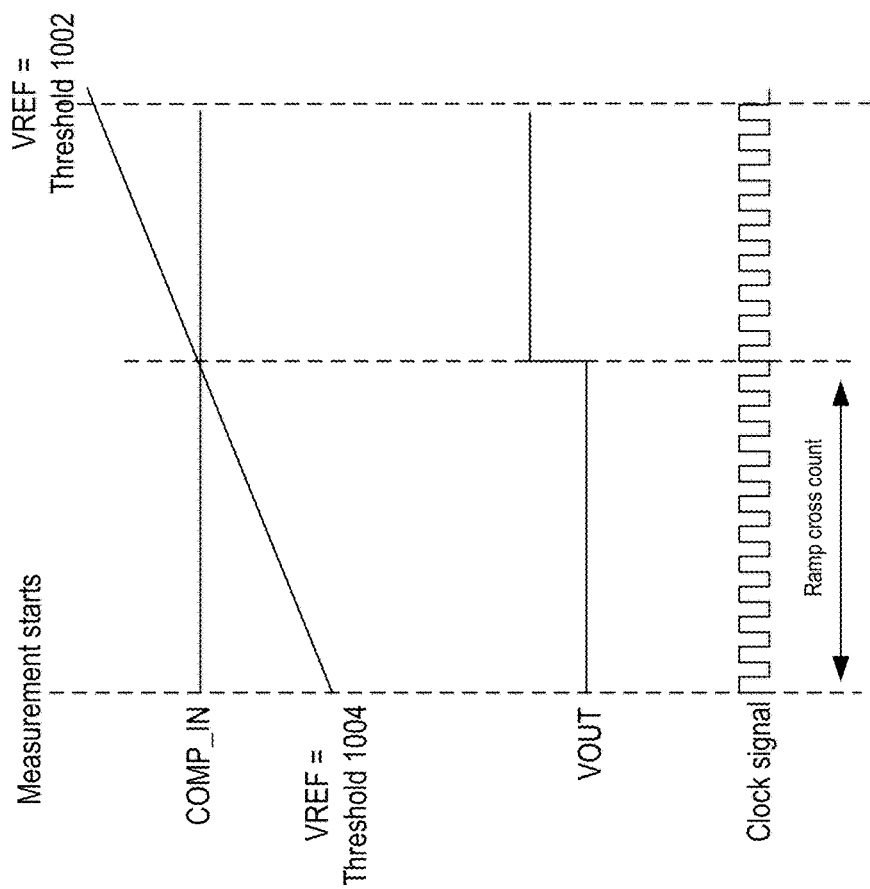
FIGS. 11A, 11B, 11C, and 11D illustrate techniques for performing quantization.
Figure 11A:
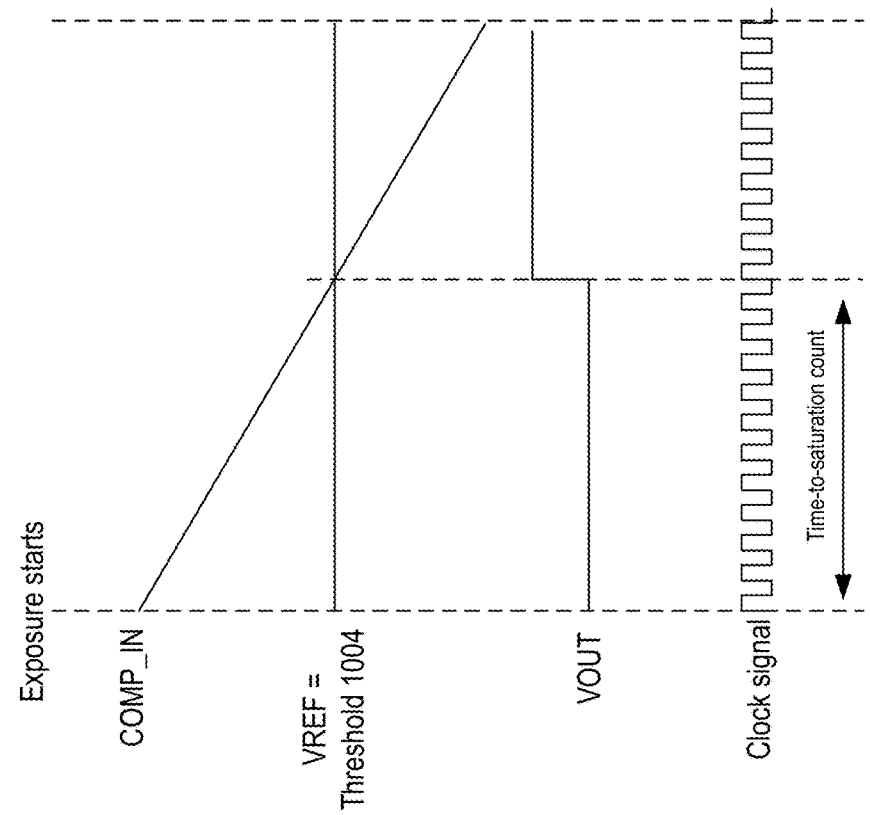

FIG. 11A illustrates an example of time-to-saturation measurement by ADC 616. To perform the time-to-saturation measurement, a threshold generator (which can be external to pixel cell 602a) can generate a fixed VREF. Fixed VREF can be set at a voltage corresponding a charge quantity threshold for saturation of charge storage device 902 (e.g., threshold 1004 of FIG. 10). Counter 914 can start counting right after the exposure period starts (e.g., right after charge draining transistor M0 is disabled). As the COMP_IN voltage ramps down (or up depending on the implementation) due to accumulation of overflow charge at charge storage device 902, clock signal keeps toggling to update the count value at counter 914. The COMP_IN voltage may reach the fixed VREF threshold at a certain time point, which causes VOUT to flip from low to high. The change of VOUT may stop the counting of counter 914, and the count value at counter 914 may represent the time-to-saturation.

FIG. 11B illustrates an example of measurement of a quantity of charge stored at charge storage device 902. After measurement starts, the threshold generator can generate a ramping VREF, which can either ramp up (in the example of FIG. 11B) or ramp down depending on implementation. The rate of ramping can be based on the frequency of the clock signal supplied to counter 914. In a case where overflow charge is measured, the voltage range of ramping VREF can be between threshold 1004 (charge quantity threshold for saturation of charge storage device 902) and threshold 1002 (charge quantity threshold for saturation of photodiode PD), which can define the medium light intensity range. In a case where residual charge is measured, the voltage range of the ramping VREF can be based on threshold 1002 and scaled by the reduced capacity of charge storage device 902 for residual charge measurement. In the example of FIG. 11B, the quantization process can be performed with uniform quantization steps, with VREF increasing (or decreasing) by the same amount for each clock cycle. The amount of increase (or decrease) of VREF corresponds to a quantization step. When VREF reaches within one quantization step of the COMP_IN voltage, VOUT of comparator 906 flips, which can stop the counting of counter 914, and the count value can correspond to a total number of quantization steps accumulated to match, within one quantization step, the COMP_IN voltage. The count value can become a digital representation of the quantity of charge stored at charge storage device 902, as well as the digital representation of the incident light intensity.

As discussed above, ADC 616 can introduce quantization errors when there is a mismatch between a quantity of charge represented by the quantity level output by ADC 616 (e.g., represented by the total number of quantization steps) and the actual input quantity of charge that is mapped to the quantity level by ADC 808. The quantization error can be reduced by using a smaller quantization step size. In the example of FIG. 11B, the quantization error can be reduced by the amount of increase (or decrease) in VREF per clock cycle.

Although quantization error can be reduced by using smaller quantization step sizes, area and performance speed may limit how far the quantization step can be reduced. With smaller quantization step size, the total number of quantization steps needed to represent a particular range of charge quantities (and light intensity) may increase. A larger number of data bits may be needed to represent the increased number of quantization steps (e.g., 8 bits to represent 255 steps, 7 bits to represent 127 steps, etc.). The larger number of data bits may require additional buses to be added to pixel output buses 816, which may not be feasible if pixel cell 601 is used on a head-mounted device or other wearable devices with very limited spaces. Moreover, with a larger number of quantization step size, ADC 808 may need to cycle through a larger number of quantization steps before finding the quantity level that matches (with one quantization step), which leads to increased processing power consumption and time, and reduced rate of generating image data. The reduced rate may not be acceptable for some applications that require a high frame rate (e.g., an application that tracks the movement of the eyeball).

Figure 11C:
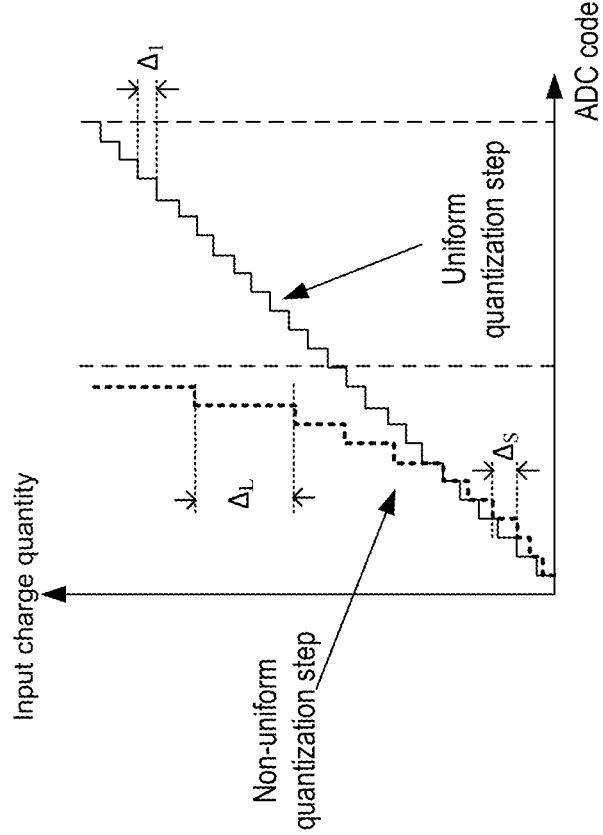

One way to reduce quantization error is by employing a non-uniform quantization scheme, in which the quantization steps are not uniform across the input range. FIG. 11C illustrates an example of a mapping between the ADC codes (the output of the quantization process) and the input charge quantity level for a non-uniform quantization process and a uniform quantization process. The dotted line illustrates the mapping for the non-uniform quantization process, whereas the solid line illustrates the mapping for the uniform quantization process. For the uniform quantization process, the quantization step size (denoted by $\Delta_1$) is identical for the entire range of input charge quantity. In contrast, for the non-uniform quantization process, the quantization step sizes are different depending on the input charge quantity. For example, the quantization step size for a low input charge quantity (denoted by $\Delta_S$) is smaller than the quantization step size for a large input charge quantity (denoted by $\Delta_L$). Moreover, for the same low input charge quantity, the quantization step size for the non-uniform quantization process ($\Delta_S$) can be made smaller than the quantization step size for the uniform quantization process ($\Delta_1$).

One advantage of employing a non-uniform quantization scheme is that the quantization steps for quantizing low input charge quantities can be reduced, which in turn reduces the quantization errors for quantizing the low input charge quantities, and the minimum input charge quantities that can be differentiated by ADC 616 can be reduced. Therefore, the reduced quantization errors can push down the lower limit of the measureable light intensity of the image sensor, and the dynamic range can be increased. Moreover, although the quantization errors are increased for the high input charge quantities, the quantization errors may remain small compared with high input charge quantities. Therefore, the overall quantization errors introduced to the measurement of the charge can be reduced. On the other hand, the total number of quantization steps covering the entire range of input charge quantities may remain the same (or even reduced), and the aforementioned potential problems associated with increasing the number of quantization steps (e.g., increase in area, reduction in processing speed, etc.) can be avoided.

Figure 11D:
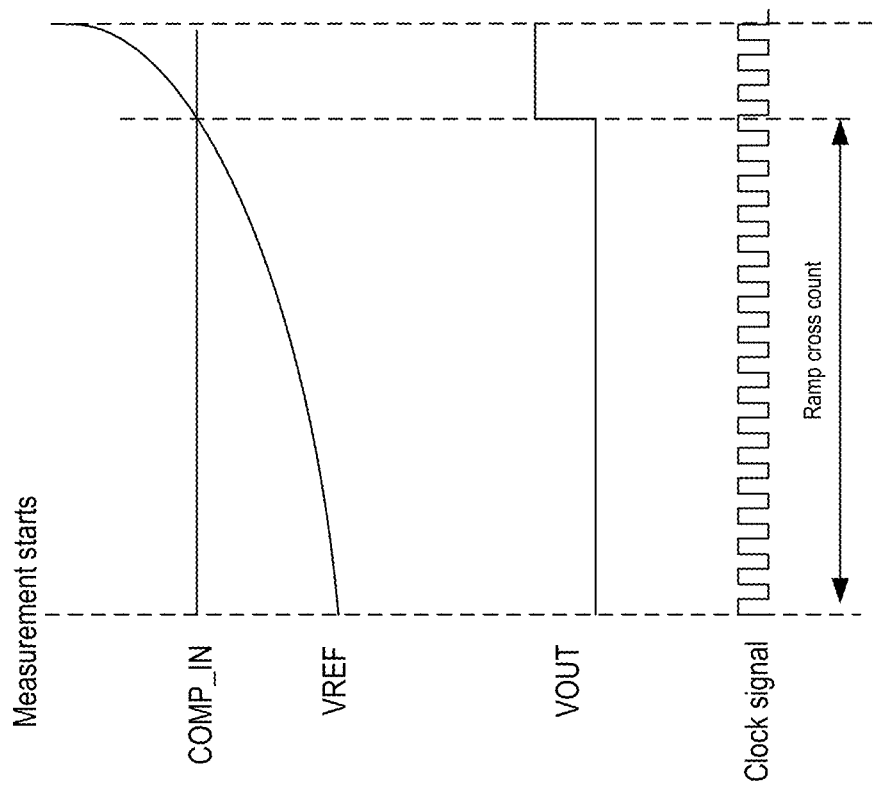

FIG. 11D illustrates an example of quantizing an analog voltage by pixel ADC 808 using a non-uniform quantization process. Compared with FIG. 11B (which employs a uniform quantization process), VREF increases in a non-linear fashion with each clock cycle, with a shallower slope initially and a steeper slope at a later time. The differences in the slopes are attributed to the uneven quantization step sizes. For lower counter count values (which correspond to a lower input quantity range), the quantization steps are made smaller, hence VREF increases at a slower rate. For higher counter count values (which correspond to a higher input quantity range), the quantization steps are made larger, hence VREF increases at a higher rate. The non-uniform VREF slope can be generated based on, for example, changing the frequency of counting of counter 814, changing the relationship between the VREF voltage and the count values of counter 914, etc. In some examples, the non-uniform quantization process of FIG. 11D can be employed for light intensity determination for low light intensity range 1006 and medium light intensity range 1008.

Referring back to FIG. 9, controller 920 can perform a TTS quantization operation, a quantization operation to measure a quantity of overflow charge (herein after, "FD ADC" operation), and a quantization operation to measure a quantity of residual charge (hereinafter "PD ADC" operation). Controller 920 can also skip one or more of the quantization operations. Output logic circuits 908 can select which of the quantization operations to store the count value at memory bank 912. Output logic circuits 908 can make the selection based on determining, based on the output of comparator 906 in each quantization operation, whether a quantity of the residual charge in photodiode PD exceeds a saturation threshold of the photodiode (e.g., corresponding to threshold 1002 of FIG. 10), and whether a quantity of the overflow charge in charge storage device 902 exceeds a saturation threshold of the charge storage device (e.g., corresponding to threshold 1004 of FIG. 10). If output logic circuits 908 detect that the quantity of the overflow charge exceeds threshold 1004 during the TTS operation, output logic circuits 908 can store the TTS output in memory bank 912. If output logic circuits 908 detect that the quantity of the overflow charge does not exceed threshold 1004 but that the quantity of the residual charge exceeds threshold 1002, output logic circuits 908 can store the FD ADC output in memory bank 912. Lastly if output logic circuits 908 detect the quantity of the residual charge does not exceed threshold 1002, output logic circuits 908 can store the PD ADC output in memory bank 912. In some examples, output logic circuits 908 can include registers to store one or more indications of whether saturation of charge storage device 902 is detected and whether the saturation of photodiode PD is detected, which output logic circuits 908 can use to perform the selection.

Figure 12A:
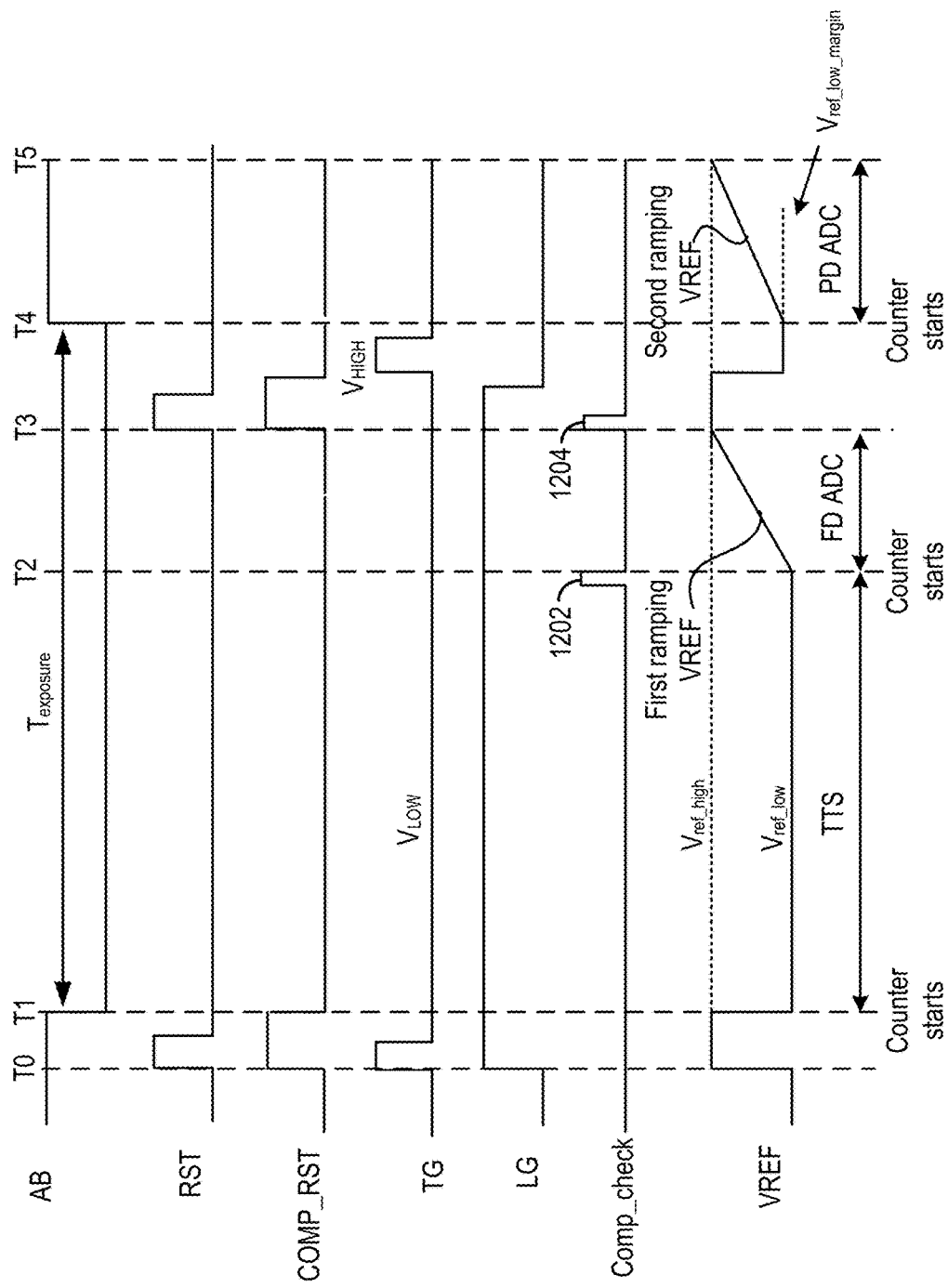
FIGS. 12A and 12B illustrate example sequences of control signals to perform light intensity measurement.
Figure 12B:
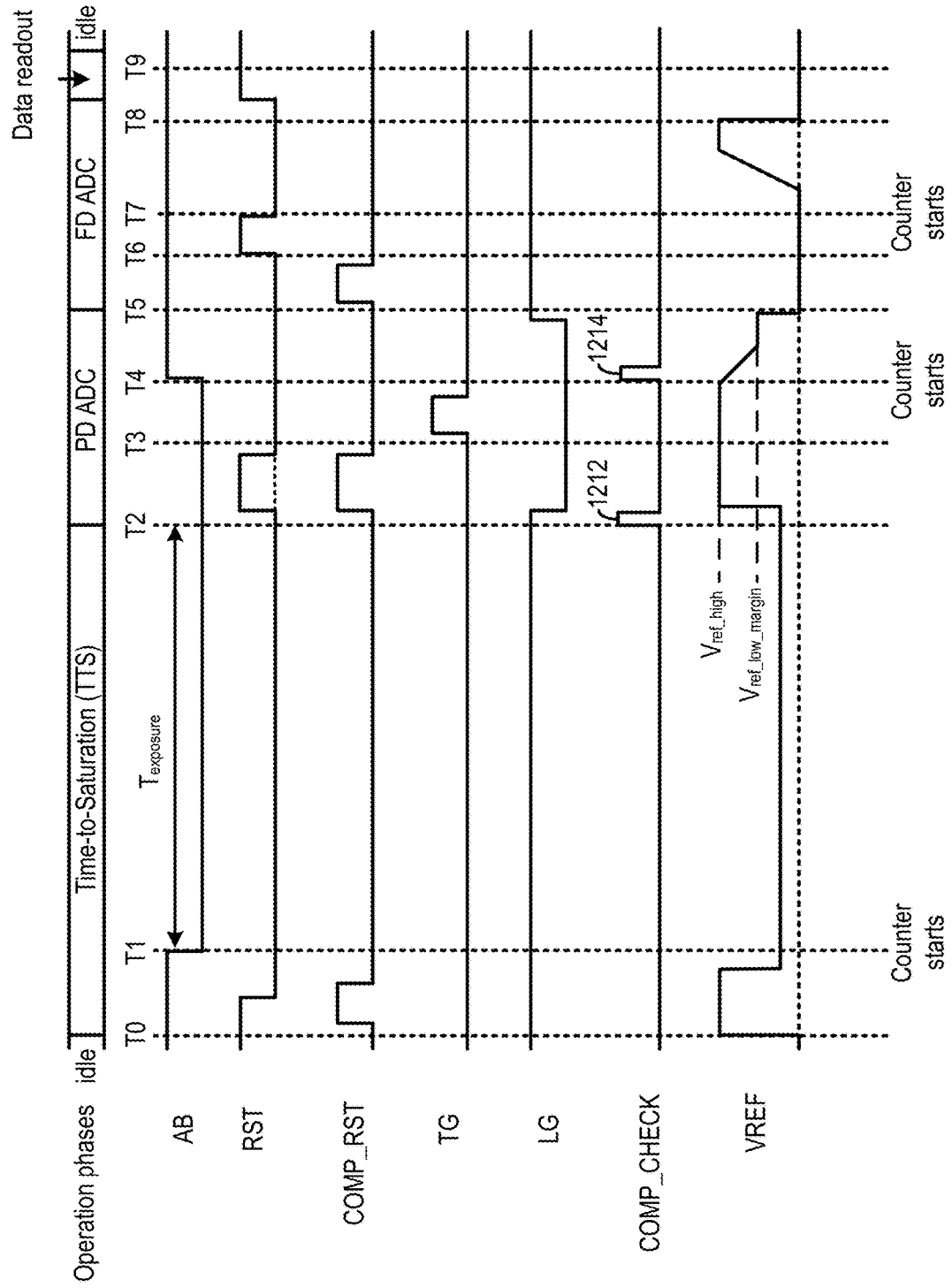

Reference is now made to FIG. 12A and FIG. 12B, which illustrate example sequences of the control signals of pixel cell 602a generated by controller 920. Both FIG. 12A and FIG. 12B illustrate the change of AB, RST, COMP_RST, TG, LG, and VREF with respect to time. Referring to FIG. 12A, the period between times T0 and T1 can correspond to a first reset phase, in which charge storage device 902 and comparator 906 can be put in a reset state by controller 920 by asserting the RST and COMP_RST signals, while the AB signal can be asserted to prevent charge generated by photodiode PD from reaching charge storage device 902. Both RST and LG signals are asserted to reset $C_{FD}$ and $C_{EXT}$ capacitors to set PIXEL_OUT at the reset level. With COMP_RST signal asserted and the positive terminal of comparator 906 connected to $V_{ref\_high}$, COMP_IN can be set to a sum of $V_{ref\_high}$ and comparator offset $V_{comp\_offset}$. Moreover, with RST signal asserted, PIXEL_OUT can be set the reset voltage $V_{pixel\_out\_rst}$ and can include reset noise $V\sigma_{KTC}$. A first sampling operation can be performed by the CC capacitor to store a $V_{CC}$ voltage including the components of the comparator offset, the reset noise, and PIXEL_OUT voltage at the reset level, as follows:

$$V_{cc}(T1) = (V_{ref\_high} + V_{comp\_offset}) - (V_{pixel\_out\_rst} + B\sigma_{KTC}) \quad \text{(Equation 1)}$$

At time T1, the RST signal, the AB signal, and the COMP_RST signal are released, which starts an exposure period (labelled $T_{exposure}$) in which photodiode PD can accumulate and transfer charge. Exposure period $T_{exposure}$ can end at time T4 when the AB signal is asserted. Between times T1 and T3, TG signal can set charge transfer transistor M1 in a partially turned-on state to allow PD to accumulate residual charge before photodiode PD saturates. If the light intensity in the medium or high intensity ranges of FIG. 10, photodiode PD can saturate and transfer overflow charge via charge transfer transistor M1. LG signal can remain asserted to operate in low gain mode, in which both $C_{FD}$ capacitor and $C_{EXT}$ capacitor are connected in parallel to form charge storage device 902 to store the overflow charge. The overflow charge develops a new PIXEL_OUT voltage, $V_{pixel\_out\_sig1}$. The CC capacitor can AC couple the new PIXEL_OUT voltage $V_{pixel\_out\_sig1}$ into COMP_IN voltage by adding the $V_{CC}$ voltage, which includes the reset noise and comparator offset component. The new PIXEL_OUT voltage also includes reset noise, which can be cancelled by the reset noise component of the $V_{CC}$ voltage. The COMP_IN voltage at time Tx between times T1 and T3 can be as follows:

$$V_{comp\_in}(Tx) = V_{pixel\_out\_sig1} - V_{pixel\_out\_rst} + V_{ref\_high} + V_{comp\_offset} \quad \text{(Equation 2)}$$

In Equation 2, the difference between $V_{pixel\_out\_sig1} - V_{pixel\_out\_rst}$ represents the quantity of overflow charge stored in charge storage device 902. The comparator offset in the COMP_IN voltage can also cancel out the comparator offset introduced by comparator 906 when performing the comparison.

Between times T1 and T3, two phases of measurement of the COMP_IN voltage can be performed, including a time-to-saturation (TTS) measurement phase for high light intensity range 1010 and an FD ADC phase for measurement of overflow charge for medium light intensity 1008. Between times T1 and T2 the TTS measurement can be performed by comparing COMP_IN voltage with a static $V_{ref\_low}$ representing a saturation level of charge storage device 902 by comparator 906. When PIXEL_OUT voltage reaches the static VREF, the output of comparator 906 (VOUT) can trip, and a count value from counter 914 at the time when VOUT trips can be stored into memory bank 912. At time T2, controller 920 can perform a check 1202 of the state of comparator 906. If the output of comparator 906 trips, controller 920 can store the state in a register of output logic circuits 908 indicating that the overflow charge in charge storage device 902 exceeds threshold 1004. The storage of the state can also prevent subsequent measurement phases (FD ADC and PD ADC) from overwriting the count value stored in memory bank 912. The count value from TTS operation can then be provided to represent the intensity of light received by photodiode PD during the exposure period.

Between times T2 and T3, the FD ADC operation can be performed by comparing COMP_IN voltage with a ramping VREF voltage that ramps from $V_{ref\_low}$ to $V_{ref\_high}$, which represents the saturation level of photodiode PD (e.g., threshold 1002), as described in FIG. 11B. If VOUT of comparator 906 trips during FD ADC, the count value of counter 914 at the time when VOUT trips can be stored in memory bank 912, if the state flag in output logic circuits 908 is not asserted which indicated that charge storage device 902 does not saturate in the TTS operation. Although exposure period ends at time T2, between times T2 and T3 photodiode PD remains capable of accumulating residual charge (if not saturated) or transferring overflow charge to charge storage device 902. At time T3, the controller can perform a check 1204 of the state of comparator 906 of the state of comparator 906. If the output of comparator 906 trips, and the state flag in output logic circuits 908 is not asserted from the TTS operation, controller 920 can assert the state flag in output logic circuits 908 to indicate that the overflow charge in charge storage device 902 exceeds threshold 1004. The assertion of the state flag can also prevent subsequent PD ADC phase from overwriting the count value stored in memory bank 912. The count value from FD ADC can then be provided to represent the intensity of light received by photodiode PD during the exposure period.

Between times T3 and T4 can be the second reset phase, in which both RST and COMP_RST signals are asserted to reset charge storage device 902 (comprising the parallel combination of $C_{FD}$ capacitor and $C_{EXT}$ capacitor) and comparator 906 to prepare for the subsequent PD ADC operation. The $V_{CC}$ voltage can be set according to Equation 1.

After RST and COMP_RST are released, LG is turned off to disconnect $C_{EXT}$ from $C_{FD}$ to increase the charge-to-voltage conversion rate for the PD ADC operation. TG is set at a level to fully turn on the M1 charge transfer transistor to transfer the residual charge stored in photodiode PD to $C_{FD}$. The residual charge develops a new PIXEL_OUT voltage, $V_{pixel\_out\_sig2}$. The CC capacitor can AC couple the new PIXEL_OUT voltage $V_{pixel\_out\_sig2}$ into COMP_IN voltage by adding the $V_{CC}$ voltage. Between times T3 and T4, photodiode PD remains capable of generating additional charge in addition to the charge generated between times T1 to T3, and transferring the additional charge to charge storage device 902. The $V_{pixel\_out\_sig2}$ also represents the additional charge transferred between times T3 and T4. At time T4, the COMP_IN voltage can be as follows:

$$V_{comp\_in}(T4) = V_{pixel\_out\_sig2} - V_{pixel\_out\_rst} + V_{ref\_high} + V_{comp\_offset} \quad \text{(Equation 3)}$$

In Equation 3, the difference between $V_{pixel\_out\_sig2} - V_{pixel\_out\_rst}$ represents the quantity of charge transferred by the photodiode to charge storage device 902 between times T3 and T4. The comparator offset in the COMP_IN voltage can also cancel out the comparator offset introduced by comparator 906 when performing the comparison.

At time T4, the AB signal is asserted to prevent photodiode PD from accumulating and transferring additional charge. Moreover, VREF can be set a static level $V_{ref\_low\_margin}$. Comparator 906 can compare the COMP_IN voltage with $V_{ref\_low\_margin}$ to determine whether photodiode PD saturates. $V_{ref\_low\_margin}$ is slightly higher than $V_{ref\_low}$, which represents the saturation level of photodiode PD (e.g., threshold 1002), to prevent false tripping of comparator 906 when the quantity of residual charge is close to but does not exceed the saturation level.

Between times T4 and T5, controller 920 can perform the PD ADC operation by comparing the COMP_IN voltage with a VREF ramp that starts from $V_{ref\_low\_margin}$ to $V_{ref\_high}$. In PD ADC phase, $V_{ref\_high}$ can represent the minimum detectable quantity of residual charge stored in photodiode PD, whereas $V_{ref\_low\_margin}$ can represent the saturation threshold of photodiode PD with margin to account for dark current, as described above. If the state flag in output logic circuits 908 remains not asserted at this point, and if the output of comparator 906 trips, the count value of counter 914 when comparator 906 trips can be stored into memory bank 912, and the count value from PD ADC can be provided to represent the intensity of light.

Reference is now made to FIG. 12B, which illustrates another example sequence of the control signals of pixel cell 602a generated by controller 920. In FIG. 12B, PD ADC operation can be performed between the TTS and FD ADC operations, which can reduce the accumulation of additional charge in charge storage device 902 or in photodiode PD after the TTS operation and improve shutter efficiency. As shown in FIG. 12B, between times T0 and T1 is a first reset phase as in FIG. 12A, in which both charge storage device 902 and comparator 906 can be put in a reset state by controller 920 by asserting the RST and COMP_RST signals. Moreover, LG signal is asserted, which allows $C_{FD}$ and $C_{EXT}$ capacitors to be reset by the RST signal and the PIXEL_OUT signal is set at the reset level. With COMP_RST signal asserted and the positive terminal of comparator 1102 connected to $V_{ref\_high}$, COMP_IN can be set to a sum of $V_{ref\_high}$ and comparator offset $V_{comp\_offset}$. Moreover, with RST signal asserted, PIXEL_OUT can be set the reset voltage $V_{pixel\_out\_rst}$ and can include reset noise $V\sigma_{KTC}$. A first sampling operation can be performed by the CC capacitor to store a $V_{CC}$ voltage including the components of the comparator offset, the reset noise, and PIXEL_OUT voltage at the reset level, as described in Equation 1 above:

$$V_{cc}(T1) = (V_{ref\_high} + V_{comp\_offset}) - (V_{pixel\_out\_rst} + V\sigma_{KTC}) \quad \text{(Equation 1)}$$

Moreover, AB signal can be asserted to prevent charge generated by photodiode PD from reaching charge storage device 902.

At time T1, the AB, COMP_RST, and the RST signals are released, which starts the exposure period in which photodiode PD can accumulate and transfer charge. TG signal can set transfer transistor M1 in a partially turned-on state to allow PD to transfer overflow charge to charge storage device 902. LG signal can remain asserted to operate in low gain mode, in which both $C_{FD}$ capacitor and $C_{EXT}$ capacitor are connected in parallel to form charge storage device 902 to store the overflow charge. The overflow charge develops a new PIXEL_OUT voltage, $V_{pixel\_out\_sig1}$. The CC capacitor can AC couple the PIXEL_OUT voltage to become the COMP_IN voltage. The COMP_IN voltage between times T1 and T2 can be set based on Equation 1 above.

Between times T1 and T2, a time-to-saturation (TTS) measurement can be performed by comparator 906 comparing COMP_IN voltage with a static $V_{ref\_low}$ to generate VOUT. At time T2, controller 920 can perform a check 1212 of the state of comparator 906. If the output of comparator 906 trips, controller 920 can store the state in a register of output logic circuits 908 indicating that the overflow charge in charge storage device 902 exceeds threshold 1004 as in FIG. 12A.

Following the TTS measurement, between times T2 and T5, the PD ADC operation can be performed to measure the residual charge stored in photodiode PD. The LG signal is de-asserted to disconnect $C_{EXT}$ from $C_{FD}$ to increase charge-to-voltage conversion ratio, as described above. The overflow charge (if any) is divided between $C_{FD}$ and $C_{EXT}$ based on a ratio of capacitances between $C_{FD}$ and $C_{EXT}$ such that $C_{FD}$ stores a first portion of the overflow charge and $C_{EXT}$ stores a second portion of the overflow charge. $V_{pixel\_out\_sig1}$ can correspond to the first portion of the overflow charge stored in $C_{FD}$.

To prepare for the PD ADC operation, between times T2 and T3, COMP_RST signal is asserted again to reset comparator 1102. The resetting of comparator 1102 can set a new $V_{CC}$ voltage across the CC capacitor based on a difference between $V_{pixel\_out\_sig1}$ and the output of comparator 1102 in the reset state, as follows:

$$V_{cc}(T2) = (V_{ref\_high} + V_{comp\_offset}) - (V_{pixel\_out\_sig1}(T3) + V\sigma_{KTC})$$ (Equation 4)

Optionally, the RST signal can be asserted between times T2 and T3 to reset $C_{FD}$ and to remove the first portion of the overflow charge, prior to the transfer of the residual charge. This allows the subsequent PD ADC operation to quantize only the residual charge rather than a mixture of the residual charge and the first portion of the overflow charge. Such arrangements can improve the accuracy of measurement of low light intensity as there is no need to remove the overflow charge component (based on the result of the subsequent FD ADC operation) from the PD ADC operation output which could otherwise introduce additional errors. On the other hand, not asserting the RST signal between times T2 and T3 can be advantageous, as such arrangements can introduce redundancy in the PD ADC and FD ADC operations and increase the signal-to-noise ratio, as both operations measure a mixture of residual and overflow charge.

Between times T3 and T4, COMP_RST signal is released so that comparator 1102 exits the reset state. Moreover, the TG signal can set transfer transistor M1 in a fully turned-on state to transfer the residual charge to $C_{FD}$. The residual charge can be transferred to $C_{FD}$, which changes the PIXEL_OUT voltage to $V_{pixel\_out\_sig2}$. The new PIXEL_OUT voltage can be AC coupled into a new COMP_IN voltage at time T4, as follows:

$$V_{comp\_in}(T4) = V_{pixel\_out\_sig2} - V_{pixel\_out\_sig1} + V_{ref\_high} + V_{comp\_offset}$$ (Equation 5)

In Equation 5, the difference between $V_{pixel\_out\_sig2} - V_{pixel\_out\_sig1}$ represents the quantity of residual charge transferred by the photodiode to charge storage device 902 between times T3 and T4.

After TG is fully turned-on between times T3 and T4, the TG is de-asserted to disconnect photodiode PD from $C_{FD}$ and $C_{EXT}$. As a result, no additional charge is transferred to $C_{FD}$ and $C_{EXT}$ after time T4 until the start of next exposure period. Compared with the arrangements of FIG. 12A where additional charge can be accumulated in photodiode PD during the FD ADC operation which typically takes a long time, in FIG. 12B the additional charge is accumulated only during the reset period T2-T3 and the transfer period T3-T4, both of which are typically much shorter than a FD ADC operation. Moreover, after T4, no additional overflow charge is accumulated at charge storage device 608a. As a result, both FD ADC and PD ADC can process charge accumulated in almost the same exposure period as the TTS operation, which can improve the shutter efficiency of the image sensor.

Between times T4 and T5, controller 920 can perform the PD ADC operation by comparing the COMP_IN voltage with a VREF ramp that starts from $V_{ref\_high}$ to $V_{ref\_low\_margin}$. In PD ADC phase, $V_{ref\_high}$ can represent the minimum detectable quantity of residual charge stored in photodiode PD, whereas $V_{ref\_low\_margin}$ can represent the saturation threshold of photodiode PD with margin to account for dark current, as described above. If photodiode PD does not saturate, COMP_IN can go above the VREF ramp. An inverted VOUT (VOUTb) can become a logical one and cause a count value to be stored in memory bank 912 for PD ADC. At time T5, the controller can perform a check 1214 of the state of comparator 906 of the state of comparator 906. If the output of comparator 906 trips, and the state flag in output logic circuits 908 is not asserted from the TTS operation, controller 920 can assert the state flag in output logic circuits 908 to indicate that the residual charge exceeds threshold 1002. The assertion of the state flag can also prevent subsequent FD ADC phase from overwriting the count value stored in memory bank 912. The count value from PD ADC can then be provided to represent the intensity of light received by photodiode PD during the exposure period.

Between times T5 and T8, a FD ADC operation can be made to measure the overflow charge transferred by photodiode PD within the exposure period. As photodiode PD remains disconnected from $C_{FD}$ and $C_{EXT}$, no additional charge is transferred to $C_{FD}$ and $C_{EXT}$, and the total charge stored in $C_{FD}$ and $C_{EXT}$ is mostly generated in the exposure period $T_{exposure}$, together with additional charge generated by the photodiode between times T3 and T4.

At time T5, the LG signal is asserted to connect $C_{FD}$ with $C_{EXT}$, which allows the second portion of the overflow charge stored in $C_{EXT}$ to combine with the residual charge stored in $C_{FD}$ (and the first portion of the overflow charge if RST is not asserted between times T2 and T3), and a new PIXEL_OUT voltage $V_{pixel\_out\_sig3}$ can develop at the parallel combination of $C_{FD}$ and $C_{EXT}$ and is to be quantized.

Between times T5 and T7, a noise sampling operation can be performed to mitigate the effect of reset noise and comparator offset on the FD ADC operation. Between times T5 and T6, comparator 1102 can be reset as part of the first sampling operation. The positive terminal of comparator 1102 is connected to the lower end of VREF, $V_{ref\_low}$. The $V_{CC}$ voltage can include components of reset noise and comparator offset as described above. The $V_{CC}$ voltage can be as follows:

$$V_{cc}(T5) = (V_{ref\_low} + V_{comp\_offset}) - (V_{pixel\_out\_sig3} + V\sigma_{KTC1})$$ (Equation 6)

Between times T6 and T7, both $C_{FD}$ and $C_{EXT}$ can be reset, while comparator 1102 exits the reset state, as part of a second sampling operation. As a result of resetting, PIXEL_OUT can be reset to a reset voltage $V_{pixel\_out\_rst}$. Moreover, second reset noise charge is also introduced into charge storage device 608, which can be represented by $V\sigma_{KTC2}$. The second reset noise charge typically tracks the first reset noise charge. At time T6, as the result of the second sampling operation, $V_{pixel\_out}$ can be as follows:

$$V_{pixel\_out}(T6) = V_{pixel\_out\_rst} + V\sigma_{KTC2} \quad \text{(Equation 7)}$$

At time T7, COMP_RST is released, and comparator 1102 exits the reset state. Via AC-coupling, the COMP_IN voltage can track $V_{pixel\_out}(T6)$ in addition to $V_{cc}(T5)$ as follows:

$$V_{comp\_in}(T7) = (V_{ref\_low} + V_{comp\_offset}) + (V_{pixel\_out\_rst} - V_{pixel\_out\_sig3}) + (V\sigma_{KTC2} - V\sigma_{KTC1}) \quad \text{(Equation 8)}$$

Following the second sampling operation, the COMP_IN voltage can be quantized by comparing against a VREF ramp between times T7 and T8. When VREF goes above COMP_IN, VOUT can become a logical one. If the state flag in output logic circuits 908 remains not asserted at this point, the count value of counter 914 when comparator 906 trips can be stored into memory bank 912, and the count value from FD ADC can be provided to represent the intensity of light. After time T8, the digital value stored in memory bank 912 can be read out to represent the intensity of light received by photodiode PD within the integration, at time T9. In a case where one image frame is generated in a single frame period, the frame period can span from time T0 to T8.

Although FIG. 12A and FIG. 12B show TTS, FD ADC and PD ADC operations are performed, it is understood that ADC 616 (and pixel cell 602a) needs not perform all of these operations, and can skip some of them. As to be described below, the quantization operations may vary for different photodiodes within pixel cell 602a.

In both FIG. 12A and FIG. 12B, the duration of the TTS measurement operations can track linearly with the duration of the exposure period. For example, in FIG. 12A, the duration of the TTS measurement operation can be set based on the duration of the exposure period ($T_{exposure}$) minus the duration for the FD ADC operation. As another example, in FIG. 12B, the duration of the TTS measurement operation can be set to be equal to the duration of the exposure period ($T_{exposure}$). In some examples, the duration of the TTS measurement operation and the duration of the exposure period can be set by controller 920 of FIG. 9 based on a state machine that counts a number of cycles of a clock signal supplied to the controller. For example, in FIG. 12A, controller 920 can store a first target count value and a second target count value representing, respectively, the end time of the TTS measurement operation and the end time of the exposure period. Controller 920 can start both the TTS measurement operation and the exposure period when the count is zero, end the TTS measurement operation (e.g., based on resetting counter 914) when the count is of a first value, and end the exposure period (e.g., enabling the AB switch in FIG. 12A, resetting charge sensing unit 614 and comparator 906 in FIG. 12B, etc.) when the count is of a second value. Moreover, in FIG. 12B, controller 920 can start both the TTS measurement operation and the exposure period when the count is zero, and end both the TTS measurement operation and the exposure period when the count is of a first value, so that the TTS measurement operation and the exposure period start and end at the same time.

Figure 13:
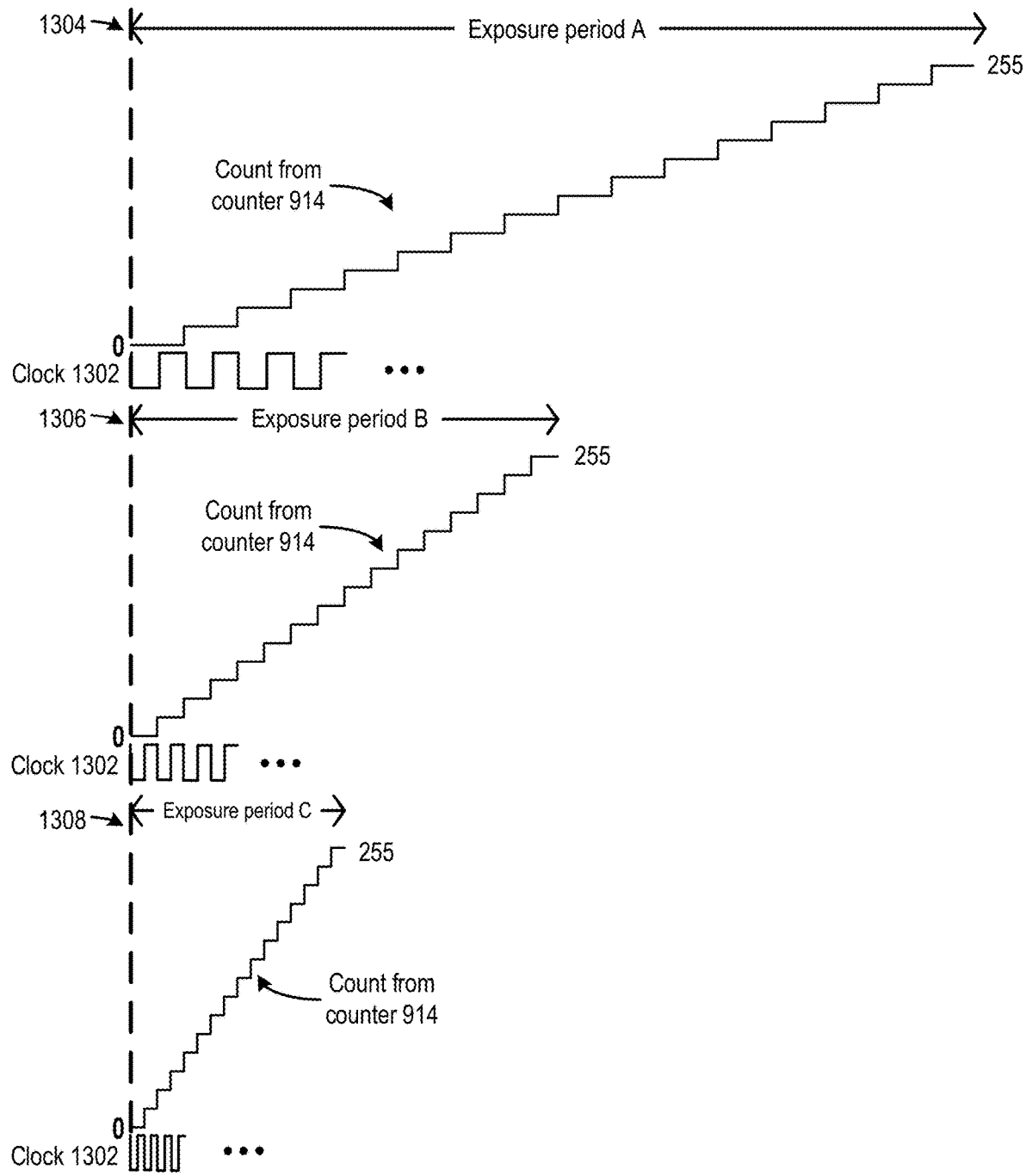
FIG. 13 illustrates examples of durations of exposure period and time-to-saturation (TTS) measurement operation.

While controlling the durations of the TTS measurement operation and the exposure period based on the same clock signal can reduce the complexity of controller 920, such arrangements can lead to the duration of the TTS measurement operation scaling linearly with the duration of the exposure period. FIG. 13 illustrates examples of exposure periods for different frequencies/periods of a clock signal 1302 supplied to controller 920. The clock signal is also supplied to counter 914 to control the rate at which counter 914 updates the count value, and the TTS measurement operation ends when the count value reaches a maximum (e.g., 255). As shown in plots 1304, 1306, and 1308 of FIG. 13, the exposure period and the TTS measurement operation have the same duration and both are controlled by the period of the clock signal. As the period of the clock signal reduces, the duration of both the exposure period and the TTS measurement operation also reduces together by the same proportion with respect to the clock signal period. For example, as the period of the clock signal reduces approximately by half across plots 1304, 1306, and 1308, the durations of exposure periods A, B, and C also reduce approximately by half across the plots.

There are various scenarios in which the period of clock signal 1302 supplied to controller 920 can be increased. For example, controller 920, as well as pixel cell 602a and image sensor 600, can operate at a lower frame rate, which allows controller 920 to operate at a lower operation speed and a lower clock rate. Lowering the clock rate of controller 920 can also reduce the power dissipation at the digital circuits of image sensor 600 that operate based on or otherwise synchronized with clock signal 1302, such as memory bank 912, counter 914, controller 920, etc. Moreover, the period of clock 1302 can also be increased to extend the exposure period in a case where the image sensor operates in a low ambient light environment. The extended exposure period allow the photodiode to generate more charge within the exposure period for measurement, which can reduce the signal-to-noise ratio.

Although the TTS measurement operations in FIG. 12A and FIG. 12B can reduce the non-linearity caused by the saturation of the capacitors and increase the upper limit of the dynamic range, various issues can arise if the TTS measurement is performed within the entirety of the exposure period of the photodiode, or at least the duration of the TTS measurement operation scales up linearly with the duration of the exposure period. One potential issue is power consumption. Specifically, referring back to FIG. 9, during the TTS measurement operation both voltage buffer 904 of charge sensing unit 614 and comparator 906 of the ADC 616 are powered on to compare the buffered voltage (COMP_IN) with the static threshold to generate the decision (VOUT). Both voltage buffer 904 and comparator 906 are analog devices and can consume huge static power when powered on. If the exposure period has a relatively long duration, and the TTS measurement operation is performed within the entirety of the exposure period, both voltage buffer 904 and comparator 906 can consume a huge amount of power for a long period of time, leading to a huge power consumption at the image sensor.

Figure 14A:
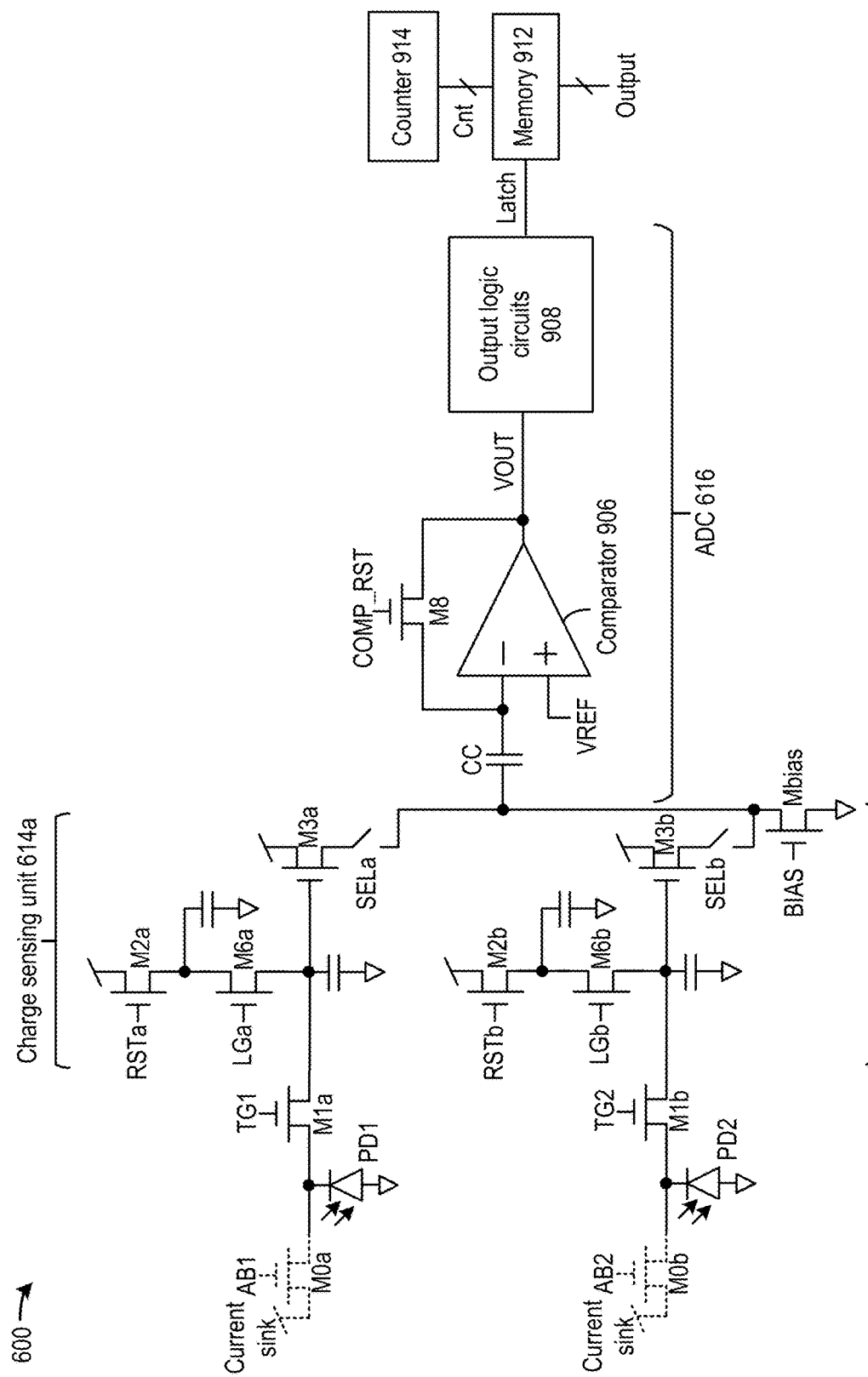
FIGS. 14A and 14B illustrate examples of an image sensor having multiple photodiodes sharing a quantizer.

In addition, performing the TTS measurement within the entirety of the exposure period may allow only one photodiode, within a group of photodiodes that shares ADC 616, to perform the TTS measurement operation. FIG. 14A illustrates an example image sensor 600 including multiple photodiodes that share ADC 616. The part of image sensor 600 illustrated in FIG. 14A can be of pixel cell 602a or can be of different pixel cells. As shown in FIG. 14A, ADC 616 and memory bank 912 can be shared among multiple photodiodes. For example, photodiode PD1, which can correspond to photodiodes 612a of FIG. 6, can be connected to charge sensing unit 616a, whereas photodiode PD2, which can correspond to photodiode 612b of FIG. 6, can be connected to a charge sensing unit 616b. The voltage buffer of each charge sensing unit can share a current source Mbias. The exposure period for the each photodiode can be controlled by the optional M0a and M0b transistors (based on assertion/de-assertion of the AB1 and AB2 signals), or based on resetting via transfer switches M1a and M1b. Photodiodes PD1 and PD2 can be configured to detect different frequency components of light. Charge sensing unit 616a and 616b can take turn, based on selection signals SELa and SELb, in accessing ADC 616 and memory bank 912. Compared with a case where a separate set of charge sensing unit 614, ADC 616, and memory bank 912 is provided for each photodiode, such arrangements can reduce the footprint and power consumption of the processing circuits and memory, which allows image sensor 600 to include more photodiodes to improve resolution. The control signals (e.g., RSTa, RSTb, LGa, LGb, SELa, SELb, COMP_RST, etc.) can be provided by controller 920 (not shown in FIG. 14A).

Figure 14B:
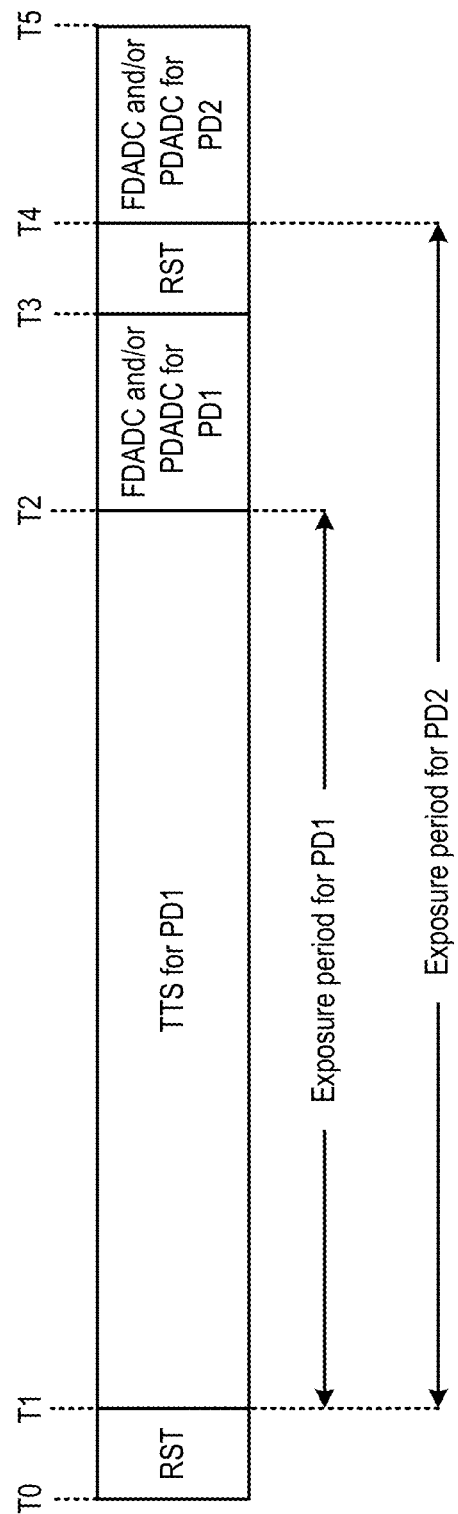

FIG. 14B illustrates example quantization operations of PD1 and PD2 of image sensor 600 of FIG. 14A. The quantization operations can be performed by ADC 616 and counter 914, and based on control signals provided by controller 920. In FIG. 14B, between times T0 and T1 charge sensing units 616a and 616b and comparator 906 are reset. Exposure periods for PD1 and PD2 starts at time T1, and the exposure period for PD1 ends at time T2. As in FIG. 12B, the TTS operation for PD1 can extend through the entirety of the exposure period of PD1 between times T1 and T2. After the TTS operation for PD1 completes, FD ADC and/or PD ADC operations can be performed for PD1, based on the schemes described in FIG. 12A and FIG. 12B, between times T2 and T3.

On the other hand, TTS operation is not performed for PD2. Instead, after the TTS operation completes for PD1, comparator 906 can be reset between times T3 and T4. The exposure period for PD2 also ends at time T4. FD ADC and/or PD ADC operations can then be performed for PD2 between times T4 and T5. Such arrangements can be due to PD1 being granted access to ADC 616 and memory bank 912 for the TTS operation within the entirety of the exposure period of PD1, between times T1 and T2. As a result, PD2 has no access to ADC 616 during that time. Moreover, to improve global shutter operation, the exposure periods for PD1 and PD2 should overlap as much as possible. To maximize the overlap, the exposure periods for PD1 and PD2 scan start at the same time (time T1), while the exposure period for PD2 is only extended to time T4 (while the exposure period for PD1 ends at time T2) to accommodate the FD ADC and/or PD ADC operation of PD1. Due to the substantial overlap between the exposure periods for PD1 and PD2, and that the TTS operation for PD1 is performed within the entirety of the exposure period of PD1 (and large part of the exposure period of PD2), there does not exist a time slot within the exposure period of PD2 for the TTS operation for PD2.

While the resource-sharing arrangements in FIG. 14A and FIG. 14B can reduce total power and footprint of ADC 616 and memory bank 912 in image sensor 600, such arrangements can lead to different dynamic ranges among the photodiodes. Specifically, while the upper limit of the dynamic range of PD1 can be improved by the TTS measurement operation, other photodiodes that do not have such improvement as TTS measurement operations are not performed for those photodiodes. As a result, different photodiodes within image sensor 600 can have different dynamic ranges. In a case where the photodiodes detect different frequency components of light, the arrangements in FIG. 14B can lead to uneven performances of the image sensor in measuring the different frequency components of incident light.

Figure 15A:
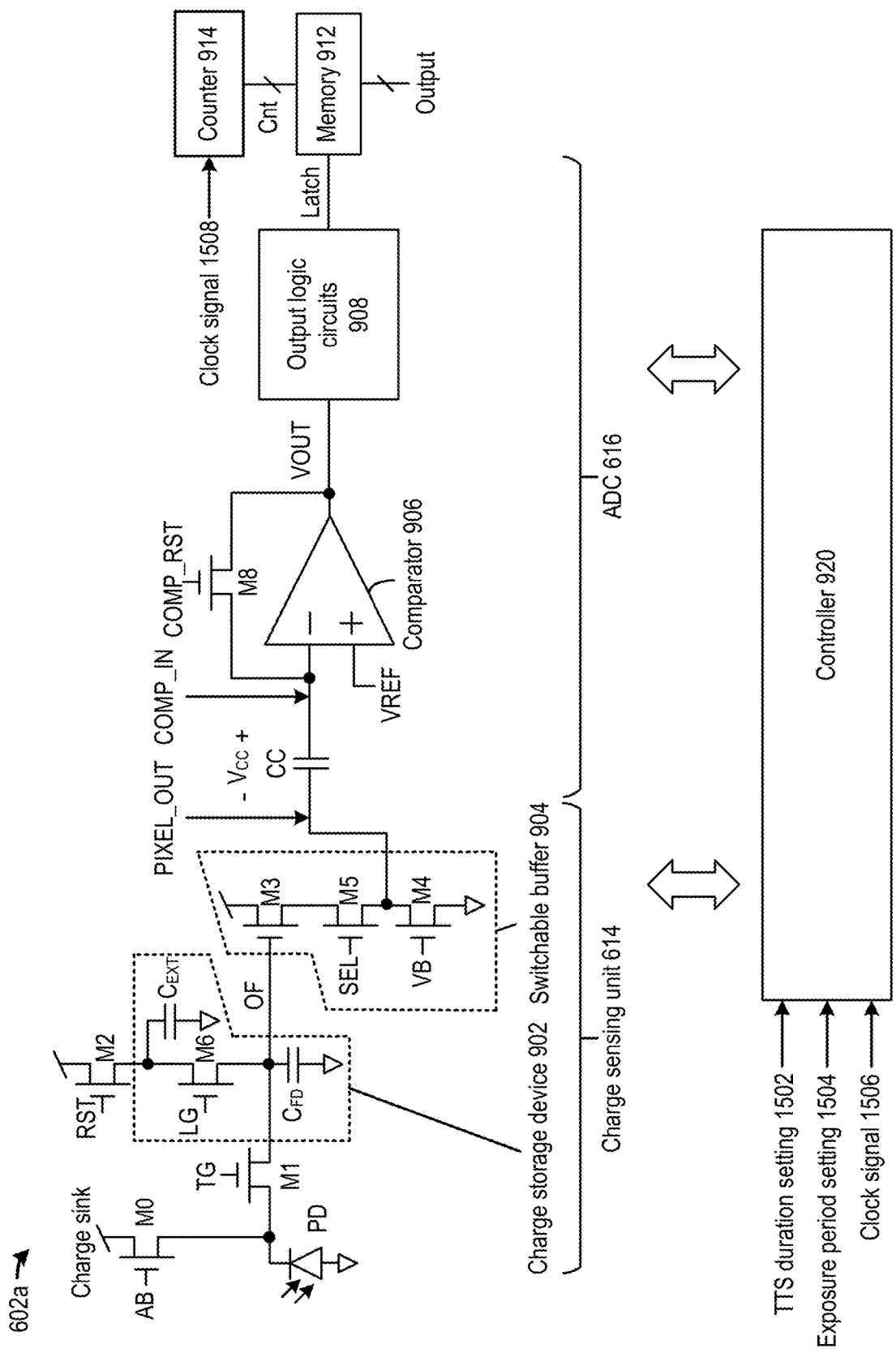
FIGS. 15A, 15B, 15C, 15D, and 15E illustrate examples of an image sensor and its operations.

FIG. 15A illustrates an example image sensor 600 which allows the duration of the TTS measurement operation to be set separately from the duration of the exposure period, which can address at least some of the issues above. The components shown in FIG. 15A can be part of a pixel cell 602a or external to pixel cell 602a. As shown in FIG. 15A, controller 920 can receive, as inputs, TTS duration setting 1502, exposure period setting 1504, and clock signal 1506. Controller 920 can operate based on clock signal 1506, which can define the speed of operation of controller 920. In addition, counter 914 can receive and operate based on a clock signal 1508, which can define the frequency at which the count values are updated. In some examples, clock signal 1508 can be generated by controller 920 using a programmable divider from clock signal 1506.

TTS duration setting 1502 can define a duration of the TTS measurement operation for photodiode PD, whereas exposure period setting 1504 can define a duration of the exposure period for photodiode PD. Based on the durations defined in the settings, as well as the frequency of clock signal 1506, controller 920 can determine a first target count value representing the end time of the TTS measurement operation as well as a second target count value representing the end time of the exposure period. Controller 920 can control the start and end of the exposure period duration and the TTS measurement operation duration based on counting the clock cycles of clock signal 1506, and comparing the counts with the target count values derived from TTS duration setting 1502 and exposure period setting 1504. Controller 920 can start both the exposure period and TTS measurement operation when the counter value is zero, end the TTS measurement operation (e.g., by resetting counter 914) when the count value equals the first target count value, and end the exposure period (e.g., enabling the AB switch in FIG. 12A, resetting charge sensing unit 614 and comparator 906 in FIG. 12B, etc.) when the count value equals the second target count value.

Pixel cell 602a can implement various techniques to allow the duration of the TTS measurement operation to be set separately from the duration of the exposure period. Specifically, TTS duration setting 1502 and exposure period setting 1504 can be supplied from separate registers, which allow the two settings to be individually programmable. In addition, clock signal 1508, which is supplied to counter 914 and sets the frequency at which counter 914 updates the count value, can have a different frequency from clock signal 1506 supplied to controller 920, whereas the frequency of clock signal 1508 can also be set based on TTS duration setting 1502. For example, given the maximum count of counter 914 (e.g., 255) and the duration of TTS measurement operation, controller 920 can determine the frequency of clock signal 1508 such that counter 914 can sweep through the entire range of count values within the TTS measurement operation. In addition, controller 920 can also use TTS duration setting 1502 to set a lower limit of the exposure period, to ensure that the exposure period does not end before the TTS measurement operation completes. In a case where exposure period setting 1504 sets a shorter exposure period than the duration of the TTS measurement operation, controller 920 can override exposure period setting 1504 and set the exposure period to be at least equal to the duration of the TTS measurement operation set according to TTS duration setting 1502.

Figure 15B:
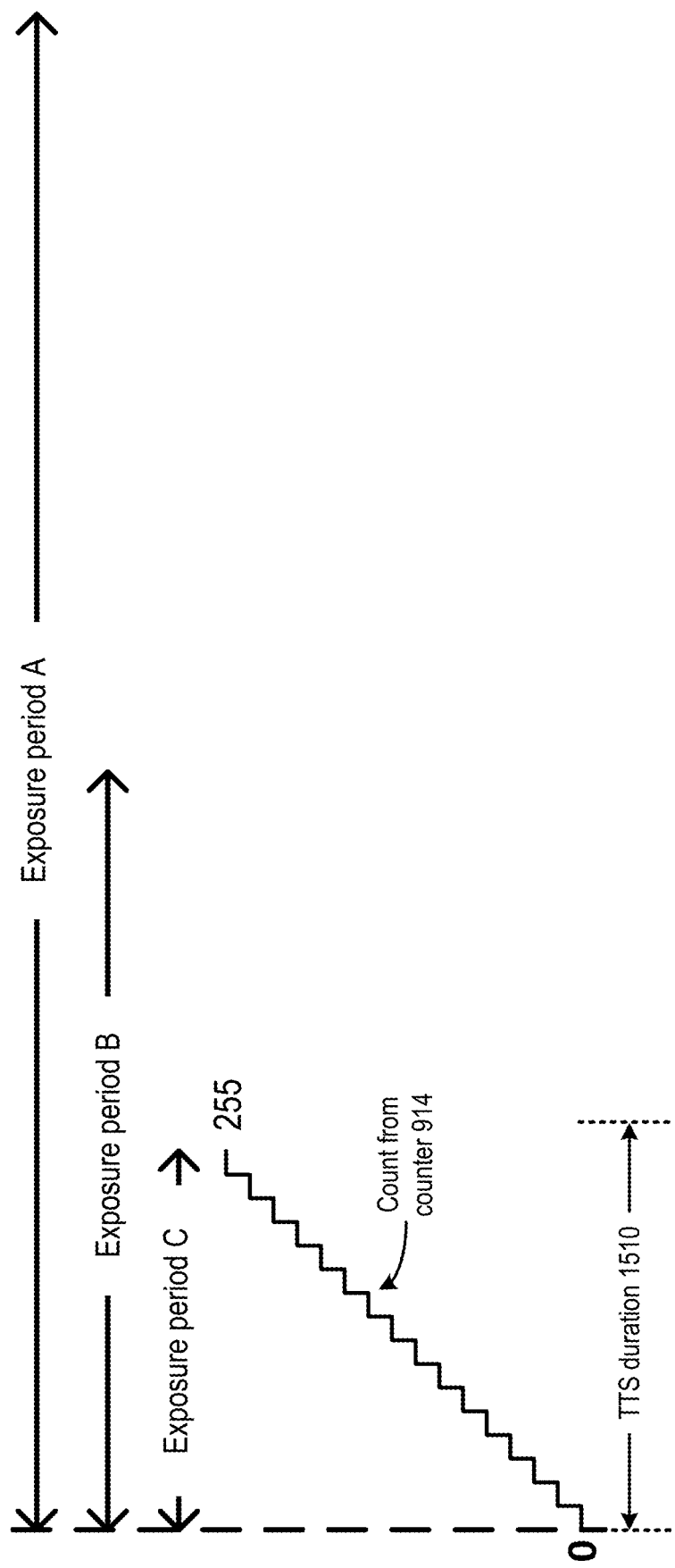

FIG. 15B illustrates example relationships between the duration of exposure period and the duration of the TTS measurement operation provided by pixel cell 602*a* of FIG. 15A. For example, referring to FIG. 15B, the frequency of clock signal 1506 (supplied to controller 920) can be adjusted to operate controller 920 at a different speeds to, for example, support different frame rates, to operate in environments having different ambient light conditions, etc., and the duration of the exposure period can vary as a result. In FIG. 15B, exposure period A can correspond to clock signal 1506 having a relatively low frequency, exposure period B can correspond to clock signal 1506 having a medium frequency, whereas exposure period C can correspond to clock signal 1506 having a relatively high frequency. But duration 1510 of TTS measurement operation, within which counter 914 counts from zero to the maximum count of 255, can remain constant among each of exposure periods A, B, and C. Moreover, in FIG. 15B, exposure period C can represent the minimum exposure period for the photodiode set by TTS duration 1510.

Figure 15C:
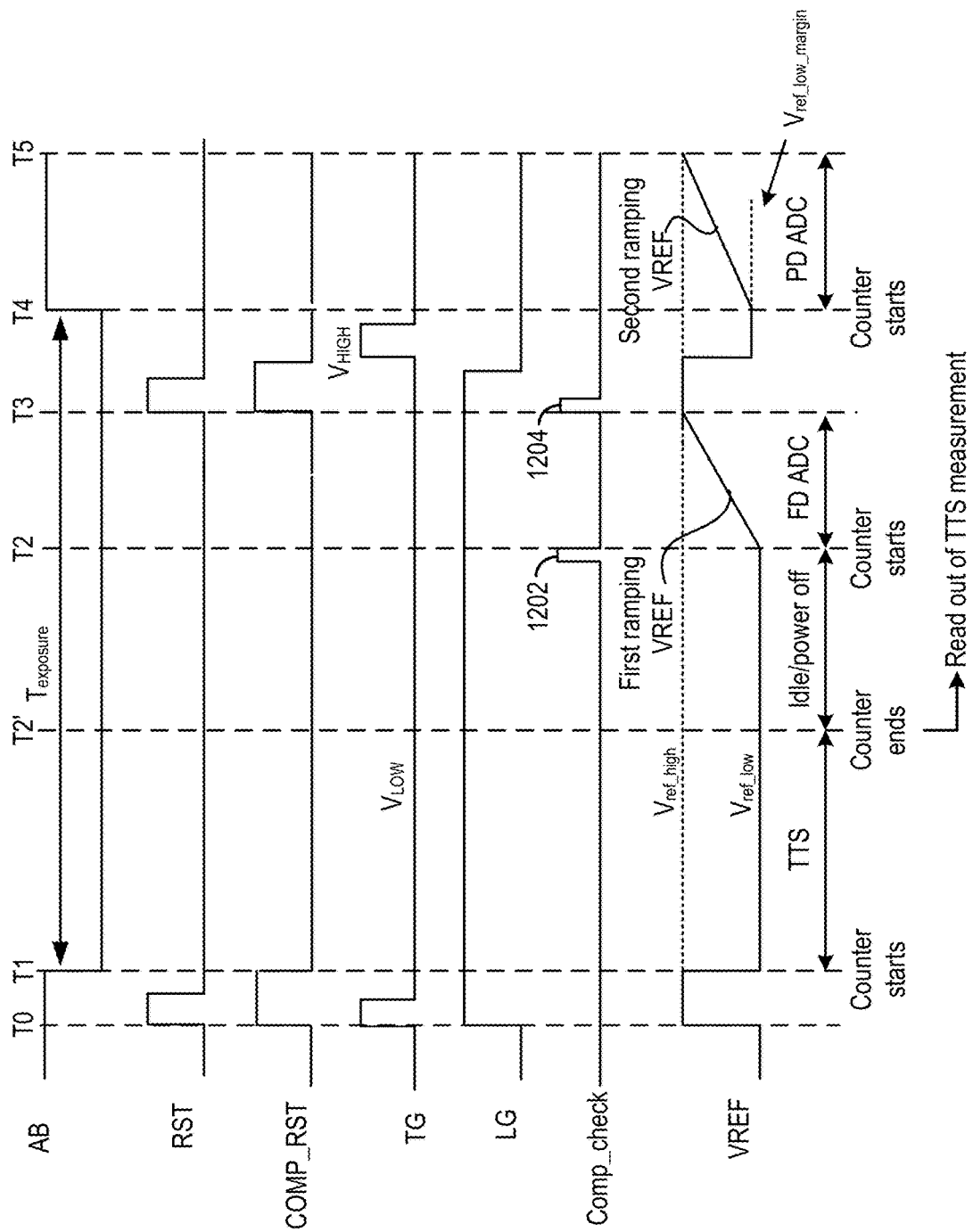
Figure 15D:
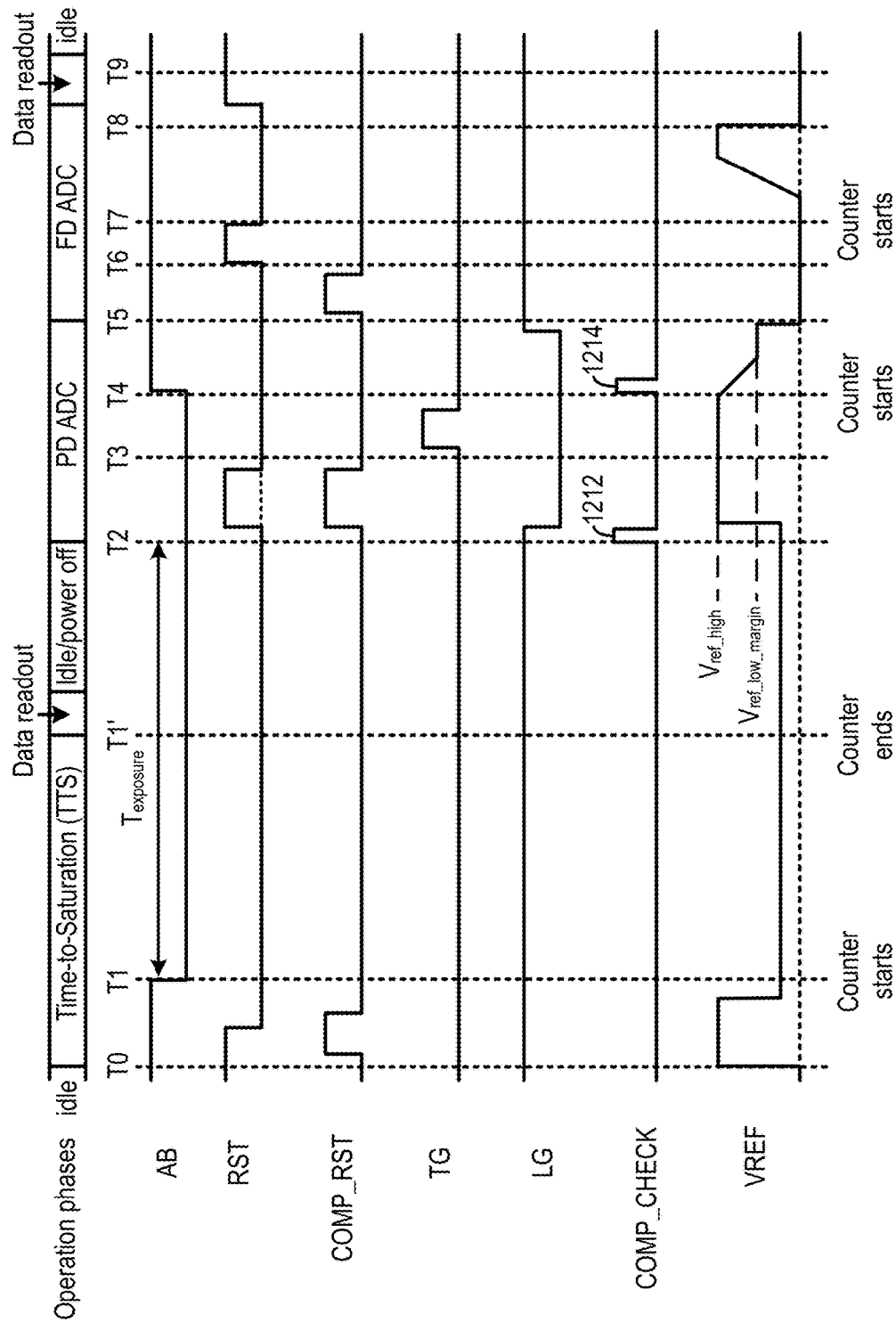

Various techniques are proposed to improve the performance of pixel cell 602*a* based on the difference in durations between the TTS measurement operation and the exposure period. Example operations of pixel cell 602*a* of FIG. 15A are illustrated in FIG. 15C and FIG. 15D. The sequence of operations in FIG. 15C is based on the example sequence described in FIG. 12A, whereas the sequence of operations in FIG. 15D is based on the example sequence described in FIG. 12B. As shown in FIG. 15C and FIG. 15D, instead of extending the TTS operation between times T1 and T2, which spans most of the exposure period $T_{exposure}$ as in FIG. 12A or the entirety of the exposure period $T_{exposure}$ as in FIG. 12B, the duration of TTS operation can be shortened such that the TTS operation can stop at time T2', which is before time T2. The frequency of clock signal 1506 can be configured such that counter 914 reaches the maximum count at time T2'. Between times T2' and T2, switchable buffer 904 and comparator 906 can be turned off to reduce power consumption during that time. Switchable buffer 904 and comparator 906 can be turned back on at time T2 to continue with the subsequent FD ADC and PD ADC operations. In addition, in a case where the overflow charge in charge sensing unit 614 exceeds the saturation threshold and a TTS measurement is stored in memory bank 912, controller 920 can also perform a read out of the TTS measurement from memory bank 912 at time T2', or at any time before the exposure period $T_{exposure}$ ends, and provide the TTS measurement to the application that consumes the light intensity data from image sensor 600. This can reduce the latency in providing the light intensity measurement results and allow the application to operate at a higher speed.

In addition, in both FIG. 15C and FIG. 15D where the TTS duration is shorter than the exposure period, the threshold for saturation detection (and TTS measurement) can be scaled from a reference threshold. The reference threshold can correspond to a case where the exposure period and the TTS measurement period have the same duration. The reduced threshold can account for the fact that the total quantity of charge generated by the photodiode within the TTS measurement period is less than within the exposure period. As the subsequent FD ADC and PD ADC operations measure the total quantity of charge generated by the photodiode within the exposure period, while the TTS measurement is based on a reduced quantity of charge generated within the shortened TTS measurement period, if the reference threshold is used for saturation detection, a dead zone in the range of measurable light intensities can be introduced.

Figure 15E:
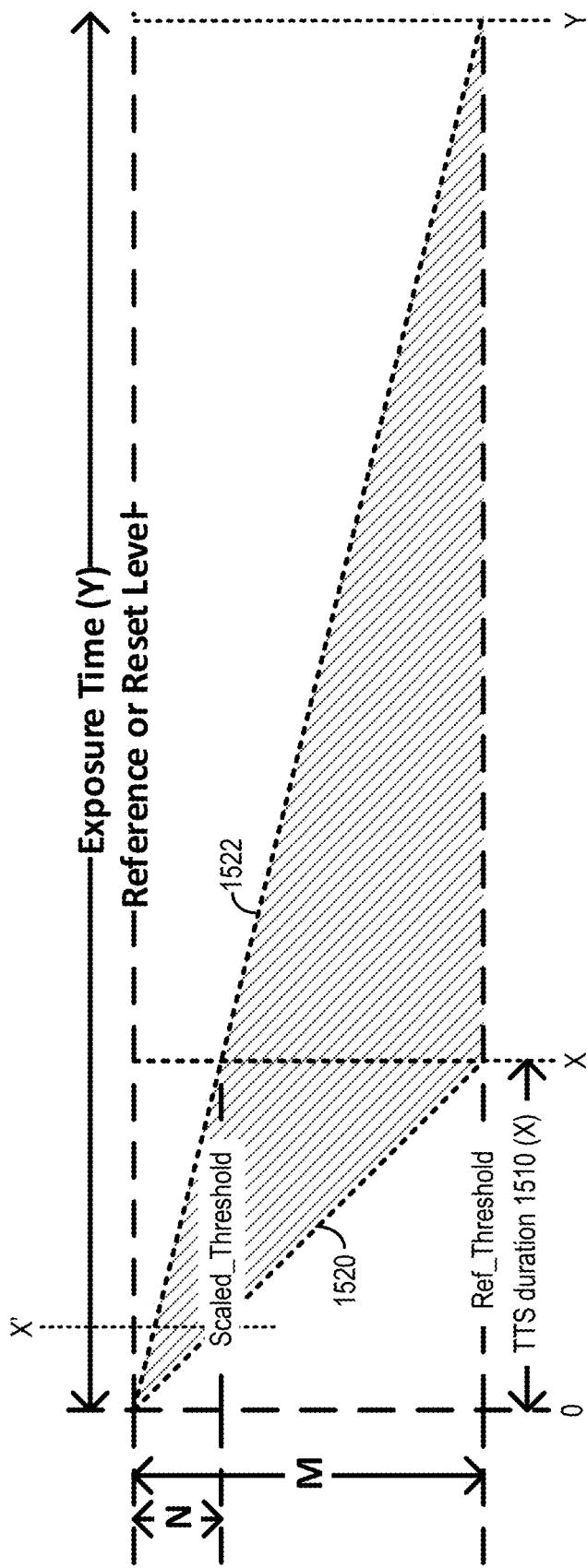

FIG. 15E illustrates an example of scaling of the threshold for saturation detection to reduce or eliminate the dead zone. In FIG. 15E, voltage graphs 1520 and 1522 illustrate the change of COMP_IN voltage (representing the output of charge sensing unit 614) within the exposure period as charge sensing unit 614 continues to accumulate overflow charge from the photodiode PD. Voltage graph 1520 can correspond to a first intensity of light, whereas voltage graph 1522 can correspond to a second intensity of light. The second intensity is lower than the first intensity, as a result graph 1522 changes at a lower rate (and have a smaller slope) than graph 1520.

As shown in FIG. 15E, assuming exposure time starts at time 0, if controller 920 detects saturation using the reference threshold (labelled "ref_threshold" in FIG. 15E), controller 920 can detect that voltage graph 1520 intersects with the reference threshold at a time X near the end of TTS duration 1510, and outputs the time as the TTS measurement result to represent the first intensity. But voltage graph 1522 does not intersect with the reference threshold within TTS duration 1510. Therefore, no TTS measurement result will be generated to represent the second intensity. On the other hand, the total overflow charge accumulated at charge sensing unit 614 at time Y, around the end of the exposure period, reaches the saturation limit. As a result, neither FD ADC operation nor PD ADC operation generates an output for the second intensity, if FD ADC operation requires the overflow charge to be below the saturation limit and PD ADC operation requires no overflow charge accumulated at charge sensing unit 614. Because of this, pixel cell 602*a* may be unable to generate an output for the second intensity. The range of light intensities between the first intensity (represented by voltage graph 1520) and the second intensity (represented by voltage graph 1522) cannot be measured by either the TTS operation, the FD ADC operation, or the PD ADC operation, which introduces a dead zone in the range of measurable light intensities.

To reduce or eliminate the dead zone in the range of measurable light intensities, controller 920 can use a scaled version of the reference threshold (labelled as "scaled_threshold" in FIG. 15E) to perform saturation detection and TTS measurement. As shown in FIG. 15E, voltage graph 1520 intersects with the scaled threshold at time X', whereas voltage graph 1522 intersects with the scaled threshold at time X. With such arrangements, the range of light intensities between the first intensity (represented by voltage graph 1520) and the second intensity (represented by voltage graph 1522) can be measured by the TTS operation, and the aforementioned dead zone in the range of measurable light intensities can be eliminated as a result.

The scaled threshold can be derived from the reference threshold based on a ratio between the duration of the TTS operation and the duration of the exposure period based on the following equation:

$$\text{Scaled\_threshold} = \text{Ref\_threshold} \times \frac{TTS \text{ duration}}{\text{exposure period duration}} \quad \text{(Equation 9)}$$

Referring to the example of FIG. 15E, if reference threshold (the original threshold which corresponds to the TTS duration being equal to the exposure period duration) equals M, TTS duration equals X, whereas the exposure period equals Y, the scaled threshold equals to M×(X/Y).

Figure 16A:
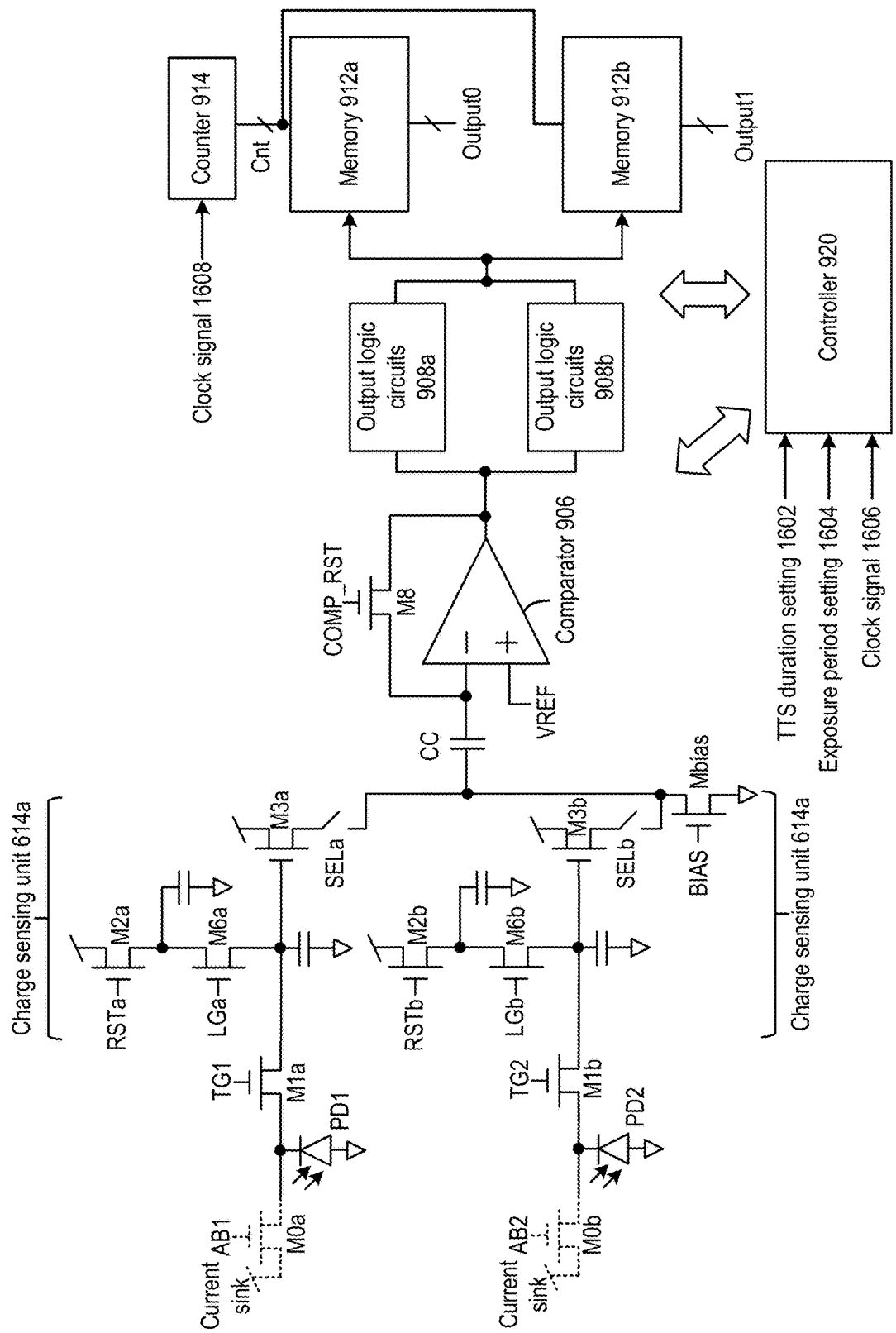
FIGS. 16A, 16B, 16C, 16D, and 16E illustrate examples of an image sensor and its operations.

The technique of separately programmable TTS duration can be used in a scenario where multiple photodiodes share ADC 616 to perform quantization, to enable more than one photodiode to perform TTS operations. FIG. 16A illustrates an example image sensor 600 including multiple photodiodes that share ADC 616. The part of image sensor 600 illustrated in FIG. 16A can be of pixel cell 602a or can be of different pixel cells. As shown in FIG. 16A, in addition to photodiodes PD1 and PD2, charge sensing units 614a and 614b, and comparator 906, image sensor 600 of FIG. 16A includes an output logic circuit 908a, an output logic circuit 908b, a memory bank 912a, and a memory bank 912b. Each memory bank includes multiple bits to store a count value from counter 914 from the TTS, FD ADC, or PD ADC operations.

As in FIG. 14A, charge sensing unit 616a and 616b can take turn, based on selection signals SELa and SELb, in accessing ADC 616 to perform quantization operations for photodiodes PD1 and PD2. But unlike in FIG. 14A where the TTS operation is performed for only one photodiode (e.g., PD1), in FIG. 16A TTS operation, FD ADC operation, and PD ADC operation can be performed based on the outputs of charge sensing units 614a and 614b for photodiodes PD1 and PD2. From the decision outputs of comparator 906 in processing the outputs of charge sensing unit 616a, output logic circuits 908a can store a first indication of whether there is overflow charge accumulated in charge sensing unit 614a, and a second indication of whether the overflow charge accumulated in charge sensing unit 614a exceeds the saturation threshold. Based on the first indication and the second indication stored in output logic circuits 908a, output logic circuits 908a can control memory 912a to store an output from one of the TTS, FD ADC, or PD ADC operations for PD1.

Moreover, from the decision outputs of comparator 906 in processing the outputs of charge sensing unit 616b, output logic circuits 908b can store a first indication of whether there is overflow charge accumulated in charge sensing unit 614b, and a second indication of whether the overflow charge accumulated in charge sensing unit 614b exceeds the saturation threshold. Based on the first indication and the second indication stored in output logic circuits 908b, output logic circuits 908b can control memory 912b to store an output from one of the TTS, FD ADC, or PD ADC operations for PD2.

In the example of FIG. 16A, the number of output logic circuits and memories can be based on a number of photodiodes for which the TTS operation is to be performed. For example, if the TTS operation is to be performed form number of photodiodes, image sensor 600 can include m output logic circuits 908 and m memory banks 912 to store a set of m digital outputs, one for each photodiode.

In addition, controller 920 can also receive TTS duration setting 1602, exposure period setting 1604, and clock signal 1606, to control the TTS duration and exposure period for PD1 and PD2, whereas counter 914 receives a separate clock signal 1608 which, in some examples, can be provided by controller 920 by dividing clock signal 1606 by a ratio set based on the target TTS duration and the maximum count of counter 914, as explained above. As in FIG. 15A, with controller 920 and counter 914 operating based on different clocks, and TTS duration setting 1602 and exposure period setting 1604 being supplied from separate registers, the TTS durations of PD1 and PD2 can be programmed separately from the exposure periods for PD1 and PD2. This allows the TTS durations of PD1 and PD2 to be reduced while the exposure periods for PD1 and PD2 are extended. As to be described below, such arrangements allow TTS operations to be performed for PD1 and PD2 while maintaining the global shutter operation. The threshold for saturation detection (and TTS measurement) can be scaled based on Equation 9 to account for the reduced TTS duration, as explained above.

Figure 16B:
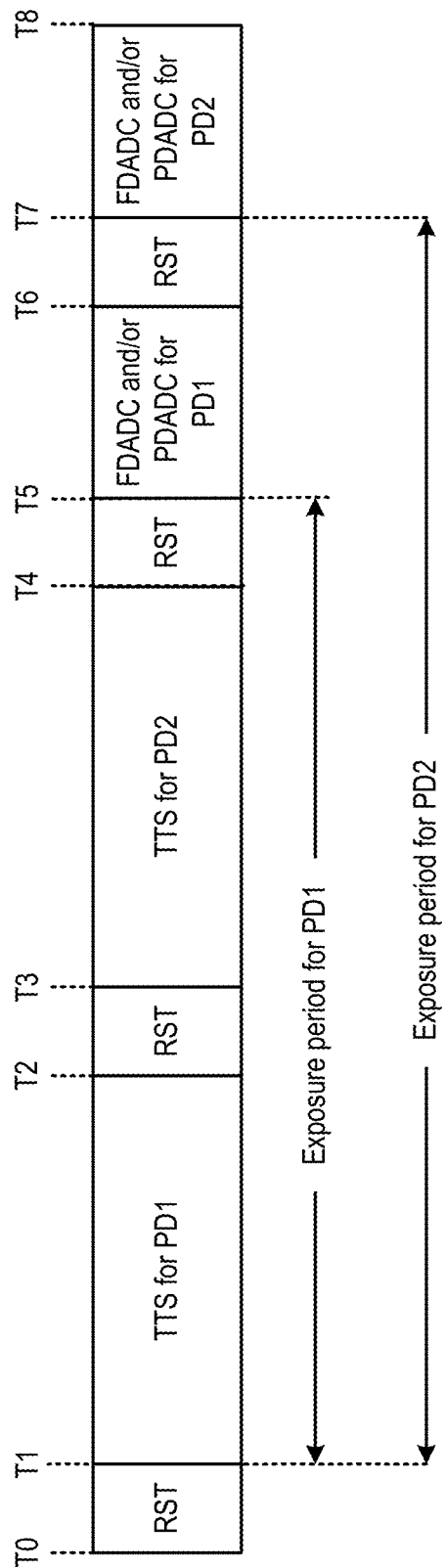

FIG. 16B, FIG. 16C, FIG. 16D, and FIG. 16E illustrate example quantization operations of PD1 and PD2 of image sensor 600 of FIG. 16A. The quantization operations can be performed by ADC 616 and counter 914, and based on control signals provided by controller 920. As shown in FIG. 16B, between times T0 and T1 charge sensing units 616a and 616b and comparator 906 are reset. Exposure periods for PD1 and PD2 starts at time T1. The TTS operation for PD1 also starts at time T1 and ends at time T2, followed by a reset operation of comparator 906 between times T2 and T3. The TTS operation for PD2 can be performed between times T3 and T4, followed by a reset operation of comparator 906 and charge sensing units 616a and 616b between times T4 and T5. At time T5, the exposure period for PD1 can end. After the end of the exposure period for PD1, FD ADC and/or PD ADC operations can be performed for PD1, based on the schemes described in FIG. 12A and FIG. 12B, between times T5 and T6. The outputs from one of the TTS, PD ADC, or FD ADC operations for PD1 can then be stored in memory bank 912a. Controller 920 may read out the TTS measurement result (as output0 in FIG. 16A) from memory bank 912a at time T5 when the exposure period for PD1 ends, based on the indication that the overflow charge saturates charge sensing unit 614a, and skip the subsequent FD ADC and PD ADC operations for PD1.

In addition, a reset operation of comparator 906 can be performed between times T6 and T7. The exposure period for PD2 also ends at time T7. FD ADC and/or PD ADC operations can then be performed for PD2, based on the schemes described in FIG. 12A and FIG. 12B, between times T7 and T8. The outputs from one of the TTS, PD ADC, or FD ADC operations for PD2 can then be stored in memory bank 912b. In some examples, controller 920 may read out the TTS measurement result from memory bank 912b (as output1 in FIG. 16A) at time T7 when the exposure period for PD2 ends, based on the indication that the overflow charge saturates charge sensing unit 614b, and skip the subsequent FD ADC and PD ADC operations for PD2.

In FIG. 16B, the exposure periods for PD1 and PD2 can overlap substantially, between times T1 and T5, to support a global shutter operation for the photodiodes. In addition, the TTS durations for PD1 and PD2 are reduced to fit into the overlapping period (between times T1 and T4) between exposure periods of PD1 and PD2. This allows TTS operations to be performed for both PD1 and PD2 within the overlapping period. Such arrangements allow TTS operations to be performed for PD1 and PD2 to improve their dynamic ranges, while maintaining the global shutter operation.

Although the arrangements in FIG. 16B allows TTS operations to be performed for both PD1 and PD2, PD2 may have a reduced dynamic range (e.g., having a reduced upper limit) compared with PD1. This is because the TTS operation of PD1 has the same start time as the exposure period of PD1, which enables the TTS operation to measure the saturation time for high intensity light received by PD1 at the beginning of the exposure period of PD1. On the other hand, the TTS operation of PD2 starts after the TTS operation of PD1 completes. Due to the delay in the start time of the TTS operation of PD2, when the TTS operation starts for PD2 the quantity of overflow charge accumulated at charge sensing unit 614b may be close to or already have exceeded the saturation limit. As a result, the saturation time measured by the TTS operation may become artificially short and may not accurately reflect the light intensity, and the dynamic range of PD2 can become degraded.

Figure 16C:
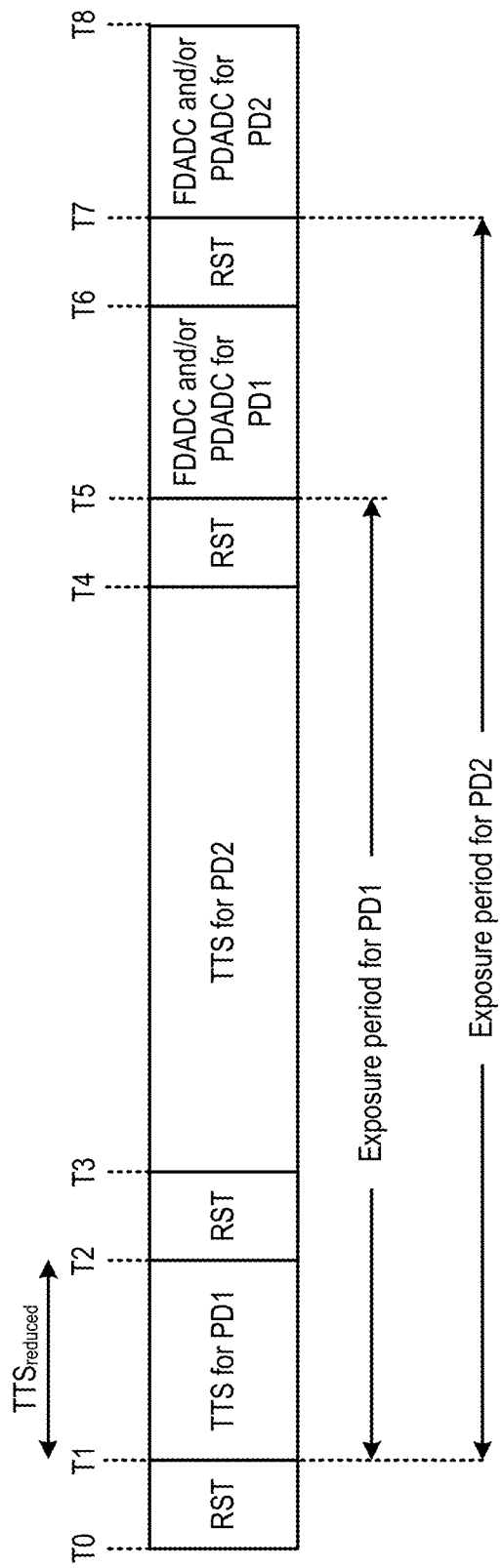
Figure 16D:
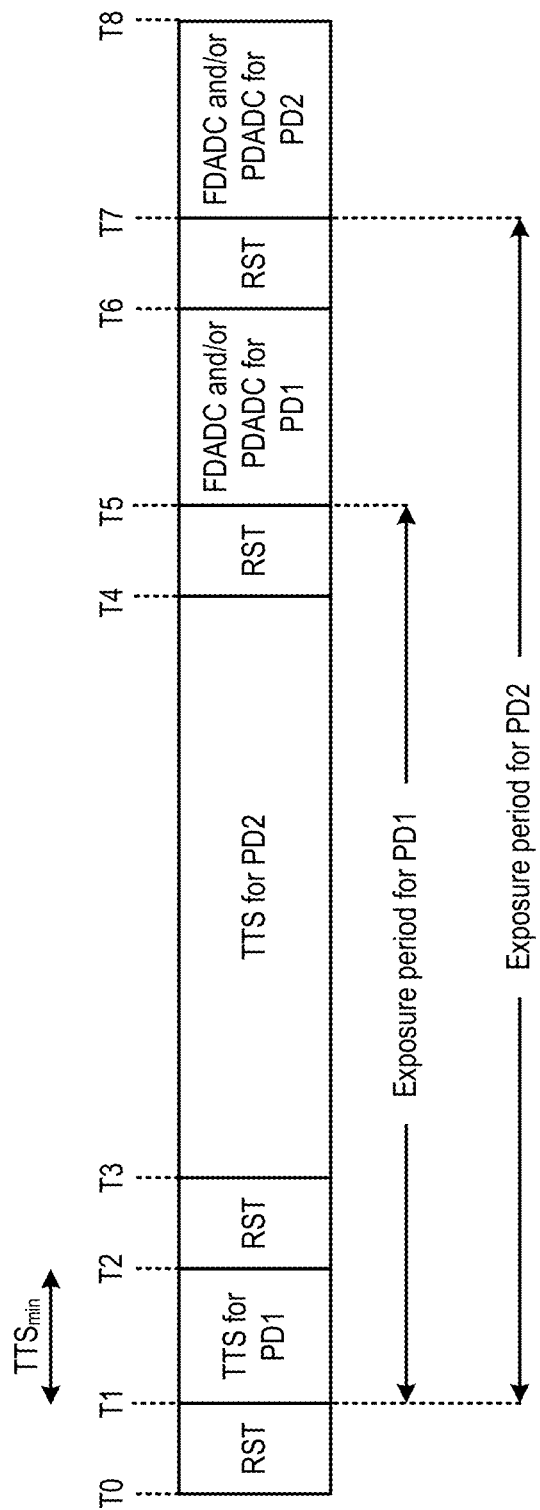

Various techniques are proposed to improve the dynamic range of PD2. In some examples, as shown in FIG. 16C, the duration of the TTS operation for PD1 can be reduced to a duration labelled $TTS_{reduced}$, which can reduce the delay between the start time of the TTS operation for PD2 and the start time of the exposure period for PD2. It becomes less likely that the quantity of overflow charge accumulated at charge sensing unit 614b is close to or has exceeded the saturation limit when the TTS operation for PD2 starts. The duration of the TTS operation for PD1 can be set at a minimum duration (labelled as $TTS_{min}$ in FIG. 16D) for a particular signal-to-noise (SNR) target for PD1. Specifically, as the duration of the TTS operation for PD1 reduces, the threshold for saturation detection can be further scaled based on the ratio between the TTS duration and the exposure period duration of PD1, which makes the saturation detection more susceptible to noise and increases the SNR. An SNR target can set the minimum duration $TTS_{min}$ for the TTS operation of PD1, and the delay to the start of the TTS operation for PD2 can be reduced by setting the duration of the TTS operation for PD1 to the minimum duration $TTS_{min}$.

Figure 16E:
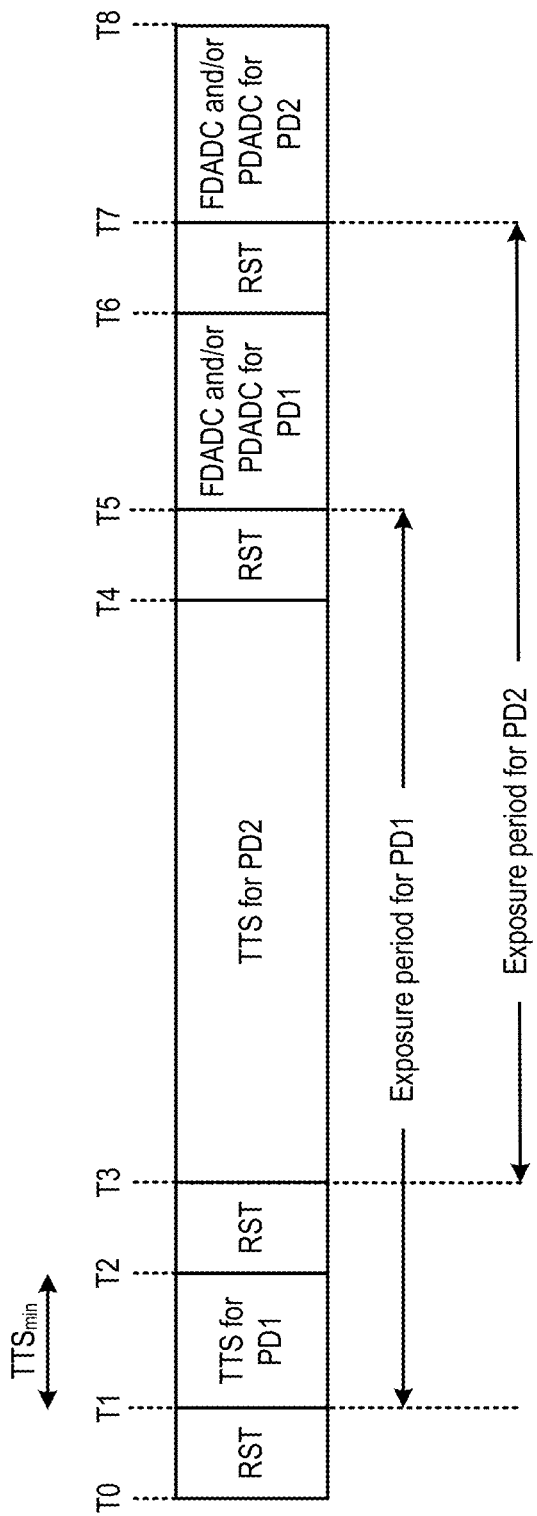

In another example, as shown in FIG. 16E, the start time of exposure period for PD2 can be delayed to time T3, to allow the TTS operation for PD2 to start at the same time as the exposure period. Such arrangements can reduce the aforementioned dynamic range reduction issue with PD2.

Figure 17A:
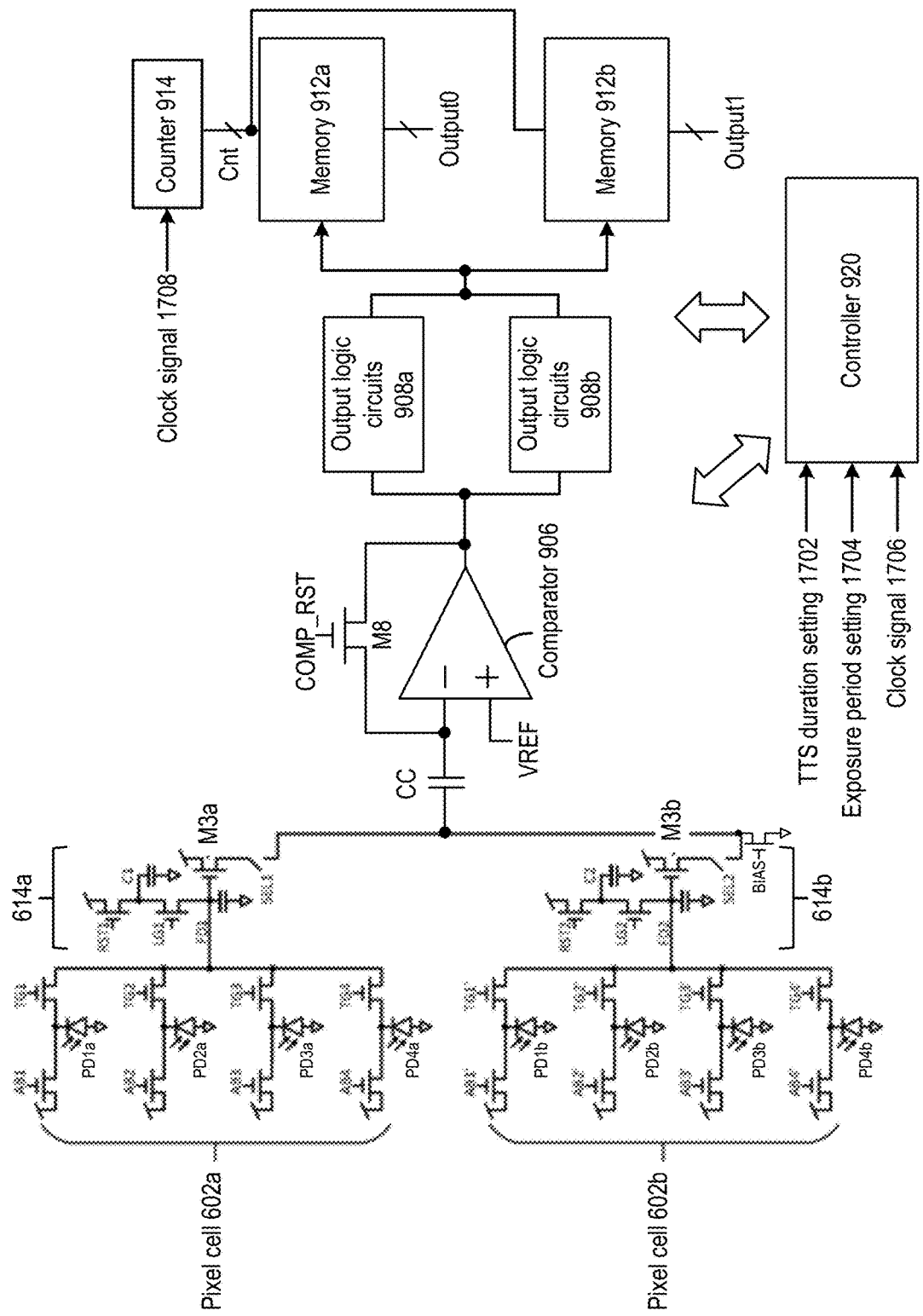
FIGS. 17A, 17B, and 17C illustrate examples of an image sensor and its operations.

FIG. 17A illustrates another example of image sensor 600 including multiple photodiodes that share a comparator. As shown in FIG. 17A, image sensor 600 includes photodiodes PD1a, PD2a, PD3a, and PD4a of pixel cell 602a, as well as photodiodes PD1b, PD2b, PD3b, and PD4b of pixel cell 602b. The photodiodes of each pixel cell can be configured, such as being arranged in a stack structure (e.g., as shown in FIG. 8A) or on a planar surface under a filter array (e.g., as shown in FIG. 8B), to measure different frequency components of light. For example, PD1a and PD1b can be configured to detect both visible and infra-red light (e.g., being associated with a monochrome channel), PD2a and PD2b can be configured to detect visible red light, PD3a and PD3b can be configured to detect visible green light, whereas PD4a and PD4b can be configured to detect blue light.

To reduce footprint and power consumption, the photodiodes of each pixel cell can share access to a charge sensing unit, whereas the charge sensing units share access to a comparator. Two memory banks, each controlled by corresponding output logic circuits, are provided to store the digital outputs for each pixel cell. For example, the photodiodes PD1a-PD4a of pixel cell 602a can share access to charge sensing unit 614a, whereas the photodiodes PD1b-PD4b of pixel cell 602b can share access to charge sensing unit 614b. Charge sensing units 614a and 614b can share access to comparator 906. Via charge sensing unit 614a, each photodiode of pixel cell 602a can take turn in performing quantization operations to store a digital output at memory bank 912a. Moreover, via charge sensing unit 614b, each photodiode of pixel cell 602b can take turn in performing quantization operations to store a digital output at memory bank 912b.

In FIG. 17A, controller 920 can perform, using ADC 616 and counter 914, TTS, FD ADC, and PD ADC operations for one photodiode of each pixel cell, followed by PD ADC operations for the rest of photodiodes. For example, TTS operations can be performed for photodiodes PD1a and PD1b of pixel cells 602a and 602b, since these photodiodes detect light of a wider frequency range (monochrome channel) and are likely to receive components of light of a high intensity range. On the other hand, PD ADC operations can be performed for photodiodes PD1a, PD2a, PD3a, PD1b, PD2b, and PD3b of pixel cells 602a and 602b, since these photodiodes detect a relatively narrow frequency range of light and may receive components of light of a low intensity range, and these photodiodes do not have access to charge sensing unit to store overflow charge during their exposure periods.

In addition, controller 920 can also receive TTS duration setting 1702, exposure period setting 1704, and clock signal 1706, to control the TTS durations and exposure periods of photodiodes PD1a and PD1b, as well as the exposure periods of photodiodes PD1a, PD2a, PD3a, PD1b, PD2b, and PD3b. Moreover, counter 914 receives a separate clock signal 1708 which, in some examples, can be provided by controller 920 by dividing clock signal 1706 by a ratio set based on the target TTS duration and the maximum count of counter 914, as explained above. As in FIG. 14A and FIG. 15A, with controller 920 and counter 914 operating based on different clocks, and TTS duration setting 1702 and exposure period setting 1704 being supplied from separate registers, the TTS durations of PD1a and PD1b can be programmed separately from the exposure periods for PD1a and PD1b. This allows the TTS durations of PD1a and PD1b to be reduced while the exposure periods for PD1a and PD1b are extended. As explained above, such arrangements allow TTS operations to be performed for PD1a and PD1b while maintaining the global shutter operation. The threshold for saturation detection (and TTS measurement) can be scaled based on Equation 9 to account for the reduced TTS duration, as explained above.

Figure 17B:
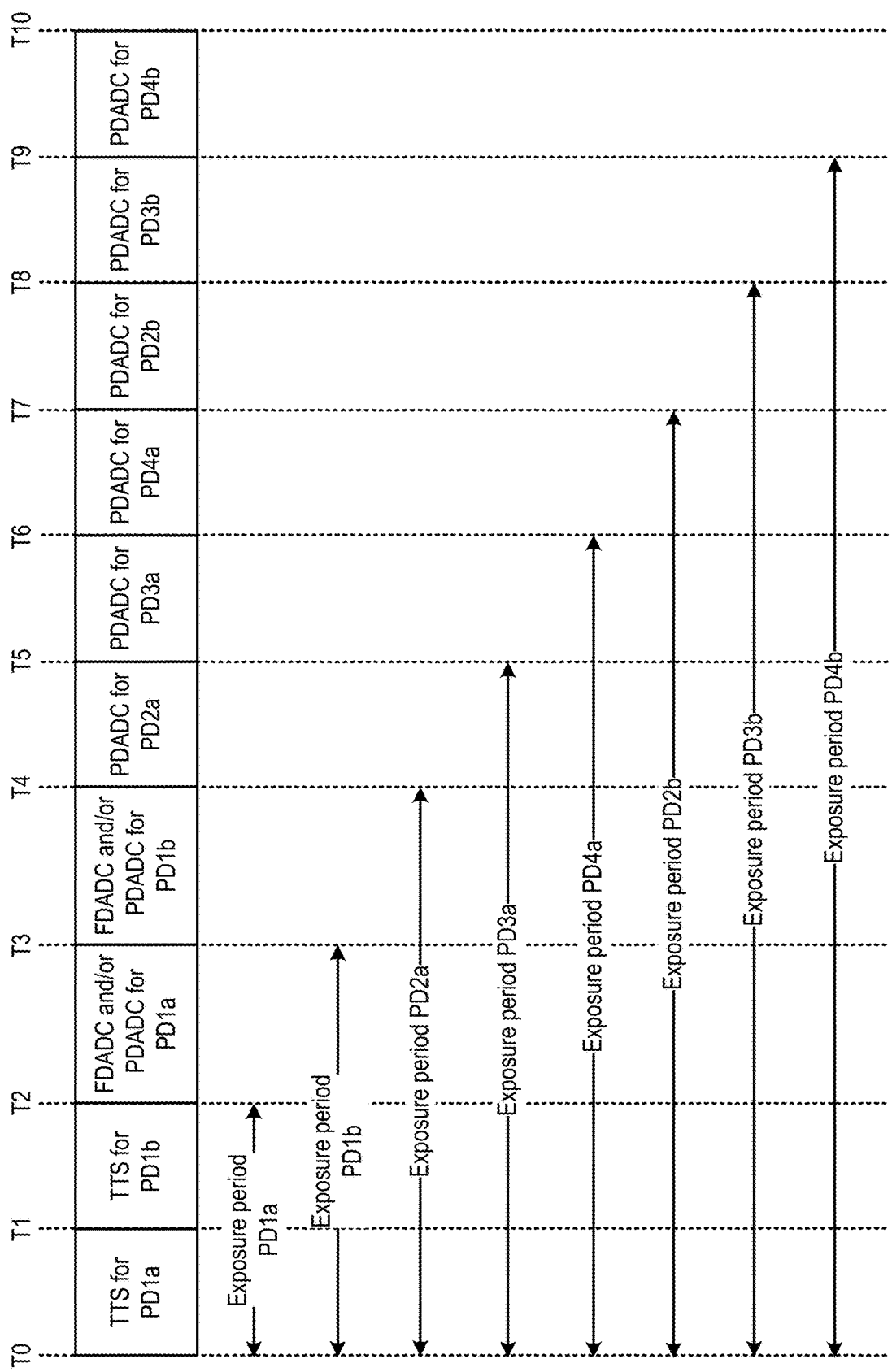

FIG. 17B illustrates example quantization operations of pixel cells 602a and 602b of image sensor 600 of FIG. 17A. In FIG. 17B, the time periods for reset and memory read out are omitted for brevity. The quantization operations can be performed by controller 920 using comparator 906 and counter 914. As shown in FIG. 17B, the exposure periods for all photodiodes starts at time T0. The TTS operation for PD1a also starts at time T0 and ends at time T1, followed by the TTS operation for PD1b between times T1 and T2. Both TTS operations can span across the exposure period for PD1a between times T0 and T2, which also overlaps with the exposure period for PD1b which spans between times T0 and T3. As described above, as the TTS durations for photodiodes PD1a and PD1b are reduced with respect to the exposure periods, two (or more) TTS operations of multiple photodiodes can be performed within the overlapping portion of the exposure periods among the photodiodes, which allow the dynamic ranges of these photodiodes to be improved while maintaining the global shutter operation. In some examples, the duration of TTS operation for PD1a can be reduced, and/or the exposure period for photodiode PD1b can be delayed, to improve the dynamic range of PD1b as described above in FIG. 16C and FIG. 16D.

Following TTS operation for PD1b, FD ADC and/or PD ADC operations for PD1a can be performed between times T2 and T3, after the exposure period for PD1a ends at time T2. Output logic circuits 908a can store the output of one of the TTS, FD ADC, or PD ADC operations at memory bank 912*a* based on whether there is overflow charge accumulated at charge sensing unit 614*a*, and if there is, whether the overflow charge from PD1*a* reaches the saturation limit. Moreover, FD ADC and/or PD ADC operations for PD1*b* can be performed between times T3 and T4, after the exposure period for PD1*b* ends at time T3. Output logic circuits 908*b* can store the output of one of the TTS, FD ADC, or PD ADC operations at memory bank 912*b* based on whether there is overflow charge accumulated at charge sensing unit 614*b*, and if there is, whether the overflow charge from PD1*b* reaches the saturation limit.

Following the quantization operations for PD1*a* and PD1*b*, controller 920 can control ADC 616 to perform PD ADC operations for the remaining photodiodes. Specifically, PD ADC operation for PD2*a* can be performed between times T4 and T5 to store the output of PD2*a* at memory bank 912*a*, after the exposure period for PD2*a* ends at time T4. Moreover, PD ADC operation for PD3*a* can be performed between times T5 and T6 to store the output of PD3*a* at memory bank 912*a*, after the exposure period for PD3*a* ends at time T6. This is followed by PD ADC operation for PD4*a*, which can be performed between times T6 and T7 to store the output of PD4*a* at memory bank 912*a*, after the exposure period for PD4*a* ends at time T6.

Moreover, PD ADC operation for PD2*b* can be performed between times T7 and T8 to store the output of PD2*b* at memory bank 912*b*, after the exposure period for PD2*b* ends at time T7. Moreover, PD ADC operation for PD3*b* can be performed between times T8 and T9 to store the output of PD3*b* at memory bank 912*b*, after the exposure period for PD3*b* ends at time T8. This is followed by PD ADC operation for PD4*b*, which can be performed between times T9 and T10 to store the output of PD4*b* at memory bank 912*b*, after the exposure period for PD4*b* ends at time T9.

Figure 17C:
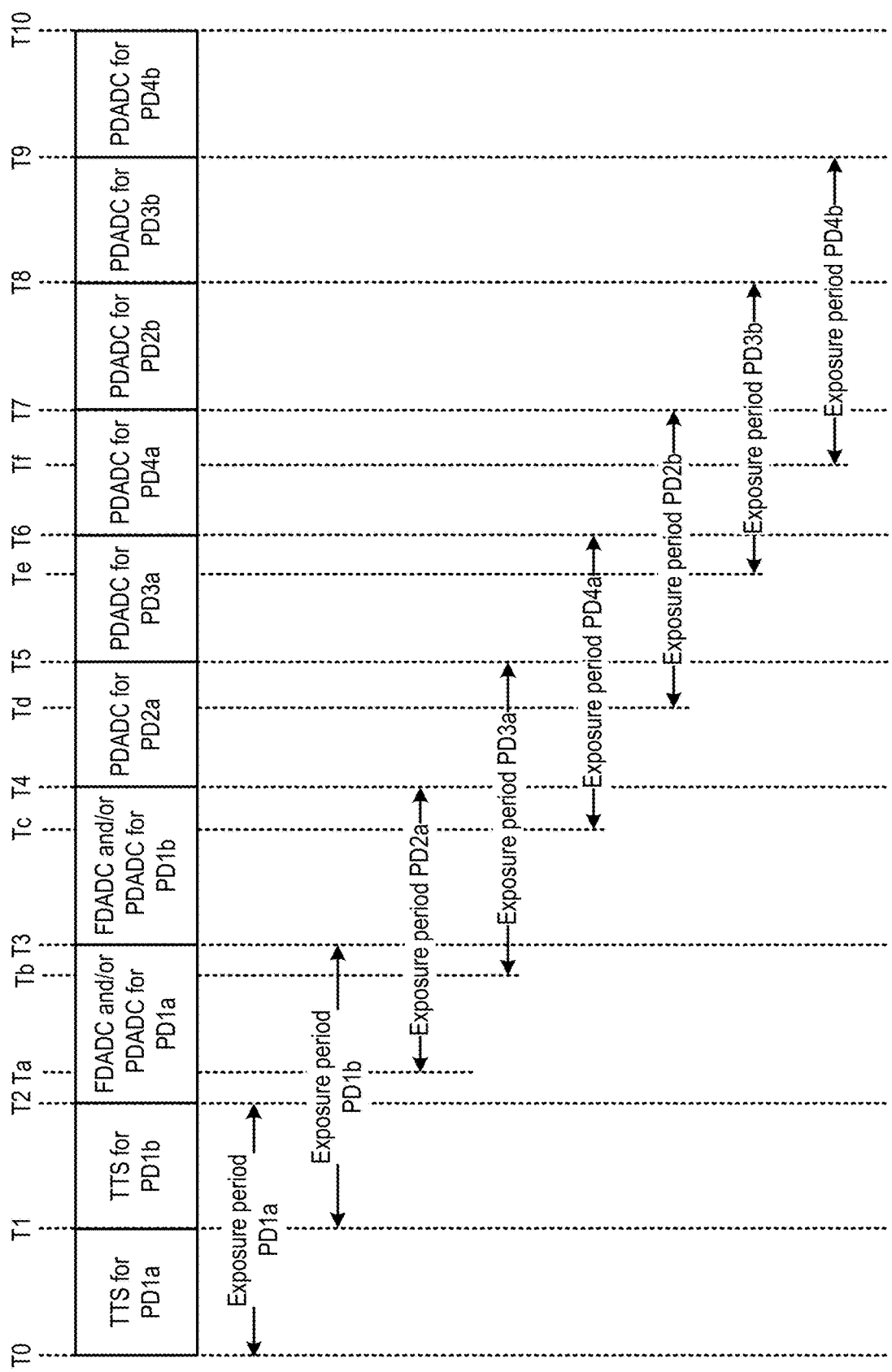

FIG. 17C illustrates another example quantization operations of pixel cells 602*a* and 602*b* of image sensor 600 of FIG. 17A. In FIG. 17C, the time periods for reset and memory read out are omitted for brevity. The quantization operations can be performed by controller 920 using comparator 906 and counter 914. As shown in FIG. 17C, the start times of the exposure periods for all photodiodes can stagger in a similar manner as in FIG. 16E, to reduce the difference in durations among the exposure periods of the photodiodes. Such arrangements can reduce the likelihood of the charge sensing units (for TTS/FD ADC operations) and the photodiodes (for PD ADC operations) being saturated during the respective exposure period, which can improve dynamic range.

The exposure period for PD1*a* starts at time T0. The TTS operation for PD1*a* also starts at time T0 and ends at time T1. The exposure period for PD1*b* starts at time T1 right before the TTS operation for PD1*b*, to reduce the likelihood of charge sensing unit 614*b* being saturated by the overflow charge from PD1*b* by the time the TTS operation for PD1*b* starts. Such arrangements can improve the dynamic range of PD1*b* as explained above in FIG. 16E. The exposure period for PD1*b* ends at time T3 as in FIG. 17B.

In addition, the exposure periods for photodiodes PD2*a*, PD3*a*, and PD4*a* can start at, respectively, times Ta, Tb, and Tc. Moreover, the exposure periods for photodiodes PD2*b*, PD3*b*, and PD4*b* can start at, respectively, times Td, Te, and Tf. By delaying the start times of the exposure periods, the durations of the exposure periods can have identical or similar durations. It becomes less likely that the photodiodes can be saturated by the residual charge within their respective exposure periods, which can improve the dynamic ranges of these photodiodes.

Figure 18:
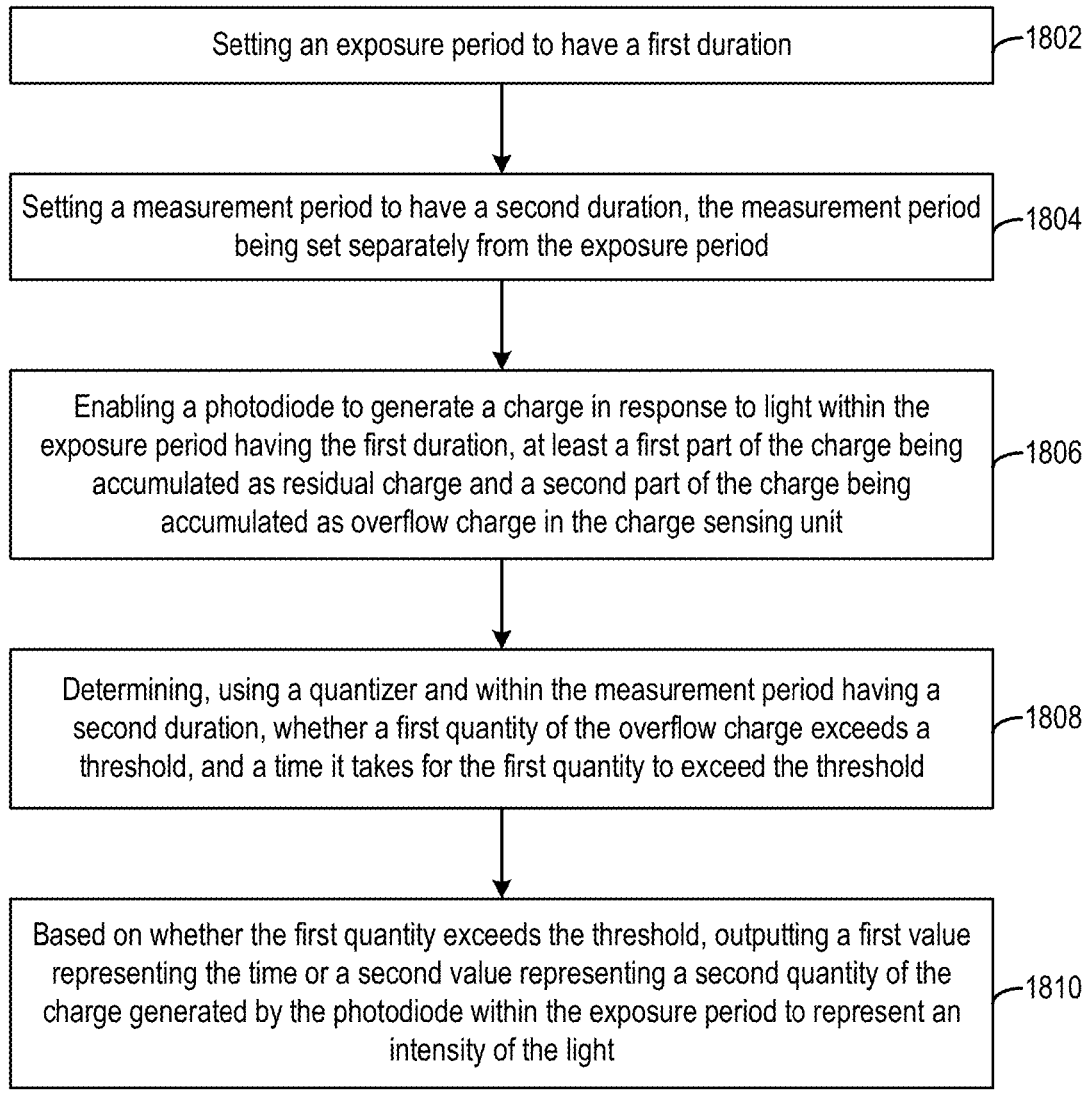
FIG. 18 illustrates a flowchart of an example process for measuring light intensity.

FIG. 18 illustrates a method 1800 for performing a light intensity measurement by an image sensor having at least a photodiode, such as pixel cell 602*a* of FIG. 15A. Method 1800 can be performed by controller 920 in conjunction with other components of image sensor 600.

Method 1800 starts with step 1802, in which controller 920 sets an exposure period to have a first duration. Within the exposure period, controller 920 enables the photodiode PD to generate and output charge in response to incident light. Controller 920 can set the exposure period based on exposure period setting 1504, which can define a duration of the exposure period for photodiode PD. Based on the duration specified in exposure period setting 1504, as well as the frequency of clock signal 1506 which can define the speed of operation of controller 920, controller 920 can determine a first target count value representing the end time of the exposure period.

In step 1804, controller 920 sets a measurement period to have a second duration. The measurement period can include a time-to-saturation (TTS) measurement period. Within the TTS measurement period, controller 920 can perform a TTS measurement operation based on comparing the voltage output by charge sensing unit 614 with a flat saturation threshold to determine whether the charge accumulated in the charge sensing unit exceeds the saturation threshold, and if it does, a time-to-saturation measurement for the time it takes for the charge to exceed the saturation threshold. Controller 920 can set the first duration based on TTS duration setting 1502 as well as the frequency of clock signal 1506. For example, controller 920 can determine a second target count value representing the end time of the TTS measurement operation. In addition, controller 920 can also determine the frequency of clock signal 1508 based on TTS duration setting 1502. For example, given the maximum count of counter 914 (e.g., 255) and the duration of TTS measurement operation, controller 920 can determine the frequency of clock signal 1508 such that counter 914 can sweep through the entire range of count values within the TTS measurement operation.

In step 1804, the duration of the TTS measurement period is set separately from the duration of the exposure period. Specifically, TTS duration setting 1502 and exposure period setting 1504 can be supplied from separate registers, which allow the two settings to be individually programmable. In addition, clock signal 1508, which is supplied to counter 914 and sets the frequency at which counter 914 updates the count value, can have a different frequency from clock signal 1506 supplied to controller 920, and the frequency of clock signal 1508 can also be set based on TTS duration setting 1502. This allows the TTS measurement period to be set using a fast clock (e.g., clock signal 1508) whereas the exposure period can be set using a slow clock (e.g., clock signal 1506).

In addition, controller 920 can also use TTS duration setting 1502 to set a lower limit of the exposure period, to ensure that the exposure period does not end before the TTS measurement operation completes. In a case where exposure period setting 1504 sets a shorter exposure period than the duration of the TTS measurement operation, controller 920 can override exposure period setting 1504 and set the exposure period to be at least equal to the duration of the TTS measurement operation set according to TTS duration setting 1502.

In step 1806, controller 920 enables the photodiode PD to generate a charge in response to light within the exposure period having the first duration. Controller 920 can control the start and end of the exposure period using an internal counter that operates on clock signal 1506 and based on comparing the count values with the first target count value representing the end time of the exposure period. For example, controller 920 can disable the AB gate and/or release the photodiode from the reset state when the count value is zero, and enable the AB gate and/or reset the photodiode when the count value reaches the target count value. The photodiode PD can accumulate at least a first part of the charge as residual charge, while a second part of the charge can be accumulated as overflow charge at charge sensing unit 614

In step 1808, controller 920 determines, using a quantizer (e.g., comparator 906 and counter 914), and within the TTS measurement period having a second duration, whether a first quantity of the overflow charge exceeds a threshold, and a time-to-saturation (TTS) measurement representing the time it takes for the first quantity to exceed the threshold, as part of the TTS measurement operation. Controller 920 can start counter 914 when the count value of the internal counter is zero and allow counter 914 to run, and reset counter 914 when the count value reaches the second target count value representing the end time of the TTS measurement operation. As described above, controller 920 can using comparator 906 to compare the voltage output by charge sensing unit 614 with a flat saturation threshold to determine whether the overflow charge accumulated in the charge sensing unit exceeds the saturation threshold to generate a decision. If the decision indicates that the overflow charge exceeds the saturation threshold, the decision can cause memory bank 912 to store a count value from counter 914 to represent the TTS measurement result. As described above, the threshold is scaled based on a ratio between the first duration (of the exposure period) and the second duration (of the TTS measurement period) to reduce or eliminate dead zone in the measurable range of light intensities.

In step 1810, based on whether the first quantity exceeds the threshold, controller 920 outputs a first value representing the TTS measurement or a second value representing a second quantity of the charge generated by the photodiode within the exposure period to represent the intensity of light. The second value can be generated based on, for example, a FD ADC operation to measure the quantity of overflow charge, a PD ADC operation to measure the quantity of residual charge, etc. Output logic circuits 908 can store a first indication of whether overflow charge is accumulated at charge sensing unit 614, and a second indication of whether the overflow charge exceeds the saturation threshold, and store one of the TTS measurement result, the FD ADC result, or the PD ADC result at memory bank 912.

Figure 19A:
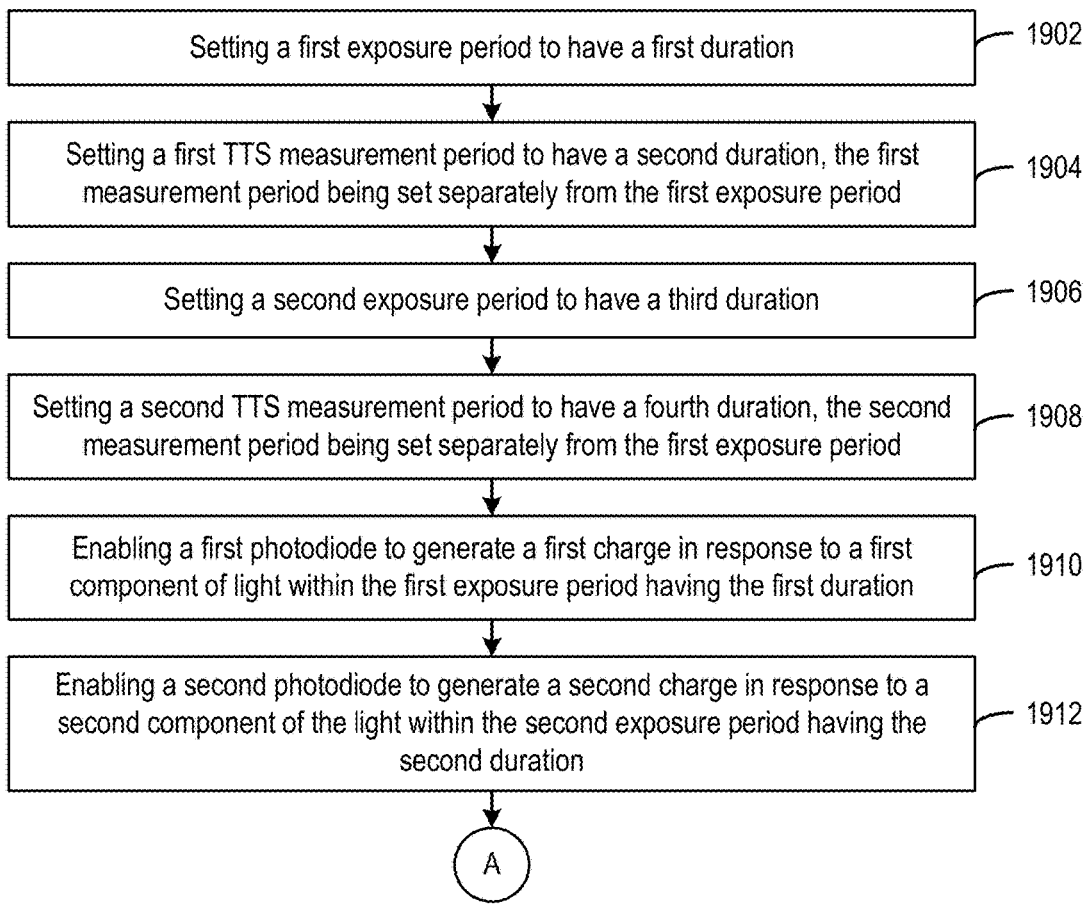
FIGS. 19A and 19B illustrate a flowchart of an example process for measuring light intensity.
Figure 19B:
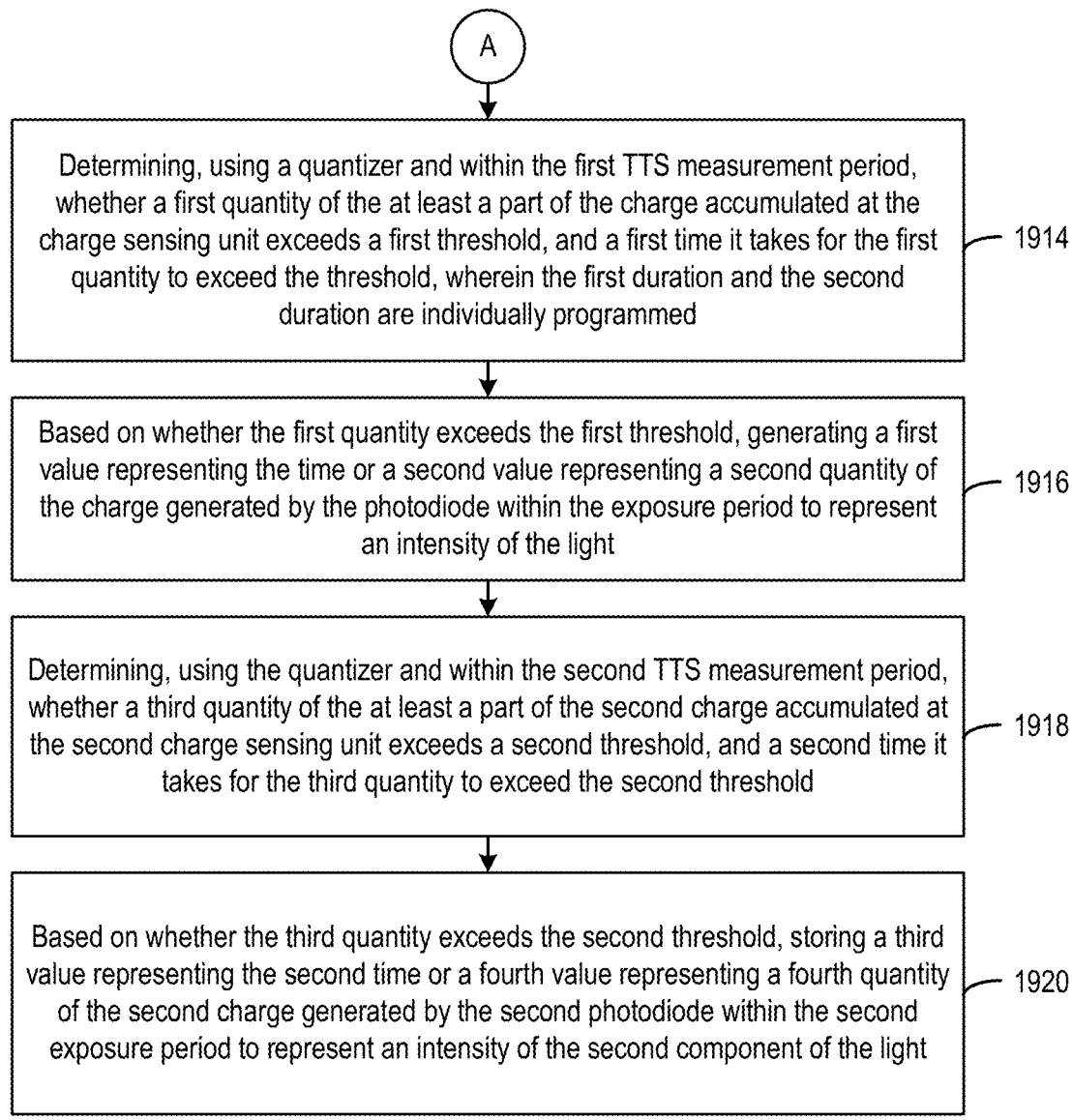

FIG. 19A and FIG. 19B illustrate a method 1900 for performing a light intensity measurement by an image sensor having multiple photodiodes that share a quantizer (e.g., comparator 906), such as image sensor 600 of FIG. 16A and FIG. 17A. Method 1900 can be performed by controller 920 in conjunction with other components of image sensor 600.

Method 1900 starts with step 1902, in which controller 920 sets a first exposure period of a first photodiode (e.g., photodiode PD1 of FIG. 16A, photodiode PD1a of FIG. 17A, etc.) to have a first duration. Controller 920 can set the first exposure period based on exposure period setting 1604/1704.

In step 1904, controller 920 sets a first time-to-saturation (TTS) measurement period to have a second duration. The duration of the first TTS measurement period is set separately from the duration of the first exposure period, but the first TTS measurement period sets a lower limit of the first exposure period, as explained above in FIG. 16A, FIG. 17A, and FIG. 18.

In step 1906, controller 920 sets a second exposure period of a second photodiode (e.g., photodiode PD2 of FIG. 16A, photodiode PD1b of FIG. 17A, etc.) to have a third duration. Controller 920 can set the second exposure period based on exposure period setting 1604/1704.

In step 1908, controller 920 sets a second time-to-saturation (TTS) measurement period to have a fourth duration. The duration of the second TTS measurement period is set separately from the duration of the second exposure period, but the second TTS measurement period sets a lower limit of the second exposure period, as explained above in FIG. 16A, FIG. 17A, and FIG. 18.

In some examples, as shown in FIG. 16B-FIG. 16D, and FIG. 17B, controller 920 can set start time of the second exposure period of the second photodiode to be the same as the start time of the first exposure period of the first photodiode. Moreover, the first and second TTS measurement periods can fit into the overlapping period between the first and second exposure periods, to allow TTS operations to be performed for light received within the overlapping period for both photodiodes. Such arrangements can improve the global shutter operation. On the other hand, in some examples, to improve the dynamic range of the second photodiode, the duration of the first TTS operation can be reduced based on a target SNR of the first photodiode, as described in FIG. 16D. Moreover, the start time of the second exposure period can be delayed till after the first TTS operation completes to align with the start time of the second TTS operation for the second photodiode, as described in FIG. 16E.

In step 1910, controller 920 enables the first photodiode to generate a first charge in response to a first component of light within the first exposure period having the first duration. Controller 920 can track the start and end of the first exposure period using an internal counter that operates on clock signal 1606/1706 and based on comparing the count values with the target count value representing the end time of the first exposure period. The first photodiode can accumulate at least a first part of the first charge as a first residual charge, while a second part of the first charge can be accumulated as a first overflow charge at charge sensing unit 614a.

In step 1912, controller 920 enables the second photodiode to generate a second charge in response to a second component of the light within the second exposure period having the second duration. Controller 920 can track the start and end of the second exposure period using the internal counter that operates on clock signal 1606/1706 and based on comparing the count values with the target count value representing the end time of the second exposure period. The second photodiode can accumulate at least a first part of the second charge as a second residual charge, while a second part of the second charge can be accumulated as a second overflow charge at charge sensing unit 614b.

Referring to FIG. 19B, in step 1914, controller 920 determines, using a quantizer (e.g., comparator 906 and counter 914), and within the first TTS measurement period having the second duration, whether a first quantity of the first overflow charge exceeds a first threshold, and a first time-to-saturation (TTS) measurement representing a first time it takes for the first quantity to exceed the first threshold, as part of the first TTS measurement operation. The first threshold is determined based on scaling a reference threshold with a ratio between the second duration of the first TTS measurement period and the first duration of the first exposure period.

In step 1916, based on whether the first quantity of the first overflow charge exceeds the first threshold, controller 920 generates a first value representing the first TTS measurement or a second value representing a second quantity of the first charge generated by the first photodiode within the first exposure period to represent the intensity of the first component of light. The second value can be generated based on, for example, a FD ADC operation to measure the quantity of first overflow charge, a PD ADC operation to measure the quantity of first residual charge, etc. One of the first value or the second value can be stored in a memory (e.g., memory 912) and output to represent the intensity of the first component of light.

In step 1918, controller 920 determines, using the quantizer, and within the second TTS measurement period having the fourth duration, whether a third quantity of the second overflow charge exceeds a second threshold, and a second time-to-saturation (TTS) measurement representing a second time it takes for the first quantity to exceed the second threshold, as part of the second TTS measurement operation. The second threshold is determined based on scaling the reference threshold with a ratio between the fourth duration of the second TTS measurement period and the second duration of the second exposure period.

In step 1920, based on whether the third quantity of the second overflow charge exceeds the second threshold, controller 920 generates third value representing the second TTS measurement or a fourth value representing a second quantity of the second charge generated by the second photodiode within the second exposure period to represent the intensity of the second component of light. The fourth value can be generated based on, for example, a FD ADC operation to measure the quantity of second overflow charge, a PD ADC operation to measure the quantity of second residual charge, etc. One of the third value or the fourth value can be stored in a memory (e.g., memory 912) and output to represent the intensity of the first component of light.

Some portions of this description describe the examples of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some examples, a software module is implemented with a computer program product comprising a computer-readable medium containing computer program code, which can be executed by a computer processor for performing any or all of the steps, operations, or processes described.

Examples of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples of the disclosure may also relate to a product that is produced by a computing process described herein. Such a product may comprise information resulting from a computing process, where the information is stored on a non-transitory, tangible computer readable storage medium and may include any example of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the examples is intended to be illustrative, but not limiting, of the scope of the disclosure, which is set forth in the following claims.

What is claimed is:

1. An apparatus comprising:
a photodiode configured to generate a charge in response to light within an exposure period having a first duration;
a charge sensing unit configured to accumulate at least a part of the charge within the exposure period;
a quantizer; and
a controller configured to:
determine, using the quantizer and within a measurement period having a second duration, whether a first quantity of the at least a part of the charge accumulated at the charge sensing unit exceeds a threshold, and a time it takes for the first quantity to exceed the threshold, wherein the first duration and the second duration are individually programmable; and
based on whether the first quantity exceeds the threshold, output a first value representing the time or a second value representing a second quantity of the charge generated by the photodiode within the exposure period to represent an intensity of the light.

2. The apparatus of claim 1, wherein the second duration of the measurement period sets a lower limit of the first duration of the exposure period.

3. The apparatus of claim 2, further comprising a counter to generate the first value,
wherein the second duration of the measurement period is set based on at least one of: a frequency of a clock signal supplied to the counter, or a total number of bits of the counter.

4. The apparatus of claim 3, wherein the first duration of the measurement period is set based on at least one of: the frequency of the clock signal, or an ambient light intensity of an environment in which the apparatus operates.

5. The apparatus of claim 1, wherein the controller is configured to power down one or more components of the apparatus between an end time of the measurement period and an end time of the exposure period, the one or more components comprising at least one of: a comparator of the quantizer, or a voltage buffer of the charge sensing unit.

6. The apparatus of claim 1, further comprising a memory to store the first value or the second value; and
wherein the controller is configured to, based on determining that the first quantity exceeds the threshold and before the exposure period ends:
perform a read out operation at the memory to obtain the first value; and
output the first value to a host device.

7. The apparatus of claim 1, wherein the threshold is set based on a ratio between the second duration and the first duration.

8. The apparatus of claim 7, wherein the threshold is set based on a quantity of the at least a part of the charge accumulated at the charge sensing unit within the exposure period for a pre-determined range of intensity of the light.

9. The apparatus of claim 1, further comprising a first register and a second register;
wherein the controller is configured to:
set the first duration based on a third value stored in the first register; and
set the second duration based on a fourth value stored in the second register.

10. The apparatus of claim 1, wherein the at least a part of the charge is a first part of the charge; and
wherein the photodiode is configured to:
accumulate a second part of the charge as residual charge until the photodiode becomes saturated by the residual charge; and
output the first part of the charge as overflow charge to the charge sensing unit when the photodiode is saturated by the residual charge.

11. The apparatus of claim 10, further comprising a transfer transistor coupled between the photodiode and the charge sensing unit;
wherein the controller is configured to:
within the exposure period:
control a gate voltage of the transfer transistor during the exposure period to enable the photodiode to accumulate the residual charge, and to enable the charge sensing unit to accumulate the overflow charge to generate a first voltage, and
generate, using the quantizer, the first value based on measuring the time it takes for the first voltage to exceed the threshold;
after the measurement period ends, generate, using the quantizer, a third value based on measuring the first voltage, the third value representing a quantity of the overflow charge;
after the exposure period ends, control the gate voltage of the transfer transistor to transfer the residual charge to the charge sensing unit to generate a second voltage; and
generate, using the quantizer, the second value based on one of the third value or a fourth value based on whether the photodiode is saturated by the residual charge during the exposure period.

12. The apparatus of claim 11, wherein the third value is generated before the exposure period ends.

13. The apparatus of claim 11, wherein the controller is configured to:
generate, using the quantizer, the first value based on comparing the first voltage against a flat threshold voltage;
generate, using the quantizer, the third value based on comparing the first voltage against a first ramping threshold voltage; and
generate, using the quantizer, the fourth value based on comparing the second voltage against a second ramping threshold voltage.

14. An apparatus comprising:
a first photodiode configured to generate a first charge in response to a first component of light within a first exposure period having a first duration;
a second photodiode configured to generate a second charge in response to a second component of the light within a second exposure period having a second duration;
a first charge sensing unit configured to accumulate at least a part of the first charge within the first exposure period;
a second charge sensing unit configured to accumulate at least a part of the second charge within the second exposure period;
a quantizer; and
a controller configured to:
determine, using the quantizer and within a first measurement period having a third duration, whether a first quantity of the at least a part of the first charge accumulated at the first charge sensing unit exceeds a first threshold, and a first time it takes for the first quantity to exceed the first threshold, wherein the first duration and the third duration are individually programmable;
based on whether the first quantity exceeds the first threshold, output a first value representing the first time or a second value, from the quantizer, representing a second quantity of the first charge generated by the first photodiode within the first exposure period to represent an intensity of the first component of the light;
determine, using the quantizer and within a second measurement period having a fourth duration, whether a third quantity of the at least a part of the second charge accumulated at the second charge sensing unit exceeds a second threshold, and a second time it takes for the second quantity to exceed the second threshold, wherein the second duration and the fourth duration are individually programmable; and
based on whether the third quantity exceeds the second threshold, output a third value representing the second time or a fourth value, from the quantizer, representing a fourth quantity of the second charge generated by the second photodiode within the second exposure period to represent an intensity of the second component of the light.

15. The apparatus of claim 14, wherein the second measurement period overlaps in time with the first exposure period.

16. The apparatus of claim 14, wherein the controller is configured to determine, using the quantizer, the second value and the fourth value after the first measurement period and the second measurement period.

17. The apparatus of claim 14, wherein:
the at least a part of the first charge is a first part of the first charge;
the at least a part of the second charge is a first part of the second charge;
the first photodiode is configured to:
accumulate a second part of the first charge as first residual charge until the first photodiode becomes saturated by the first residual charge; and output the first part of the first charge as first overflow charge to the first charge sensing unit when the first photodiode is saturated by the first residual charge;

the second photodiode is configured to:
accumulate a second part of the second charge as second residual charge until the second photodiode becomes saturated by the second residual charge; and output the first part of the second charge as second overflow charge to the second charge sensing unit when the second photodiode is saturated by the second residual charge; and the controller is configured to:
generate, using the quantizer, the first value based on measuring the first time it takes for the first quantity of the first overflow charge to exceed the first threshold;

generate, using the quantizer, the second value based on measuring a quantity of the first overflow charge or a quantity of the first residual charge;

generate, using the quantizer, the third value based on measuring the second time it takes for the second quantity of the second overflow charge to exceed the second threshold; and generate, using the quantizer, the fourth value based on measuring a quantity of the second overflow charge or a quantity of the second residual charge.

18. The apparatus of claim 17, further comprising a first memory and a second memory;
wherein the controller is configured:
store a first indication that the first overflow charge exceeds the first threshold;
based on the first indication, store the first value in the first memory and not to overwrite the first value with the second value in the first memory;
store a second indication that the second overflow charge exceeds the second threshold; and
based on the second indication, store the third value in the second memory and not to overwrite the third value with the fourth value in the second memory.

19. The apparatus of claim 14, wherein the second exposure period starts after the first measurement period ends.

20. The apparatus of claim 14, wherein the first photodiode and the second photodiode are part of a pixel cell; and
wherein the first component and the second component of the light have different frequency ranges.

21. The apparatus of claim 14, wherein the first photodiode and the second photodiode are, respectively, of a first pixel cell and a second pixel cell; and
wherein the first component and the second component of the light have the same frequency range.

22. The apparatus of claim 14, further comprising a third photodiode configured to generate and accumulate a third residual charge in response to a third component of the light within a third exposure period having a third duration;
wherein the controller is configured to determine, using a quantizer, a fifth value representing a fifth quantity of the third residual charge generated by the third photodiode within the third exposure period to represent an intensity of the third component of the light; and
wherein the third exposure period starts after the first exposure period starts and after the second exposure period starts.

23. A method, comprising:
setting an exposure period to have a first duration;
setting a measurement period to have a second duration, the measurement period being set separately from the exposure period;
enabling a photodiode to generate a charge in response to light within the exposure period having the first duration;
accumulating, at a charge sensing unit, at least a part of the charge within the exposure period;
determining, using a quantizer and within the measurement period having a second duration, whether a first quantity of the at least a part of the charge accumulated at the charge sensing unit exceeds a threshold, and a time it takes for the first quantity to exceed the threshold, wherein the first duration and the second duration are individually programmed; and
based on whether the first quantity exceeds the threshold, outputting a first value representing the time or a second value representing a second quantity of the charge generated by the photodiode within the exposure period to represent an intensity of the light.

24. A method, comprising:
setting a first exposure period to have a first duration;
setting a first measurement period to have a second duration, the first measurement period being set separately from the first exposure period;
setting a second exposure period to have a third duration;
setting a second measurement period to have a fourth duration, the second measurement period being set separately from the second exposure period;
enabling a first photodiode to generate a first charge in response to a first component of light within the first exposure period having the first duration;
enabling a second photodiode to generate a second charge in response to a second component of the light within the second exposure period having the second duration;
accumulating, by a first charge sensing unit, at least a part of the first charge within the first exposure period;
accumulating, by a second charge sensing unit, at least a part of the second charge within the second exposure period;
determining, using a quantizer and within the first measurement period having a third duration, whether a first quantity of the at least a part of the first charge accumulated at the first charge sensing unit exceeds a first threshold, and a first time it takes for the first quantity to exceed the first threshold;
based on whether the first quantity exceeds the first threshold, outputting a first value representing the first time or a second value representing a second quantity of the first charge generated by the first photodiode within the first exposure period to represent an intensity of the first component of the light;
determining, using the quantizer and within a second measurement period having a fourth duration, whether a third quantity of the at least a part of the second charge accumulated at the second charge sensing unit exceeds a second threshold, and a second time it takes for the second quantity to exceed the second threshold; and
based on whether the third quantity exceeds the second threshold, outputting a third value representing the second time or a fourth value representing a fourth quantity of the second charge generated by the second photodiode within the second exposure period to represent an intensity of the second component of the light.

* * * * *